US012061954B2

(12) United States Patent
Sivertson

(10) Patent No.: US 12,061,954 B2
(45) Date of Patent: Aug. 13, 2024

(54) METHODS, SYSTEMS, AND COMPUTER PROGRAM PRODUCT FOR DYNAMICALLY MODIFYING A DYNAMIC FLOW OF A SOFTWARE APPLICATION

(71) Applicant: INTUIT INC., Mountain View, CA (US)

(72) Inventor: Matthew L. Sivertson, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 1469 days.

(21) Appl. No.: 15/796,374

(22) Filed: Oct. 27, 2017

(65) Prior Publication Data

US 2019/0130305 A1 May 2, 2019

(51) Int. Cl.
*G06N 5/022* (2023.01)
*G06N 20/00* (2019.01)

(52) U.S. Cl.
CPC ............ *G06N 20/00* (2019.01); *G06N 5/022* (2013.01)

(58) Field of Classification Search
CPC .................................................... G06N 5/022
See application file for complete search history.

(56) References Cited

U.S. PATENT DOCUMENTS

| | | | |
|---|---|---|---|
| 5,465,372 A * | 11/1995 | Gottlieb | G06F 9/3804 712/25 |
| 6,480,876 B2 | 11/2002 | Rehg et al. | |
| 6,505,342 B1 * | 1/2003 | Hartmann | G06F 11/3688 714/E11.208 |
| 6,857,120 B1 | 2/2005 | Arnold | |
| 6,901,398 B1 * | 5/2005 | Horvitz | G06Q 10/107 707/694 |
| 7,735,060 B2 | 6/2010 | Harvey et al. | |
| 8,015,547 B2 | 9/2011 | Harvey et al. | |
| 8,095,923 B2 | 1/2012 | Harvey et al. | |
| 8,214,325 B2 | 7/2012 | Navas | |
| 8,296,303 B2 | 10/2012 | Navas | |
| 8,538,981 B2 | 9/2013 | Navas | |
| 8,965,902 B2 | 2/2015 | Navas | |
| 2002/0091747 A1 | 7/2002 | Rehg et al. | |
| 2002/0184294 A1 * | 12/2002 | Volkoff | G06Q 10/10 718/104 |

(Continued)

OTHER PUBLICATIONS

Random House Webster's College Dictionary, 1114-15, 1117 (2nd Random House ed. 1999).*

(Continued)

*Primary Examiner* — George Giroux
(74) *Attorney, Agent, or Firm* — DLA Piper LLP US

(57) ABSTRACT

Disclosed are techniques for implementing an intelligent system with dynamic configurability. These techniques identifying a plurality of flow nodes for a software application and determine a dynamic flow for executions of the intelligent system with the plurality of flow nodes, one or more dynamic conditions, and one or more dynamic actions, without hard coded inter-dependency between two or more flow nodes of the plurality of flow nodes. The intelligent system is transformed into a dynamically configured intelligent system at least by performing a modification pertaining to one or more flow nodes in the dynamic flow, without affecting remaining flow nodes in the dynamic flow.

25 Claims, 45 Drawing Sheets

(56) References Cited

U.S. PATENT DOCUMENTS

| | | |
|---|---|---|
| 2003/0112269 A1 | 6/2003 | Lentz et al. |
| 2006/0009963 A1* | 1/2006 | Gaussier ............... G06F 40/45 704/7 |
| 2006/0229923 A1 | 10/2006 | Adi |
| 2008/0005287 A1 | 1/2008 | Harvey et al. |
| 2008/0005721 A1 | 1/2008 | Harvey et al. |
| 2008/0005729 A1 | 1/2008 | Harvey et al. |
| 2008/0010631 A1 | 1/2008 | Harvey et al. |
| 2008/0077685 A1 | 3/2008 | Nguyen et al. |
| 2008/0134207 A1* | 6/2008 | Chamieh ............... G06F 9/4488 719/315 |
| 2009/0254572 A1* | 10/2009 | Redlich ............... G06Q 10/06 |
| 2010/0125545 A1 | 5/2010 | Navas |
| 2010/0125574 A1 | 5/2010 | Navas |
| 2010/0125584 A1 | 5/2010 | Navas |
| 2010/0128638 A1 | 5/2010 | Navas |
| 2010/0241828 A1* | 9/2010 | Yu ............... H04L 12/44 712/30 |
| 2013/0166569 A1 | 6/2013 | Navas |
| 2016/0110657 A1 | 4/2016 | Gibiansky et al. |
| 2018/0365614 A1 | 12/2018 | Palmer |

OTHER PUBLICATIONS

Microsoft Press® Computer Dictionary, 337-38 (2nd ed. 1994).*
Clemens (Automatic classification of object code using machine learning, Aug. 2015, pp. 156-162) (Year: 2015).*
U.S. Appl. No. 15/796,301, filed Oct. 27, 2017.
International Search Report issued in PCT/US2018/052702 dated Jan. 15, 2019.
Written Opinion issued in PCT/US2018/052702 dated Jan. 15, 2019.
International Search Report issued in PCT/US2018/052700 dated Jan. 22, 2019.
Written Opinion issued in PCT/US2018/052700 dated Jan. 22, 2019.

* cited by examiner

```
{
  "id":"burger-or-cheeseburger",
  "type":"VIEW",
  "condition": ["INSTOCK"],
  "bindings": ["burgers"]
},
{
  "id": "shake-type",
  "type": "VIEW",
  "condition": ["INSTOCK"],
  "bindings": ["shakes"]
},
{
  "id": "dark-or-milk-chocolate-shake",
  "type": "VIEW",
  "condition": [{
    "id": "EQUALS",
    "args": {"left": "@dataStore[USER_SELECTION].shake", "right": "chocolate"}
  }]
},
{
  "id": "regular-or-french-vanilla-shake",
  "type": "VIEW",
  "condition": [{
    "id": "EQUALS",
    "args": {"left": "@dataStore[USER_SELECTION].shake", "right": "vanilla"}
  }]
},
```

FIG. 2C

```
{
  "id": "albion-or-florence-strawberry-shake",
  "type": "VIEW",
  "condition": [{
    "id": "EQUALS",
    "args": {"left": "@dataStore[USER_SELECTION].shake", "right": "strawberry"}
  }]
},
{
  "id": "want-fries",
  "type": "VIEW",
  "condition": ["INSTOCK"],
  "bindings": ["fries"]
},
{
  "id": "tell-a-friend",
  "type": "VIEW",
  "condition": ["ALWAYS", "SHOW_ONCE"]
},
{
  "id": "place-order",
  "type": "ACTION",
  "condition": ["ALWAYS"],
  "args": {"actionId": "executeOrder"}
},
{
  "id": "order-status",
  "type": "VIEW",
  "condition": ["ALWAYS"]
}
```

FIG. 2D

```
"globalEntries": [
  {
    "id": "swap-burgers-and-fries",
    "type":"SWAP_ENTRIES_MODIFIER",
    "condition": [
     {
       "id": "EQUALS",
       "args":
       {
         "left":
"@dataStore[ABTESTS].getValue('friesFirstTest')",
         "right": "true"
       }
     }
    ],
    "args": {
      "entry1": "burger-or-cheeseburger",
      "entry2": "want-fries"
    }
  }
 ]
```

FIG. 2G

```
public enum ConditionAction {
            /**
             * Include the element, pending
following conditions, which could still change it to
exclude
             */
            Include,
            /**
             * Exclude the element, pending
following conditions, which could still change it to
include
             */
            Exclude,
            /**
             * Include the element absolutely,
once this is issued it cannot be changed
             */
            IncludeAbsolutely,
            /**
             * Exclude the element absolutely,
once this is issued it cannot be changed
             */
            ExcludeAbsolutely,
            /**
             * Don't change it at all, leave as is.
             */
            NoChange,
            Suppress,
            Unsuppress
}
```

FIG. 2H

```
public AlwaysCondition(ConditionAction action, ConditionAction failAction) {
            this.action = action;
            this.failAction = failAction;
    }

@Override
    public boolean test(PriorityListEntry entry) {
            return true;
    }

@Override
    public ConditionAction action() {
            return this.action;
    }

@Override
    public ConditionAction failAction() {
            return this.failAction;
    }
```

FIG. 2I

```
public StateCondition(Optional<String> stateId, List<String> fieldsInState,
                ConditionAction action, ConditionAction failAction) {
                        this.stateId = stateId;
                        this.fieldsInState = fieldsInState;
                        this.action = action;
                        this.failAction = failAction;
        }

@Override
        public boolean test(final PriorityListEntry entry) {
                        return fieldsInState.stream().anyMatch(
                                        fieldState ->
entry.bindings().contains(fieldState));
        }

@Override
        public ConditionAction action() {
                        return this.action;
        }

@Override
        public ConditionAction failAction() {
                        return this.failAction;
        }
```

FIG. 2J

```
public class OnlyBetween2And4AMCondition extends
AbstractNavCondition {

@Override
        public boolean test(PriorityListEntry entry) {
                int hour = LocalDateTime.now().getHour();
                return hour >= 2 && hour < 4;
        }

@Override
        public ConditionAction action() {
                return ConditionAction.NoChange;
        }

@Override
        public ConditionAction failAction() {
                return ConditionAction.Exclude;
        }

```
public interface NavOperation {

List<NavCondition> getAddedConditions();

int getNextEntryIndex(final List<PriorityListEntry>
    relevantSet, OptionalInt cursorIndex);

OptionalInt getIndexForBlankCursor(final
    List<PriorityListEntry> relevantSet);

NavOperationDirection getDirection();
}
```

FIG. 2L

```
public class NavOperationNext extends AbstractNavOperation { public static final NavOperationNext INSTANCE = new NavOperationNext();

@Override
    public int getNextEntryIndex(final List<PriorityListEntry> relevantSet, final OptionalInt cursorIndex) {
        return cursorIndex.getAsInt() + 1;
    }

@Override
    public OptionalInt getIndexForBlankCursor(List<PriorityListEntry> relevantSet) {
        return OptionalInt.of(0);
    }

@Override
    public NavOperationDirection getDirection() {
        return NavOperationDirection.Forward;
    }
}
```

FIG. 2M

```
public class NavOperationBack extends AbstractNavOperation { public static final NavOperationBack INSTANCE = new NavOperationBack();

@Override
    public int getNextEntryIndex(final List<PriorityListEntry> relevantSet, final OptionalInt cursorIndex) {
        return cursorIndex.getAsInt() - 1;
    }

@Override
    public OptionalInt getIndexForBlankCursor(List<PriorityListEntry> relevantSet) {
        return OptionalInt.of(relevantSet.size() - 1);
    }

@Override
    public NavOperationDirection getDirection() {
        return NavOperationDirection.Backward;
    }

| | 702B $Q_a$ | 704B $Q_b$ | 706B $Q_c$ | 708B $Q_d$ | 710B $Q_e$ | 712B $Q_f$ | 714B $Q_g$ | 716B GOAL |
|---|---|---|---|---|---|---|---|---|
| 718B RULE1 | Yes | ? | No | ? | ? | ? | ? | Yes |
| 720B RULE2 | Yes | ? | Yes | ? | ? | ? | Yes | Yes |
| 722B RULE3 | No | Yes | ? | ? | Yes | ? | Yes | Yes |
| 724B RULE4 | No | Yes | ? | ? | No | No | ? | Yes |
| 726B RULE5 | No | No | ? | No | ? | No | ? | Yes |

FIG. 7B

|      | 702B $Q_A$ | 704B $Q_B$ | 706B $Q_C$ | 708B $Q_D$ | ... | 716B GOAL | 718B STAT1 | 720B STAT2 |
|---|---|---|---|---|---|---|---|---|
| 718B RULE1 | YES | ? | NO | ? | ... | YES | 40% | 9% |
| 720B RULE2 | YES | ? | YES | ? | ... | YES | 20% | 6% |
| 722B RULE3 | NO | YES | ? | ? | ... | YES | 14% | 4% |
| 724B RULE4 | NO | YES | ? | ? | ... | YES | 65% | 21% |
| 726B RULE5 | NO | NO | ? | NO | ... | YES | 5% | 45% |

FIG. 7C

| | 702B $Q_1$ | 704B $Q_2$ | 706B $Q_3$ | 708B $Q_4$ | 710B $Q_5$ | 712B $Q_6$ | 714B $Q_7$ | 716B Goal |
|---|---|---|---|---|---|---|---|---|
| 718B Rule1 | Yes | ? | No | ? | ? | ? | ? | Yes |
| 720B Rule2 | Yes | ? | Yes | ? | ? | ? | Yes | Yes |
| 722B Rule3 | No | Yes | ? | ? | Yes | ? | Yes | Yes |
| 724B Rule4 | No | Yes | ? | ? | No | No | ? | Yes |
| 726B Rule5 | No | No | ? | No | ? | No | ? | Yes |

FIG. 7D

METHODS, SYSTEMS, AND COMPUTER PROGRAM PRODUCT FOR DYNAMICALLY MODIFYING A DYNAMIC FLOW OF A SOFTWARE APPLICATION

CROSS-REFERENCE TO RELATED APPLICATIONS

The present application is related to U.S. patent application Ser. No. 15/796,301 filed Oct. 27, 2017, entitled "METHODS, SYSTEMS, AND COMPUTER PROGRAM PRODUCT FOR IMPLEMENTING SOFTWARE APPLICATIONS WITH DYNAMIC CONDITIONS AND DYNAMIC ACTIONS", and filed concurrently. The contents of the aforementioned patent applications are hereby expressly incorporated by reference in their entireties for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional software products and services often include a hard coded software program with inter-dependencies among various blocks of code in the hard coded software program flow. Such a hard coded software program is difficult to code with complex relations and/or dependencies and is not amenable to modifications, especially in software products and services providing customized user experiences in response to user inputs. Conventionally, the flow sequence is hard coded in the software program, and thus any modifications disturbing the flow sequence necessarily involves breaking up one or more edges (when the software program is viewed as a directed graph), modifying one or more nodes (e.g., adding or removing one or more nodes or changing the locations of two or more nodes) in the flow, and re-establishing one or more new edges to accommodate the modified one or more nodes.

Software programs with a flow sequence or navigation algorithm that is hard-coded in the software programs also cause inefficiencies during execution. Such hard-coded flow sequences, navigation algorithms, or their corresponding graphs or data structures often need to be traversed hierarchically or a large number of configurable objects and sometimes even through nodes or objects that may be irrelevant to a specific user and thus consume unnecessary computational resources. These conventional software programs with hard-coded flow sequences or navigation algorithms are also more difficult to present customizable or personal experiences for different users. For example, in an electronic tax return preparation and filing software application (both the hosted and the stand-alone versions), a user is often presented with a series of interview screens to collect sufficient information about the user and to determine which sections of a tax form may be pertinent to the user's tax filing. Modern electronic tax return preparation and filing software applications attempt to streamline the interview by selecting relevant interview screens from a large number of interview screens stored in a repository and presenting only the selected interview screens to a specific user.

Although some logic or even intelligence may be built into such conventional software programs, these modern software applications still suffer from the same problems with having to traverse a tree- or table-like structure (e.g., a directed graph, a tabular structure, a navigation algorithm, etc.) to identify the relevant object models (e.g., interview screens for an electronic tax preparation and filing software product or service delivery model). Also, such a tree- or table-like structure, once hard coded, is not amenable to modifications that alter the logic flow therein. These problems are further exacerbated by the sheer amount of interview screens often exceeding 50,000 interview screens and/or interview questions in modern electronic tax return preparation and filing software application.

The inter-dependencies or inter-relations among at least some of these interview screens further hinder the development of such software applications. For example, more computational resources will be expended during the prototyping, designing, implementation, testing, verification, integration, etc. of software products or services simply because of the complexities and hence modifications (e.g., by removing a part of the original logic flow, introducing changes to one or more blocks or sections of the underlying code, and re-establishing a new logic and connections involving the one or more blocks or sections of code) of the underlying logic of a modern software application and further because of the sheer number of various object models and/or code modules that have to be parsed through and thus accommodated in the memory of a computing system and processed with processor cycles.

To address at least these technological challenges and difficulties, there is therefore a need for methods, systems, and computer program products for implementing software products or services with dynamic conditions and dynamic actions as well as a need for methods, systems, and computer program products for implementing intelligent systems with dynamic configurability.

SUMMARY

Disclosed are method(s), system(s), and article(s) of manufacture for implementing software products or services with dynamic conditions and dynamic actions in some embodiments. Some other embodiments are directed to method(s), system(s), and article(s) of manufacture for implementing intelligent systems with dynamic configurability.

Some embodiments are directed to a method for implementing software applications with dynamic conditions and actions. In these embodiments, these techniques identify a plurality of flow nodes for a software application. One or more dynamic conditions may be identified or determined for the plurality of flow nodes; and one or more dynamic actions may be identified or determined for the one or more dynamic conditions. A dynamic flow may be determined with the plurality of flow nodes, the one or more dynamic conditions, and the one or more dynamic actions, without hard coded inter-dependency between two or more flow nodes of the plurality of flow nodes.

In some embodiments, a dynamic condition associated with or included in a flow node in the dynamic flow is independently evaluated to generate a dynamic evaluation result during an execution of the dynamic flow. In some of these embodiments, a dynamic action associated with or included in a flow node in the dynamic flow is independently performed based in part or in whole upon the dynamic evaluation result of the dynamic condition.

In some of the immediately preceding embodiments, the dynamic flow for the software application may be executed at least by independently evaluating one or more dynamic conditions during execution of a first flow node in the dynamic flow and at least by independently executing one or more dynamic actions based in part or in whole upon dynamic evaluation results of the one or more dynamic conditions. During the execution of the dynamic flow, runtime data that is acquired during the execution of the first flow node in the dynamic flow may be identified; and the plurality of flow nodes may be reduced into a reduced set of flow nodes having a fewer number of flow nodes than a total number of the plurality of flow nodes based in part or in whole upon the runtime data.

In addition or in the alternative, the dynamic flow may be modified at least by performing a modification pertaining to one or more flow nodes in the dynamic flow; and the dynamic flow may be transformed into a modified dynamic flow based in part or in whole upon the modification. In some of these embodiments, modifying the dynamic flow may include adding a new flow node to the dynamic flow to transform the dynamic flow into the modified dynamic flow, where the new flow node is added to the dynamic flow without modifying the plurality of flow nodes in the dynamic flow.

In addition or in the alternative, modifying the dynamic flow may include removing an existing flow node from the dynamic flow to transform the dynamic flow into the modified dynamic flow, where the existing flow node is removed from the dynamic flow without modifying the plurality of flow nodes in the dynamic flow. In some embodiments, modifying the dynamic flow may include identifying a first flow node in the dynamic flow; identifying a second flow node in the dynamic flow; and swapping locations of the first flow node and the second flow node in the dynamic flow, where the locations are swapped in the dynamic flow without modifying the plurality of flow nodes in the dynamic flow.

In some embodiments, executing the dynamic flow may include identifying first runtime data during an execution of the dynamic flow; and one or more relevance analyses may be performed for the first runtime data. In some of these embodiments, a first dynamic evaluation result may be determined at least by evaluating one or more first dynamic conditions included in or associated with a current flow node that is executing; and one or more first dynamic actions of the one or more dynamic actions may be executed based in part or in whole upon the first dynamic evaluation result of the one or more first dynamic conditions.

In some of these embodiments, the plurality of flow nodes for the dynamic flow may be reduced into a first reduced set at least by determining a first relevant set of flow nodes based in part or in whole upon the first runtime data or the first dynamic evaluation result of the one or more first dynamic conditions or by determining a first irrelevant set of flow nodes based in part or in whole upon the first runtime data or the first dynamic evaluation result of the one or more first dynamic conditions.

In addition or in the alternative, a next flow node may be identified for the dynamic flow from the first reduced set for execution after the current flow node; and one or more second dynamic conditions included in or associated with the next flow node may be identified or determined. Moreover, a second dynamic evaluation result may be determined at least by evaluating the one or more first dynamic conditions included in or associated with the next flow node that is executing; and the one or more second dynamic actions may be executed based in part or in whole upon the second dynamic evaluation result of the one or more second dynamic conditions.

In some of these embodiments, second runtime data may be identified during an execution of the dynamic flow; and the first reduced set may be again reduced into a second reduced set for the dynamic flow at least by determining a second relevant set of flow nodes based in part or in whole upon the second runtime data or the second dynamic evaluation result of the one or more second dynamic conditions or by determining a second irrelevant set of flow nodes based in part or in whole upon the second runtime data or the second dynamic evaluation result of the one or more second dynamic conditions.

Some embodiments are directed to a method for implementing intelligent systems with dynamic configurability. In these embodiments, these techniques identifying a plurality of flow nodes for a software application and determine a dynamic flow for executions of the intelligent system with the plurality of flow nodes, one or more dynamic conditions, and one or more dynamic actions, without hard coded inter-dependency between two or more flow nodes of the plurality of flow nodes. The intelligent system is transformed into a dynamically configured intelligent system at least by performing a modification pertaining to one or more flow nodes in the dynamic flow, without affecting remaining flow nodes in the dynamic flow.

In some embodiments, a dynamic condition associated with or included in a flow node in the dynamic flow is independently evaluated to generate a dynamic evaluation result during an execution of the dynamic flow; and a dynamic action associated with or included in a flow node in the dynamic flow is independently performed based in part or in whole upon the dynamic evaluation result of the dynamic condition.

In some embodiments, runtime data may be identified during an execution of at least one flow node for the intelligent system; one or more classification modules may be identified for classifying one or more terms in the runtime data with machine learning; and the one or more terms may be classified with at least one classification module. In some of these embodiments, a helper item may be identified and linked with a classified term from the runtime data using the at least one classification module; and the accuracy or completeness of the at least one classification module may be improved.

In addition or in the alternative, a plurality of classification metrics or measures may be identified; one or more learning classification schemes may be determined with the plurality of classification metrics or measures; and the one or more classification modules may be identified or determined with the one or more learning classification schemes. In some of these embodiments, the one or more learning classification schemes may be retrained into one or more retrained learning classification schemes with active learning data; and the one or more classification modules may be improved with at least the one or more retrained learning classification schemes.

In some embodiments, a data set corresponding to the plurality of flow nodes may be identified into a word or term embedding module that is stored at partially in the memory and including or coupled with the at least one microprocessor; a plurality of object model clusters and a plurality of characteristic clusters may be identified or determined for the data set with word or term embedding techniques; and runtime data may be identified from a user during an execution of the intelligent system.

In some of these embodiments, one or more runtime data clusters and one or more characteristic clusters may be determined for at least one runtime data cluster for the runtime data; and at least one characteristic cluster or the at least one runtime data cluster may be presented or forwarded to a data model or a code generation module for completing the dynamic flow.

In some of the immediately preceding embodiments, the data set may be normalized into a normalized data set; the data set or the normalized data set may be reduced into a reduced data set at least by performing a reduction process on the data set or the normalized data set; a dictionary may be generated for the reduced data set; the word or term embedding module may be trained with one or more training instances comprising one or more analogical tasks; and a plurality of tokens in the dictionary may be mapped to a set of vectors in a vector space.

In addition or in the alternative, the dictionary may be pruned; the one or more training instance and multiple degrees of freedom may be determined for the one or more training instances based in part or in whole upon a balance between performance and accuracy of the intelligent system; and customizable weight structures may be determined for the word or term embedding module.

Moreover, the one or more training instances may be executed at the word or term embedding module; and the set of vectors may be generated as a distribution of weights of tokens in the dictionary with the customizable weight structures.

In some embodiments, one or more completion graphs may be identified; one or more decision tables may be determined based in part or in whole upon the one or more completion graphs; the dynamic flow may be determined based at least in part upon the one or more decision tables; and a first flow node in the dynamic flow may be executed at least by independently evaluating one or more first dynamic conditions included in or associated with the first flow node and by executing one or more first dynamic actions based in part or in whole upon evaluating the one or more first dynamic conditions.

In some of these embodiments, first runtime data may be identified during an execution of the first flow node; and at least one decision table may be updated into a first reduced decision table at least by discarding, ignoring, or filtering out or more first entries in the at least one decision table from further processing based in part or in whole upon the first runtime data. Furthermore, a second flow node in the dynamic flow may be executed at least by independently evaluating one or more second dynamic conditions included in or associated with the second flow node and by executing one or more second dynamic actions based in part or in whole upon evaluating the one or more second dynamic conditions.

Second runtime data may be identified during an execution of the second flow node; and the first reduced decision table may be further updated into a second reduced decision table at least by discarding, ignoring, or filtering out or more second entries in the first reduced decision table from further processing based in part or in whole upon the second runtime data.

Some embodiments are directed at one or more hardware modules that include and/or function in conjunction with at least one microprocessor as well as other related components or architectures of one or more computing systems and may be invoked to perform any of the methods, processes, or sub-processes disclosed herein. The hardware system may include, for example, a normalization module, one or more word embedding modules or term embedding modules, one or more multi-stage clustering modules, a profiler module, an analytics module, an anonymization module, one or more machine learning or artificial intelligence (A.I.) modules, and/or an anomaly check module in some embodiments.

Each of these modules may include or function in tandem with electrical circuitry and one or more microprocessors each having one or more processor cores to perform its intended functions. The hardware system may further include one or more forms of non-transitory machine-readable storage media or persistent storage devices to temporarily or persistently store various types of data or information, various design rules, various libraries, selected and selectable targets, or any other suitable information or data, etc. A module may be initialized in a computing system so that the software portion of the module is stored in memory (e.g., random access memory) to be executed by one or more processors or processor cores off the computing system to perform at least a part of the functionality of the module. Some illustrative modules or components of the hardware system may be found in the description below.

Some embodiments are directed at an article of manufacture that includes a non-transitory machine-accessible storage medium having stored thereupon a sequence of instructions which, when executed by at least one microprocessor or at least one processor core, causes the at least one microprocessor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing software products or services with dynamic conditions and dynamic actions are described below with reference to FIGS. 1-9.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 2C-2D jointly illustrate some code or pseudo-code for the examples of the individual, independent object models with respective dynamic conditions illustrated in FIG. 2B in one or more embodiments.

FIG. 2G illustrates some code or pseudo-code for the example of modifying an existing software flow illustrated in FIGS. 2E-2F in one or more embodiments.

FIG. 2H illustrates some code or pseudo-code for implementing an object model with dynamic condition(s) and dynamic actions that may be used in the examples illustrated in FIGS. 2B, 2E, and 2F in one or more embodiments.

FIG. 2I illustrates some code or pseudo-code for an example of a dynamic condition and dynamic actions that may be used in the examples illustrated in FIGS. 2B-2G in one or more embodiments.

FIG. 2J illustrates some code or pseudo-code for an example of a dynamic condition and dynamic actions that may be used in the examples illustrated in FIGS. 2B-2G in one or more embodiments.

FIG. 2K illustrates some code or pseudo-code for an example of a custom dynamic condition and dynamic actions in one or more embodiments.

FIG. 2L illustrates some code or pseudo-code for an example of a navigation operation interface that may be used in implementing software products or services with dynamic conditions and dynamic actions in one or more embodiments.

FIG. 2M illustrates some code or pseudo-code for an example of a navigation operation that may be used in implementing software products or services with dynamic conditions and dynamic actions in one or more embodiments.

FIG. 2N illustrates some code or pseudo-code for an example of another navigation operation that may be used in implementing software products or services with dynamic conditions and dynamic actions in one or more embodiments.

FIG. 7B illustrates an example of a decision table that is based on or derived from a directed graph or a completion graph in one or more embodiments.

FIG. 7C illustrates another example of a decision table that incorporates statistical data and is based on or derived from a directed graph or a completion graph to determine likelihood or probability of an answer to a question of the decision table in one or more embodiments.

FIG. 7D illustrates an example of incremental processing of a decision table based at least in part upon some runtime data to identify relevant entries or to filter out irrelevant entries in one or more embodiments.

DETAILED DESCRIPTION

Figure 1A:
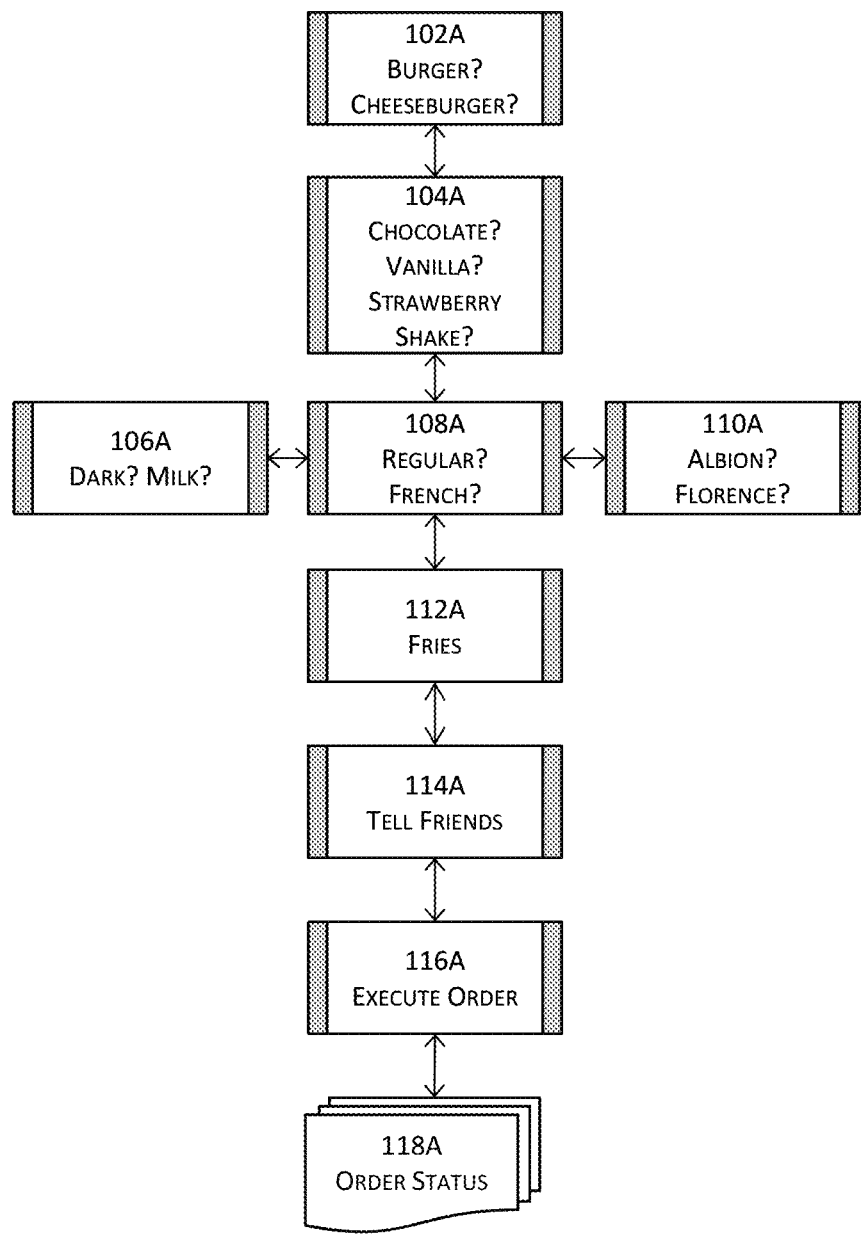
FIGS. 1A-1D illustrate schematic examples of a software product or service to demonstrate the advantages of software products or services with dynamic conditions and dynamic actions in one or more embodiments.

Some embodiments are directed to a method, system, and computer program product for implementing software applications with dynamic conditions and actions in one or more embodiments. Other objects, features, and advantages of the invention are described in the detailed description, figures, and claims.

In some embodiments, a plurality of flow nodes may be identified into a software application flow. Unlike conventional techniques with hard coded navigation algorithm, a hard coded flow sequence, or a fixed series of state transitions controlling the order or sequence in which the plurality of flow nodes are executed (e.g., a directed graph, a finite state machine, etc.), the plurality of flow nodes are disconnected from each other, and each flow node may be independently executed.

A flow node may be self-contained and include or may be associated with one or more dynamic conditions that are evaluated at runtime and/or one or more dynamic actions that are performed according to the evaluation results of the one or more corresponding dynamic conditions. For example, a success action may be performed when a dynamic condition is evaluated to be "true"; or a failure action may be performed when a dynamic condition is evaluated to be "false".

A flow node may thus be considered as a dynamic application, a dynamic object model, or a dynamic code module that may be independently executed almost anywhere in the software application flow without altering the final result of the execution of the software application. A software application flow thus defined is amenable to modifications that may include, for example, adding one or more flow nodes to the software application flow, removing one or more flow nodes from the software application flow, swapping the locations of two or more flow nodes, or any combinations thereof.

Unlike conventional techniques with hard coded logic or navigation algorithm, a hard coded flow sequence, or a fixed series of state transitions controlling the order or sequence in which the plurality of flow nodes are executed (e.g., a directed graph, a finite state machine, etc.), these embodiments dynamically identify or determine a plurality of flow nodes for a flow of a software application product or service; and the plurality of flow nodes may be initiated with individual object models (or code modules) that are independent from each other with no hard-coded inter-dependency relations in between.

Moreover, an individual module may be generated with a condition handler and an action handler. The condition handler executes to determine how one or more conditions are evaluated. The evaluation results of these one or more conditions are provided to the action handler to determine and execute the corresponding dynamic action. Both the dynamic conditions and the dynamic actions may be predetermined or may be custom generated, even on the fly during the execution and/or modification of the flow of such a software application with dynamic conditions and actions.

In addition to the flexibility of and minimal changes in modifying a software application or a flow therefor without breaking or having to break up the original logic in the original software application or the flow therefor, one of the advantages of these embodiments is the conservation of computational resources during, for example, the prototyping, designing, implementation, testing, verification, integration, etc. of software products or services Some embodiments are directed to a method, system, and computer program product for implementing intelligent systems with dynamic configurability in one or more embodiments. Other objects, features, and advantages of the invention are described in the detailed description, figures, and claims.

In some of these embodiments, an intelligent system or software application product or service may integrate the dynamic applications with dynamic conditions and dynamic actions with built-in intelligence (e.g., artificial intelligence or AI, machine learning capabilities, computational neuroscience, logic-based knowledge representation/planning/learning, knowledge-based learning and recognition, etc.) The built-in intelligence provides the "brain power" for the software application product or service to make unassisted decisions, predictions, and/or recommendations, and the implementation with dynamic conditions and dynamic actions transforms such a system or software application product or service into one with dynamic configurability.

One example of such intelligent systems or processes with dynamic configurability includes an intelligent electronic tax preparation and filing software product or service where the built-in intelligence autonomously and intelligently determines one or more flow nodes for at least a part of the flow of the software product or service, and the dynamic configurability allows the flow to be dynamically and autonomously modified to accommodate the inputs, operations, and outputs of the built-in intelligence.

In some embodiments, integrate the above dynamic conditions and dynamic actions with an intelligent system that determines the relevancy of various dynamic conditions and actions based on incrementally gathered user input data. This intelligent system or process with dynamic configurability may invoke one or more independent or embedded data models that use the user input or other inputs from other sources to generate the initial batch of dynamic actions with respective dynamic conditions. The intelligent system determines the relevancy of each dynamic action in the initial batch.

One or more dynamic condition and action modules may use either a default flow or generate a custom flow with an initial set of individual dynamic blocks. The intelligent system may further incrementally evaluate additional inputs (user inputs or other inputs collected during the execution of a software application (e.g., Turbotax®) driven by the intelligent system and the dynamic conditions and dynamic actions module(s) to determine which ones of the initial set of dynamic blocks or nodes are relevant, when one dynamic block or node depends upon one or more other blocks, and how the generated flow is going to proceed based on the incrementally collected inputs.

One of the advantages of such intelligent systems or processes with dynamic configurability includes the expedient access (e.g., identification, retrieval, etc.) of various blocks or sections of software code, various object models (e.g., a large number of potential interview questions and/or interview screens in excess of 50,000) because the built-intelligence more quickly discards irrelevant ones or identifies relevant ones without processing, traversing, or parsing or having to process, traverse, or parse through, for example, the decision logic (e.g., a directed graph, a decision table, etc. in its entirety). In addition, such intelligent systems or processes inherit all the advantages of the software applications with dynamic conditions and actions mentioned above.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIGS. 1A-1D illustrate schematic examples of a software product or service to demonstrate the advantages of software products or services with dynamic conditions and dynamic actions in one or more embodiments. FIG. 1A illustrates a simple software application flow presenting a series of screens to a user for ordering food items. In this example, a question or interview screen 102A may be presented to ask the user whether the user would like to order a burger or a cheeseburger. Of course, this first question or interview screen 102A may also allow the user to skip this particular selection although this aspect is not illustrated in FIG. 1A. Another question or interview screen 104A may be presented to ask the user which milkshake flavor the user would like to order, and the selections may include "chocolate," "vanilla," and "strawberry" (and perhaps "skip" allowing the user to skip the milkshake altogether).

For chocolate milkshakes, an addition screen or object model 106A may be executed and presented to ask the user whether the user would like to have dark chocolate or milk chocolate milkshake. For vanilla milkshakes, an additional screen or object model 108A may be executed and presented to ask the user whether the user would like to have regular vanilla or French vanilla milkshake. For strawberry milkshakes, an additional screen or object model 110A may be executed and presented to ask the user whether the user would like to have Albion or Florence milkshake.

Another question or interview screen 112A may be presented to ask the user whether the user would like to order fries. It is supposed that after the screen 112A inquiring into fries, the software flow proceeds to screen 114A to ask the user to tell his or her friend(s) about the experience for the store or the order and further proceeds to 116A to confirm the placement and execution of the order and to provide order status (118A). The following FIGS. 1B-1D illustrate some simple modifications to this simple flow.

Figure 1B:
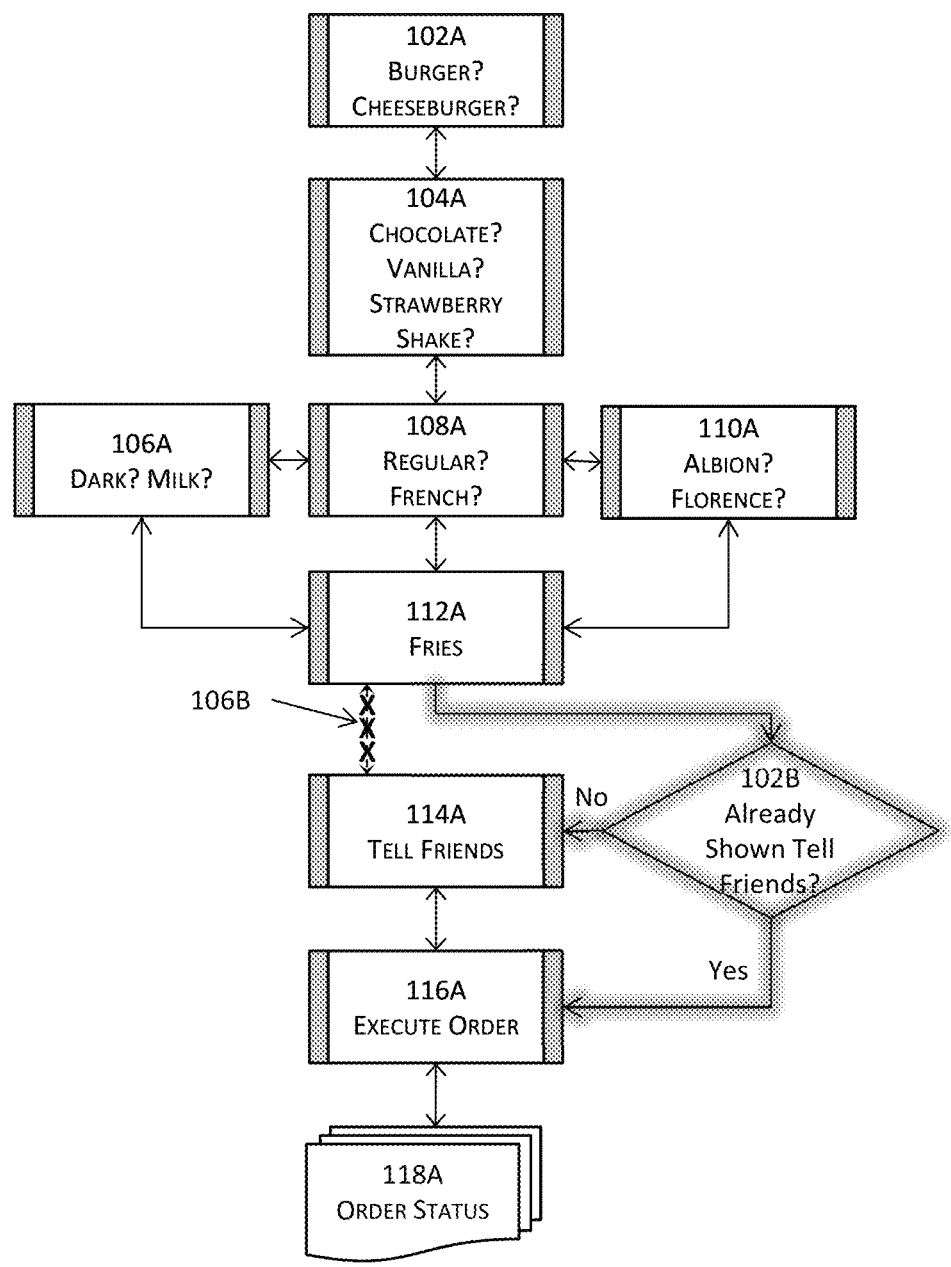

FIG. 1B illustrates an example of adding a flow node to the flow illustrated in FIG. 1A. More specifically, FIG. 1B illustrates adding a decision block 102B to inquire into whether a user has already been asked about telling his or her friends about the user's experience about the store or the order. This new decision block 102B is to be added after block 112A. As a result, the original connection (edge) between 112A and 114A needs to be removed as illustrated by the "X's" 106B in FIG. 1B. When the decision result at 102B is affirmative, the flow is to be modified to proceed to 116A to place and execute the order. Otherwise, the flow is to be modified to proceed to 114A to ask the user to tell his or her friend(s) about the experience for the store or the order.

With conventional approaches, this simple modification would require removing the connection or edge between flow node 112A and flow node 114A, adding a new block (102B), re-establish three new connections—between 112A and 102B, between 102B and 116A for the affirmative determination result, and between 102B and 114A for negative determination result. Such a simple modification can be done even when this example of software application is hard coded, although such a modification requires tampering with the original logic with the aforementioned modifications that need to be performed manually. If done conventionally, this modification essentially require expending more computational resources in loading the original flow, making modifications to the original flow, and then proceeding through the regular coding, testing, etc. Nonetheless, some of the computational resources that would be expended with conventional approaches may be conserved with the dynamic applications described below.

Figure 1C:
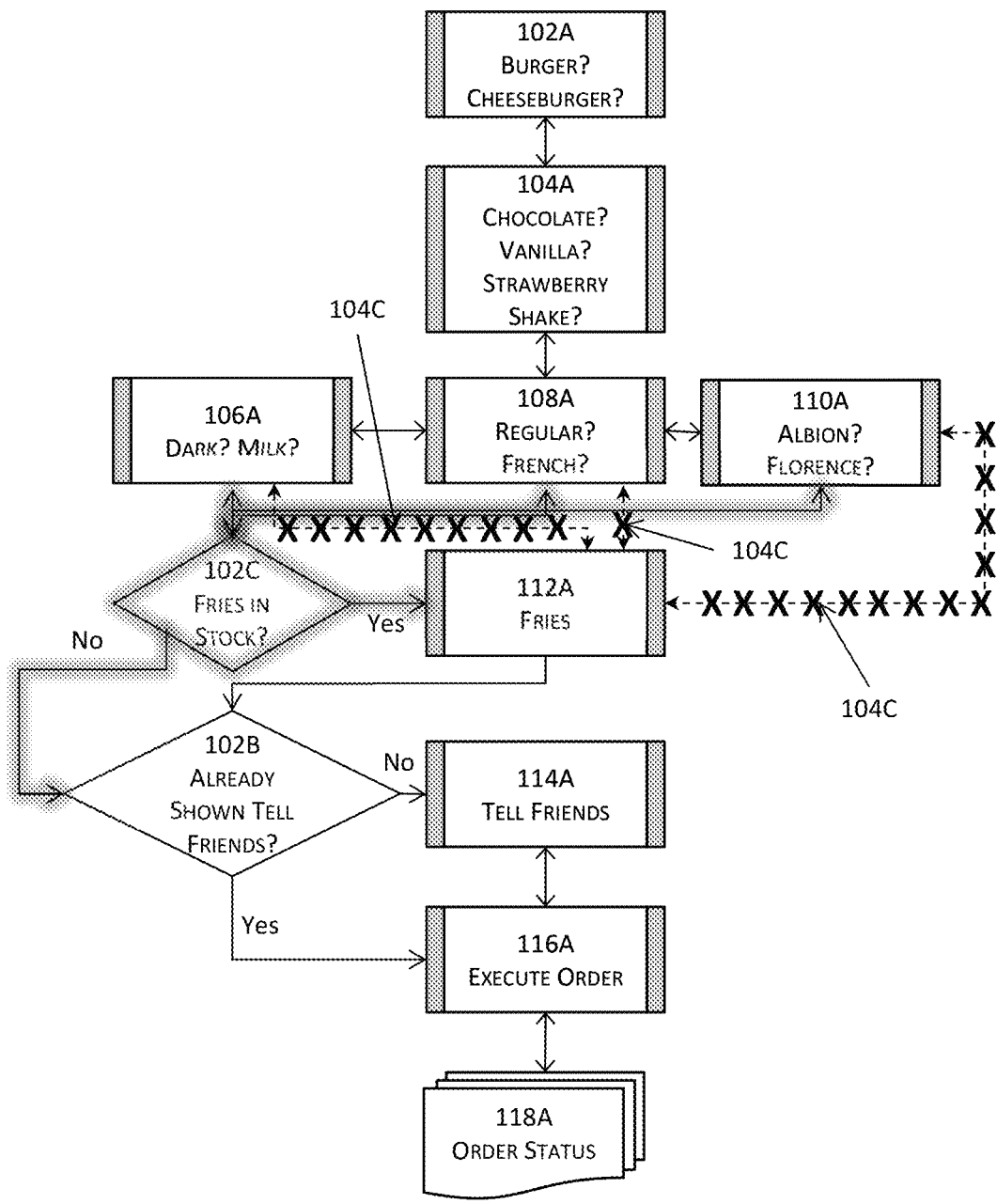
Figure 1D:
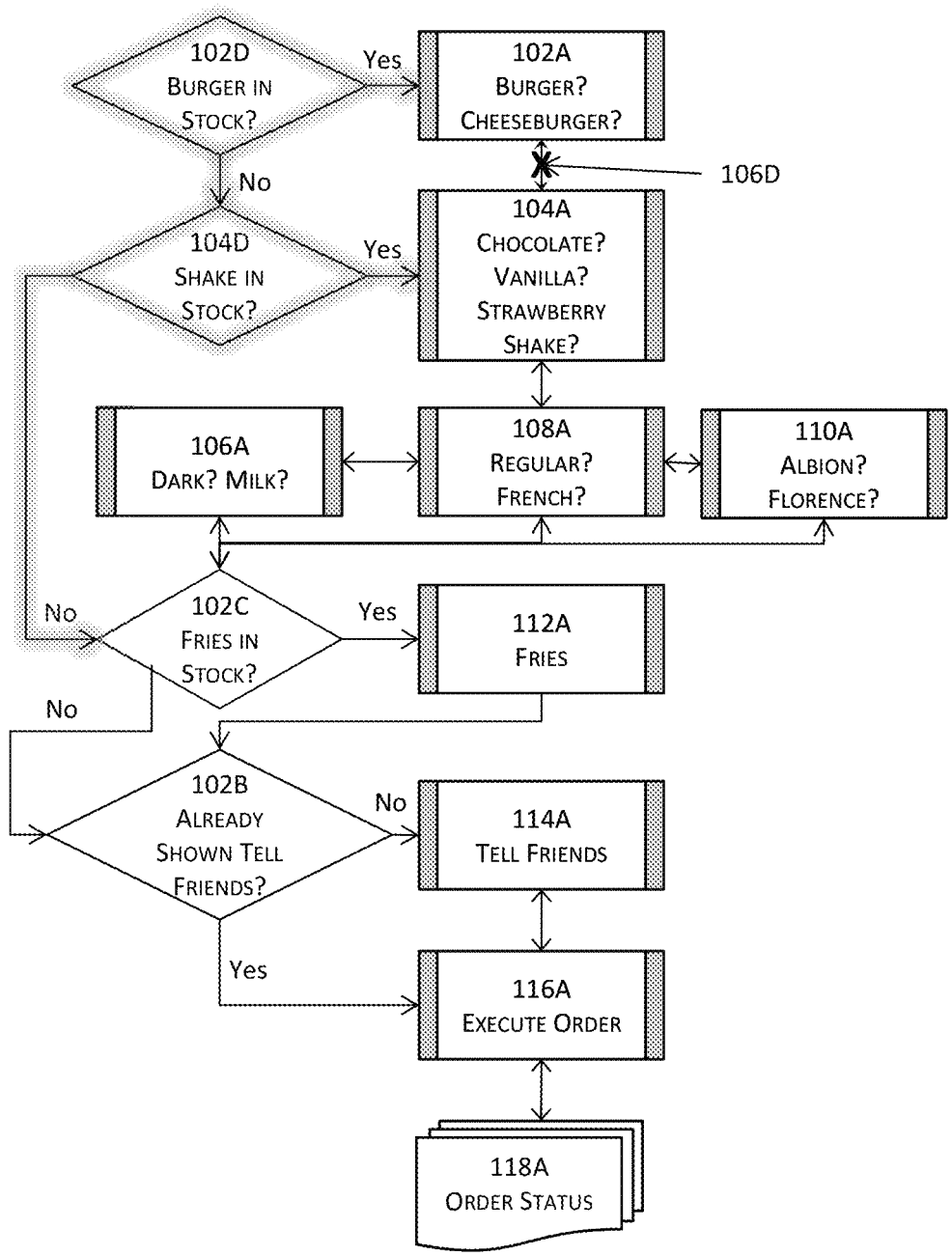

FIG. 1C illustrates another example of modifying adding another flow node to the flow illustrated in FIG. 1B. More specifically, FIG. 1C illustrates adding another decision block 102C to inquire into whether fries are in stock. This new decision block 102C is to be added after blocks 106A, 108A, and 110A. As a result, the original connections (edge) between 106A and 108A, between 108A and 112A, and between 110A and 112A need to be removed as illustrated by the "X's" 104C in FIG. 1C. The decision block 102C may be added to the flow, and new connections or edges need to be re-established between the newly added 102C and the original blocks 106A, 108A, and 110A. When the decision result at 102C is affirmative, the flow is to be modified to proceed to 112A to inquire into whether a user would like to order fries. Otherwise, the flow is to be modified to proceed to 102B added in FIG. 1B to ask the user to tell his or her friend(s) about the experience for the store or the order.

Similar to the modifications in FIG. 1B, such modifications illustrated in FIG. 1C can be done even when this example of software application is hard coded, although such a modification requires tempering with the original logic with the aforementioned modifications that need to be performed manually or even programmatically if such programmatic approaches ever exist. If done conventionally, this modification also requires expending more computational resources as that illustrated and described in FIG. 1B.

FIG. 1D illustrates another example of modifying adding two additional flow nodes to the flow illustrated in FIG. 1C. More specifically, FIG. 1D illustrates adding a new decision block 102D to inquire into whether burgers are in stock as well as adding another new decision block 104D to inquire into whether milkshakes are in stock. The new decision block 102D is to be added before block 102A; and the new decision block 102D is to be added before block 104A. Moreover, when the determination result at 102D is affirmative, the flow proceeds to present the screen 102A asking a user whether the user would like to order a burger or a cheeseburger. When the determination result at 102D is negative, the flow proceeds to 104D to determine whether milkshakes are in stock (the newly added 104D).

In addition, when the determination result at 104D is affirmative, the flow proceeds to present the screen 104A asking a user whether the user would like to order a chocolate, vanilla, or strawberry milkshake. Otherwise, the flow proceeds to 102C to determine whether fries are in stock.

As a result of these modifications of the flow, the original connection (edge) between 102A and 104A needs to be removed as illustrated by the "X" 106D in FIG. 1D. The decision blocks 102D and 104D may be added to the flow, and new connections or edges need to be re-established between the newly added 102D and the original block 102A, between the new blocks 102D and 104D, between the new block 104D and the original block 104A, between the new block 104D and block 102C for the negative determination result at 104D.

Similar to the modifications in FIGS. 1B and 1C, such modifications illustrated in FIG. 1D can be done even when this example of software application is hard coded, although such modifications also require manipulating the original logic with the aforementioned modifications that need to be performed manually or even programmatically if such programmatic approaches ever exist. If done conventionally, these modifications also require expending more computational resources as those illustrated and described in FIGS. 1B and 1C.

Figure 2A:
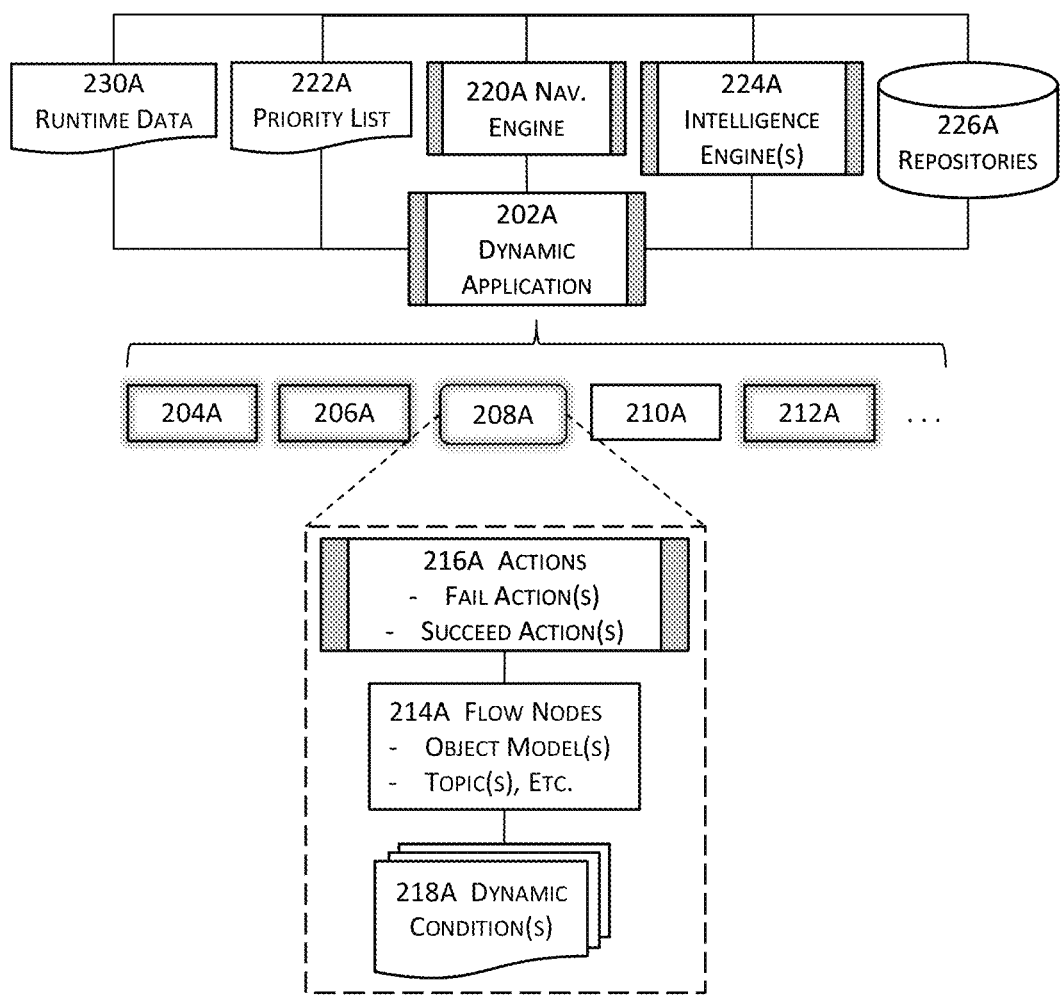
FIG. 2A illustrates a high level block diagram for implementing software products or services with dynamic conditions and dynamic actions in one or more embodiments.

FIG. 2A illustrates a high level block diagram for implementing software products or services with dynamic conditions and dynamic actions in one or more embodiments. In these embodiments, a flow for a dynamic software application 202A may be generated by identifying a plurality of flow nodes (e.g., 204A, 206A, 208A, 210A, and 212A illustrated in FIG. 2A) from, for example, one or more repositories 226A and adding the plurality of flow nodes into the flow. A dynamic software application 202A may optionally operate in tandem with a navigation engine 220A having one or more navigation algorithms, although the navigation engine 220A or navigation algorithms are entirely optional because these flow nodes have the capability of independent executions. These one or more repositories 226A may store, for example, rules, questions, inquiries, queries, data models, code modules, contents, topics, screens presented to users, pages, etc. or any other suitable data or information in any suitable forms.

In some of these embodiments, a flow for a dynamic software application may be generated by simply identifying a plurality of flow nodes (e.g., 204A, 206A, 208A, 210A, and 212A illustrated in FIG. 2A) from one or more repositories (e.g., 226A) and adding the plurality of flow nodes into the flow, without any navigation hard-coded algorithms or sequences between at least two of the plurality of flow nodes. In some other embodiments, a flow for a dynamic software application may be generated by identifying and adding a plurality of flow nodes into the flow with a general guidance that describe one or more soft rules that generally indicate how a flow is to proceed at a high level without specifying any specific sequences or orders to proceed from a specific node. For example, the guidance may indicate that one set of flow nodes is preferred (but may or may not necessarily be required) to execute before another set of flow nodes, although it shall be noted that such a general guidance may be entirely optional in some of these embodiments.

A dynamic software application 202A may operate in tandem with one or more relevance or intelligence modules or data models 224A (collectively intelligence module for singular or intelligence modules for plural) that may execute in parallel with the dynamic software application 202A to determine whether certain flow nodes are relevant to the flow sequence of the dynamic software application 202A and/or whether certain other flow nodes are irrelevant to the flow. A dynamic software application 202A may also receive runtime data 230A as inputs. Such runtime data 230A includes, for example, information or data provided by a user (e.g., user's answer to a question or inquiry via a user interface) in some embodiments. In addition or in the alternative, runtime data 230A may include data generated by the execution of one or more flow nodes.

A flow node may be implemented in a variety of different forms (214A) such as an object model, a code module, a specific content or a presentation thereof (e.g., an interview screen or a specific screen presented in a user interface), a question awaiting user's answer, etc. A flow node may include a dynamic application or a portion thereof and may include or may be associated with its own dynamic condition(s) (218A) and/or dynamic action(s) (216A). It shall be noted that although some of the dynamics dynamic conditions or the dynamic actions appear to be binary in the examples illustrated in, for example, FIGS. 1A-1D, these examples are provided herein for the ease of explanation and illustration and are not intended to limit the scope of dynamic conditions, dynamic applications, and dynamic applications. In some embodiments, a dynamic condition may include much more complex logic than a binary decision; and depending upon the evaluation results of a dynamic condition, one or more dynamic actions of various complexities may be identified and executed than what is illustrated in these figures.

In some embodiments, these flow nodes may be added to the flow in any arbitrary order because each flow node of the plurality of flow nodes may be individually and independently executed without awaiting another flow node to complete its execution although the execution result may sometimes affect one or more other flow nodes. In some other embodiments, a priority list 222A may be provided to the dynamic software application 202A to provide, for example, some general guidance as to which flow nodes or which groups of flow nodes may be performed before (or after) some other flow nodes or groups of flow nodes.

For example, in the example illustrated in FIGS. 1A-1D, the priority list 222A may include the specification that "execute order 116A" precedes "order status 118A", and that the group of ordering flow nodes (e.g., 102A, 104A, 106A, 108A, 110A, 112A, etc.) precedes "execute order 116A" and "order status 118A". It shall be noted that a priority list 222A merely provides general guidance without imposing hard constraints and is optional due to the capability of independent evaluation of dynamic conditions and independent execution of dynamic actions of the flow nodes.

In the example illustrated in FIGS. 1A-1D, if a flow node's execution result indicates that milkshakes are not in stock (e.g., 104D in FIG. 1D) the flow node asking a user whether the user would like to order milkshake (e.g., 104A) or which flavor of milkshake the user would like to order (e.g., 106A, 108A, and 110A) would be ignored, discarded, or bypassed in the flow.

In this example, the flow node 104D may be implemented as an object model having or associated with a dynamic condition of whether milkshake is in stock. This flow node 104D may further include or be associated with a plurality dynamic actions such as a success action (216A), which is executed when the dynamic condition is evaluated true (e.g., in stock), and a failure action (216A), which is executed when the dynamic condition is evaluated false (e.g., out of stock or sold out). The flow node 108A (regular vanilla or French vanilla?) may also be implemented as a dynamic application or a portion thereof and further include or be associated with a first dynamic condition that determines whether 104D has been executed, a second dynamic condition determining whether milkshake is in stock (104D), and (logical AND) a third dynamic condition determining whether a user has selected vanilla milkshake (104A).

If the dynamic conditions are evaluated true the success action(s) associated with the flow node 108A may be executed. For example, a first success action may add the selected milkshake flavor to the order; and a second success action may direct the navigation algorithm to proceed to 102C to determine whether fries are in stock. On the other hand, a failure action may be executed if the dynamic conditions in this example are evaluated false (inventory status of the milkshake is not determined yet, milkshake is out of stock at 104D, the user did not select the vanilla flavor at 104A, or one or more of the above).

In some embodiments, all of the dynamic conditions will be evaluated for a dynamic application (or a flow node in this example). In some other embodiments, depending upon the logical structure of the dynamic conditions (e.g., logical AND or logical OR), one or more dynamic conditions may be omitted. For example, in the aforementioned example where the dynamic conditions are linked with logical AND, the remaining dynamic conditions that have not been evaluated will be skipped or ignored if a dynamic condition is evaluated false. Depending on which dynamic condition is evaluated false, the flow node may further include or may be further associated with another dynamic action to instruct the navigation algorithm to redirect the flow accordingly. For example, if it is determined that the inventory status of milkshake has not yet been determined (e.g., 104D has not been executed when 104A executes), a dynamic action may redirect the navigation algorithm to proceed to 104D rather than continuing with the execution of 104A. The aforementioned dynamic examples and dynamic actions are merely provided as examples for the example flow illustrated in FIGS. 1A-1D and are thus not intended to limit other implementations of dynamic conditions and dynamic actions.

Figure 2B:
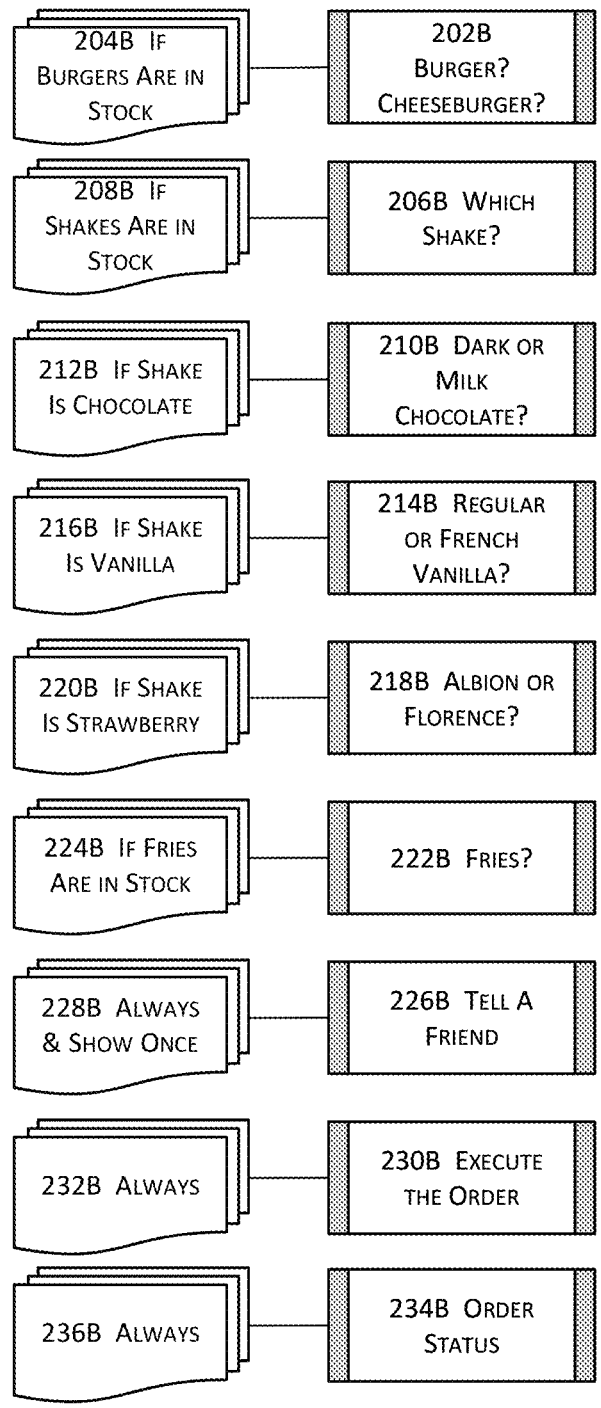
FIG. 2B illustrates some examples of individual, independent object models with respective dynamic conditions in one or more embodiments.

FIG. 2B illustrates some examples of individual, independent object models with respective dynamic conditions in one or more embodiments. More specifically, FIG. 2B illustrates some examples of some individual object models or code modules to implement the dynamic application the examples illustrated in FIGS. 1A-1D in a dynamic application. FIG. 2B may also represent a simplified example flow having the screens presented to users for ordering food items with the dynamic conditions and dynamic actions. In this example flow, the flow may proceed, for example, from the top (e.g., 202B) to the bottom (e.g., 234B) although other flow sequences may also be used. For example, a first object model 202B determining whether a user would like to order a burger or a cheeseburger may include or may be associated with a dynamic condition 204B determining whether burgers are in stock. A second object model 204B determining which flavor of milkshake a user would like to order may include or may be associated with a dynamic condition 208B determining whether milkshakes are in stock.

Moreover, a third object model 210B determining whether a user would like to order dark or milk chocolate milkshake may include or may be associated with a dynamic condition 212B determining whether the user has ordered a chocolate milkshake. A fourth object model 214B determining whether a user would like to order a regular vanilla or French vanilla milkshake may include or may be associated with a dynamic condition 216B determining whether the user has ordered a vanilla milkshake. A fifth object model 218B determining whether a user would like to order an Albion or Florence strawberry milkshake may include or may be associated with a dynamic condition 220B determining whether the user has ordered a strawberry milkshake.

A sixth object model 222B determining whether a user would like to order fries may include or may be associated with a dynamic condition 224B determining whether fries are in stock. A seventh object model 226B determining whether a user would like to tell his or her friends about his experience with the store may include or may be associated with a first dynamic condition 228B that controls that this object model 226B is always presented to users regardless of what the other flow nodes or runtime data may be as well as a second dynamic condition requiring that this object model 226B is executed and thus presented to a user only once per session.

An eighth object model 230B determining whether to place and execute the order may include or may be associated with a dynamic condition 232B that controls this object model 230B is always presented to users regardless of what the other flow nodes or runtime data may be. An ninth object model 234B presenting the status of the order may include or may be associated with a dynamic condition 236B that controls this object model 234B is always presented to users regardless of what the other flow nodes or runtime data may be. These examples illustrate some examples of dynamic conditions that may be included in or associated with a flow node (or a code module, an object model, etc.) in a dynamic application.

Although several examples described here with reference to FIG. 2B are concerning with presenting a screen to a user (in a form of a dynamic action such as a success action), much more complex dynamic conditions and dynamic actions may also be included in the example of the flow or in any other flows of dynamic software applications. Also, each flow node may be composed at runtime. Moreover, each flow node may be interpreted or executed (depending on whether the programming language used in implementing dynamic applications) at runtime. Furthermore, flow nodes may be stored in a repository (e.g., 226A in FIG. 2A) and reused in one or more other flows of the same dynamic application or in one or more other dynamic applications.

FIGS. 2C-2D jointly illustrate some code or pseudo-code for the examples of the individual, independent object models with respective dynamic conditions illustrated in FIG. 2B in one or more embodiments. More specifically, FIG. 2C illustrates an example of computer program code or pseudo code for the example illustrated in FIG. 2B. This example computer program code includes the identifications of the object models (e.g., 202B, 206B, etc.) as well as the associated or included dynamic conditions that are referenced by their synonyms or reference designators (e.g., "INSTOCK," "ALWAYS," "SHOW_ONCE", etc.) It shall be noted that the dynamic conditions and dynamic actions are presented in a single block of computer program code although a dynamic code module or dynamic condition-action pair (e.g., 202B-204B, 206B-208B, etc. in FIG. 2B) may be implemented in its own block of computer program code having its own unique identifier that may be referenced by, for example, application programming interface(s) (API (s)), function calls, etc.

Figure 2E:
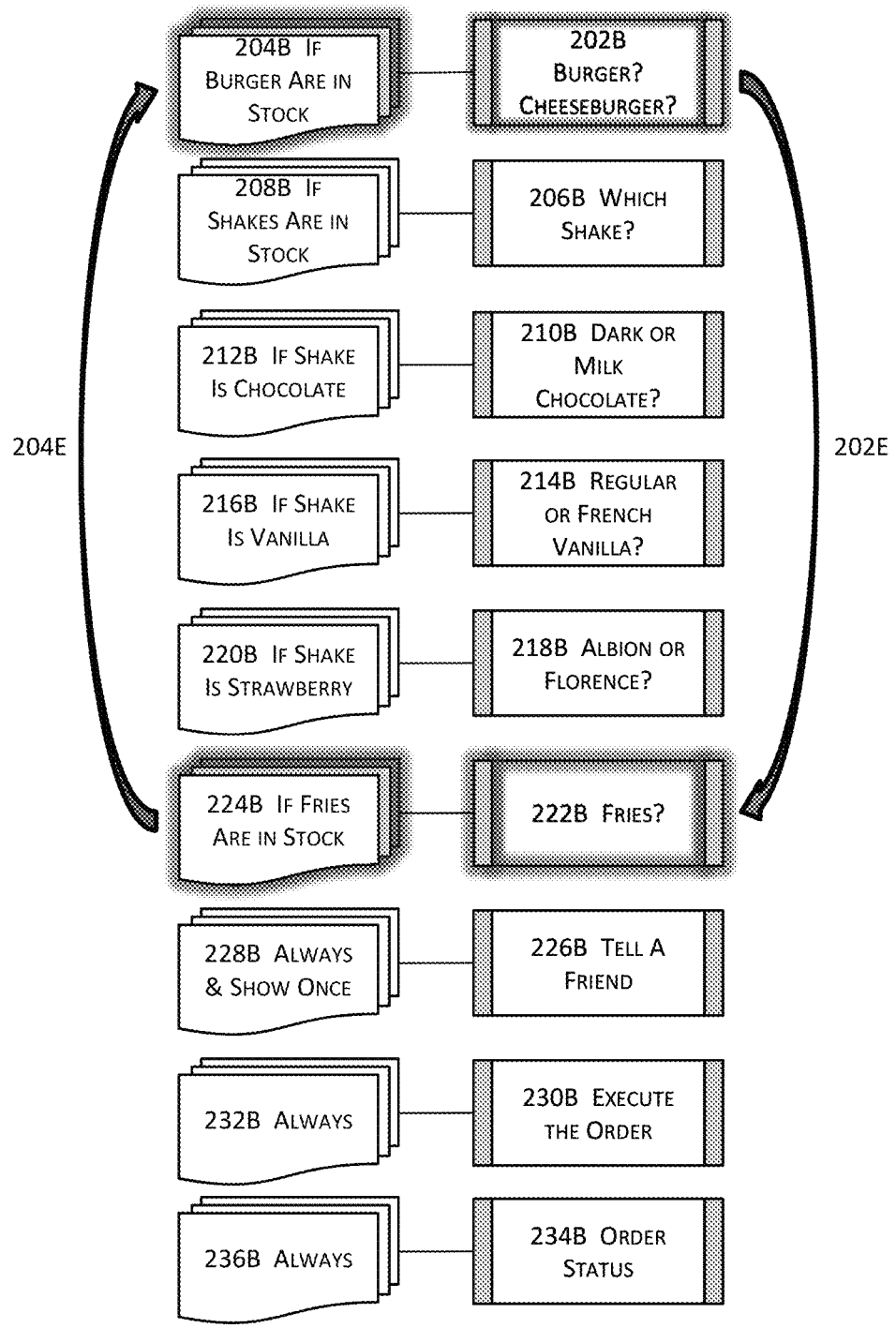
FIG. 2E illustrates an example of modifying an existing software flow by swapping the locations of two individual, independent object models with respective dynamic conditions in one or more embodiments.

FIG. 2E illustrates an example of modifying an existing software flow by swapping the locations of two individual, independent object models with respective dynamic conditions in one or more embodiments. In this example of modifying the flow illustrated in FIG. 2B, the developer intends to swap the locations (or the order of execution or screen presentations) of 202B and 222B. That is, rather than executing the object model presenting the choice between burger and cheeseburger (202B), the developer would like to first inquire into whether a user would like to order fries (222B). By swapping the dynamic actions of 202B and 222B as illustrated by the arrowhead 202E, their included or associated dynamic conditions are also swapped as illustrated by the arrowhead 204E.

Figure 2F:
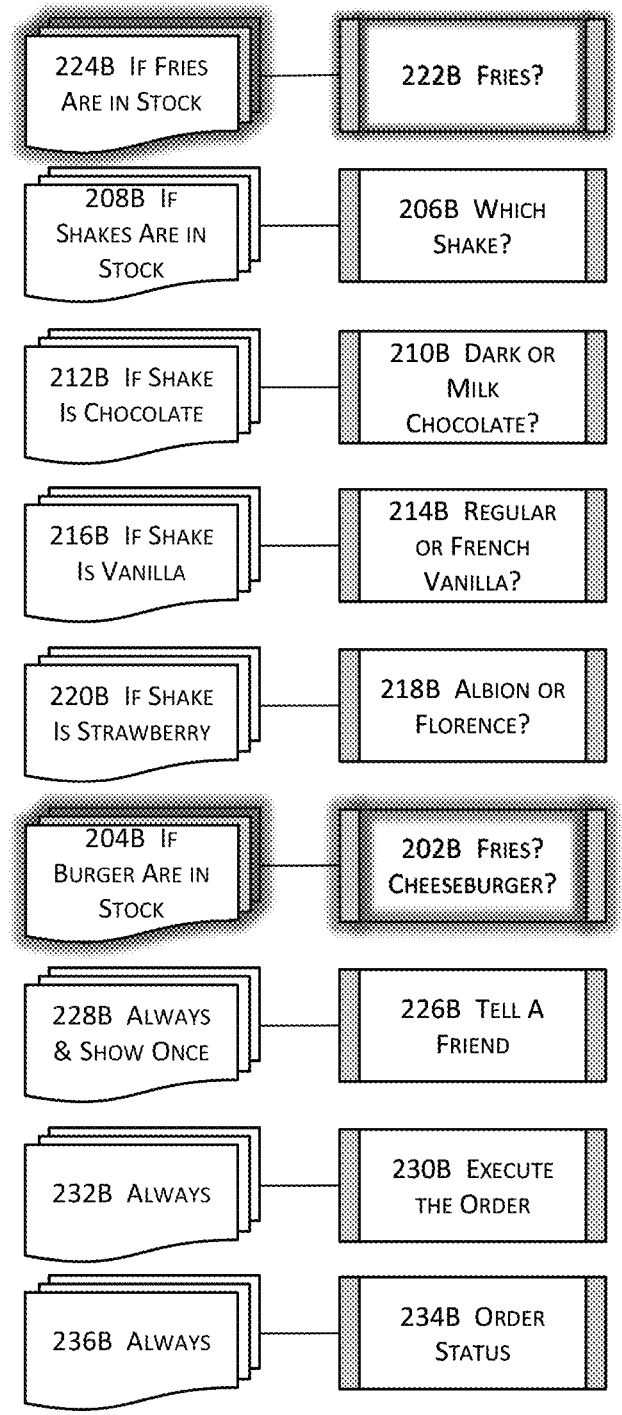
FIG. 2F illustrates the outcome of the example of modifying the existing software flow illustrated in FIG. 2E in one or more embodiments.

FIG. 2F illustrates the outcome of the example of modifying the existing software flow illustrated in FIG. 2E in one or more embodiments. More particularly, FIG. 2F illustrates the ease of modifying the sequence or order of execution of the flow of swapping two flow nodes (202B and 222B). Compared to FIG. 2E, the modified flow now illustrated in FIG. 2F shows that the locations of 202B and 222B have been swapped in the flow illustrated in FIG. 2F. FIG. 2F illustrates the ease of swapping locations of flow nodes simply by rearranging the sequence of the flow nodes. There are not edges (when viewing a flow as a graph) or connections between code modules to break; and there are no new connections or edges to re-establish. This modification may thus be implemented much more quickly to conserve computational resources due to the capability of independent execution and the incorporation of dynamic condition(s) and/or dynamic action(s) in an object model.

FIG. 2G illustrates some code or pseudo-code for the example of modifying an existing software flow illustrated in FIGS. 2E-2F in one or more embodiments. More specifically, FIG. 2G illustrates an example of computer program code or pseudo code for the example illustrated in FIG. 2F that can be implemented much more quickly due to the capability of independent execution and the incorporation of dynamic condition(s) and/or dynamic action(s) in an object model.

FIG. 2H illustrates some code or pseudo-code for implementing an object model with dynamic condition(s) and dynamic actions that may be used in the examples illustrated in FIGS. 2B, 2E, and 2F in one or more embodiments. More specifically, FIG. 2H illustrates some examples of computer program code or pseudo code for some dynamic actions that may be referenced in FIG. 2B or 2F. In these examples, the dynamic actions may include, for example, "Include" which, when executed, includes an order screen (e.g., for ordering fries) from the flow. The dynamic actions may also include "Exclude", which, when executed, excluded an order screen (e.g., for ordering fries) from the flow. The dynamic actions may also include "NoChange", which, when executed, does not change the current state of an object model.

FIG. 2I illustrates some code or pseudo-code for an example of a dynamic condition that may be used in the examples illustrated in FIGS. 2B, 2E, and 2F in one or more embodiments. More specifically, FIG. 2I illustrates some examples of computer program code or pseudo code for the "Always" dynamic condition which always present an object model (e.g., the order screen for burger or cheeseburger or the screen to ask the user to tell his or her friends) to the users.

FIG. 2J illustrates some code or pseudo-code for an example of a dynamic condition and dynamic actions that may be used in the examples illustrated in FIGS. 2B, 2E, and 2F in one or more embodiments. More specifically, FIG. 2J illustrates an example of computer program code or pseudo code for the "StateCondition" dynamic condition which, when executed, may be used to indicate a specific state of a flow or a portion thereof (e.g., a flow node) and to bind the flow or the portion thereof to the specified success dynamic action and the specified failure dynamic action.

FIG. 2K illustrates some code or pseudo-code for an example of a custom dynamic condition and dynamic actions in one or more embodiments. More specifically, FIG. 2K illustrates an example of computer program code or pseudo code for a custom dynamic condition. In this example, the custom condition constrains the dynamic actions to the specified success dynamic action ("NoChange" in this example) and the specified dynamic failure action ("failAction" in this example) between a specific time period (between 2 AM and 4 AM local time in this example).

FIG. 2L illustrates some code or pseudo-code for an example of a navigation operation interface that may be used in implementing software products or services with dynamic conditions and dynamic actions in one or more embodiments. More specifically, FIG. 2L illustrates an example of computer program code or pseudo code for a simplified navigation operation interface for controlling the flow in the examples illustrated in, for example, FIGS. 2B and 2E-2F in some embodiments.

FIG. 2M illustrates some code or pseudo-code for an example of a navigation operation that may be used in implementing software products or services with dynamic conditions and dynamic actions in one or more embodiments. More specifically, FIG. 2M illustrates an example of computer program code or pseudo code for a simplified navigation operation ("NavOperationNext" in this example) for navigating the flow to the next flow node in the examples illustrated in, for example, FIGS. 2B and 2E-2F in some embodiments.

FIG. 2N illustrates some code or pseudo-code for an example of another navigation operation that may be used in implementing software products or services with dynamic conditions and dynamic actions in one or more embodiments. More specifically, FIG. 2N illustrates an example of computer program code or pseudo code for a simplified navigation operation ("NavOperationBack" in this example) for navigating the flow to the previous flow node in the examples illustrated in, for example, FIGS. 2B and 2E-2F in some embodiments. It shall be noted that these examples illustrated in FIGS. 2L-2N may be individually implemented as separate code modules that may be referenced by a dynamic application or a portion thereof (e.g., a flow node) in some embodiments or incorporated in the dynamic application, a portion thereof, or a master navigation algorithm guiding the flow of a software application.

Figure 3:
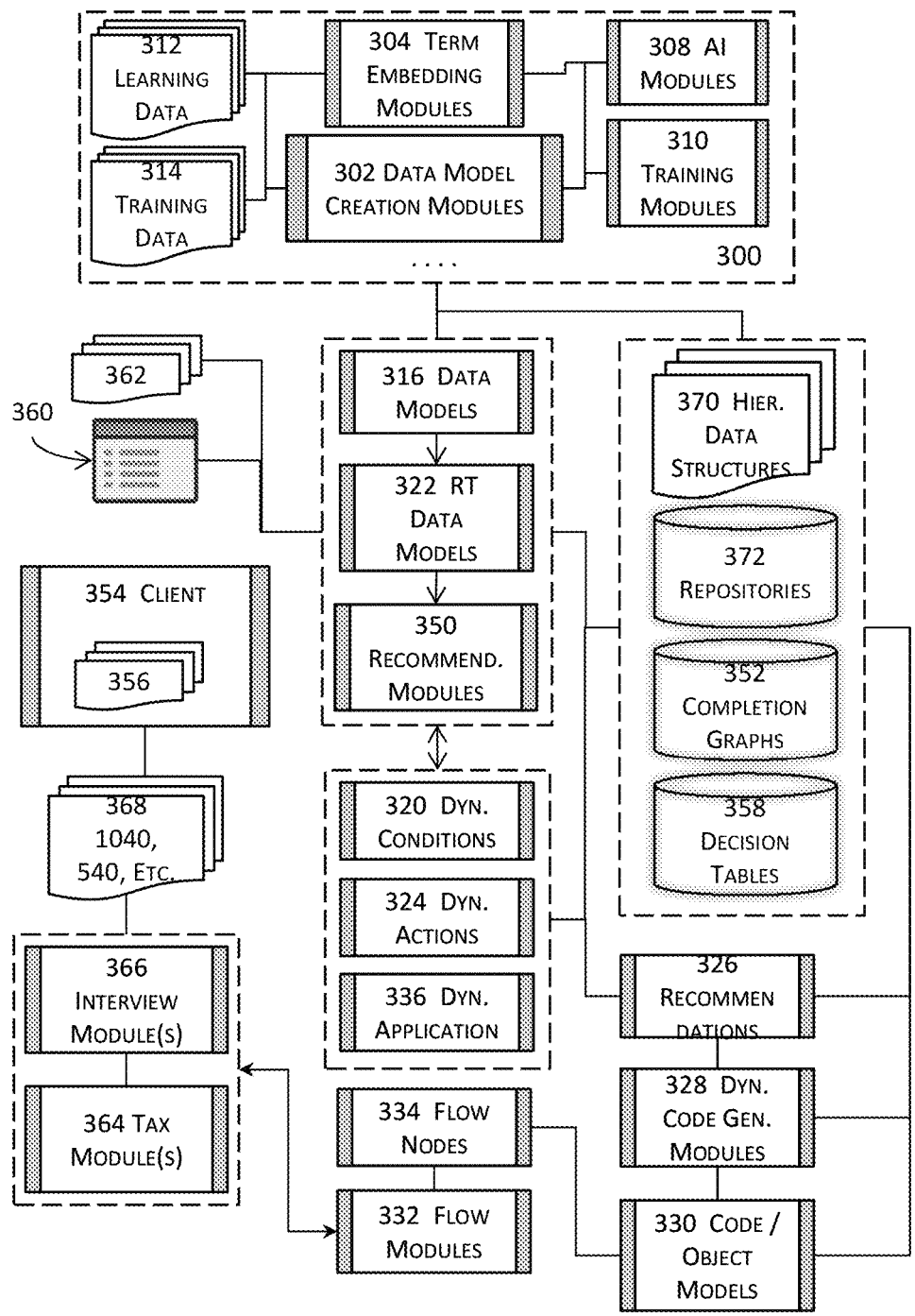
FIG. 3 illustrates a high level process or system block diagram for implementing software products or services with dynamic conditions and dynamic actions or for implementing intelligent systems with dynamic configurability in one or more embodiments.

FIG. 3 illustrates a high level process or system block diagram for implementing software products or services with dynamic conditions and dynamic actions as well as for implementing intelligent systems with dynamic configurability in one or more embodiments. At a high level, the high level block diagram illustrated in FIG. 3 includes module group 300 that use various artificial intelligence techniques to determine, for example, various data models, relevance (or irrelevance) between one data model and one or more other data models, relevance between one piece of data (e.g., a user input, an object model description, etc.) and one or more other pieces of data, relevance between one object model and one or more object models (e.g., flow nodes), or any other determinations referenced herein, etc. Some or all of the modules and data models in FIG. 3 may be collectively referred to as dynamic application modules.

A dynamic application 336 may be formed with these relevant object models 330 (e.g., a code module or an object model 330 generated by the dynamic code generation module(s) 328) or flow nodes 334 generated and/or managed by a flow module 332, wherein a flow node 334 may include or may be associated with its own dynamic condition(s) 320 and/or dynamic action(s) 324 providing independent execution capability. While the dynamic application 336 (e.g., an electronic tax return preparation and filing software application), runtime data 356 (e.g., a user's answer to an interview question) may be acquired and referenced by a data model (316 or 322) that may further determine which other data models (e.g., flow nodes) have become relevant or irrelevant based on the acquired runtime data 356. A recommendation module (e.g., 350) may recommend a recommended object model 326 (e.g., a flow node, an interview screen, etc.) to an interview module 366 that may present the recommended object model 326 to the client 354. One or more tax modules 364 may be invoked to identify relevant tax form(s) 368 or even to populate one or more entries into the one or more relevant tax forms 368.

Regarding the execution of such a dynamic application without hard coded sequences or orders for navigation, some embodiments utilize one or more completion graphs 352 and decision tables 360 to quickly determine relevant items or irrelevant items (e.g., flow nodes) to more efficiently navigate through a large number of candidate flow nodes for a dynamic software application. Some other embodiments utilize the data models (316 and/or 322) created by the module group 300 or even the module group 300 itself to quickly determine relevant items or irrelevant items (e.g., flow nodes) to more efficiently navigate through a large number of candidate flow nodes for a dynamic software application. In yet another embodiment, both the decision table(s) 360 (and/or completion graph(s) 352) and the data model(s) (316 and/or 322) or some of the module group 300 may be invoked to quickly determine relevant items or irrelevant items (e.g., flow nodes) to more efficiently navigate through a large number of candidate flow nodes for a dynamic software application.

The module group 300 may also classify an input (e.g., a piece of data, a data model, an object model, etc.) into one or more appropriate classes to determine the relevance, similarity, or closeness of this input with other similar inputs in some embodiments. In some other embodiments, the module group 300 generates one or more data models (e.g., 316, 322, etc.) that classify an input (e.g., a piece of data, a data model, an object model, etc.) into one or more appropriate classes to determine the relevance, similarity, or closeness of this input with other similar inputs in some other embodiments.

These modules in the module group 300, the data models 316, or the real-time data models 322 created by the module group may be further invoked to create or to help create one or more dynamic applications 336 each of which includes a plurality of object models so that an object model may be associated with or includes its own one or more dynamic conditions 320 and/or its own one or more dynamic actions 324. These data models 316, real-time data models 322, and/or recommendation modules 350 may further function in conjunction with other data sources 362 (e.g., prior tax returns, online resources like social media sites, third-party information from financial institutions, etc.) and one or more decision tables 360 that may be created by, for example, a data model 316 from a completion graph 352. More details about completion graphs and decision tables will be described below with reference to FIGS. 7A-7D.

A dynamic application may start execution by referencing, for example, a priority list and selection one flow node from a plurality of flow nodes in some embodiments. In these embodiments, a priority list provides general guidance to the flow sequence without hard coded "links" or "connections" between at least some of the flow nodes. For example, a priority list may simply provide the guidance as which flow nodes or which groups of flow nodes may be performed before (or after) some other flow nodes or groups of flow nodes. In some other embodiments, a dynamic application may start execution from an arbitrary flow node of the plurality of flow node. A dynamic application or a portion thereof (e.g., an included or associated dynamic action or dynamic condition) may further function in conjunction with one or more data models 316, one or more real-time data models 322, one or more recommendation modules 350, and/or even the module group 300 to generate one or more recommendations (e.g., recommended interview screen(s), recommended interview question(s), recommended flow navigation sequence, recommended flow node (s) at a particular point during the execution of a dynamic application, etc.)

These one or more recommendations 326 (e.g., the next flow node) may be identified based on, for example, the classification, clustering, or relevance determination described above based on, for example, generally applicable rules. For example, a general rule may indicate that information about the spouse of a married tax payer is also required in the tax return and may thus invoke one or more object models that ask the user to provide the information about the spouse.

In addition or in the alternative, these one or more recommendations 326 (e.g., the next flow node) may be identified based on, for example, the classification, clustering, or relevance determination described above based on, for example, information obtained from the other data sources 362. For example, information from a banking institution may indicate dividend income for a particular user to invoke the object model concerning I.R.S. Form 1099-DIV.

These one or more recommendations 326 may be forwarded to one or more dynamic code generation modules 328 to generate one or more code modules (e.g., a specific block of software program code for a particular screen to be presented in a user interface) or one or more object models 330 (e.g., a flow node such as an object model defining a specific interview screen to be presented in a user interface of a software, a specific flow node in a flow of a software application, etc.)

A code module or object model 330 generated by the one or more dynamic code generation modules 328 may be completely independent of the other code modules or object models 330 so that its execution (e.g., by evaluating a dynamic condition and performing the corresponding dynamic action(s) included or associated with the code module or object model) results in the same outcome, regardless of the location of the code module or object model in a flow.

A flow construction module (not shown) may be invoked to identify one or more such code modules and/or object models to construct flow for a software application. It shall be noted that the flow referenced herein provides a guidance for progressing through the plurality of flow nodes in a dynamic application, without hard coded navigation algorithms, state machines, or graphs to traverse. Rather, a flow node may execute independently and individually so that the outcome of the execution depends solely on the evaluation result of the one or more dynamic conditions included in or associated with the flow node that may be implemented as an object model. In terms of graph theory, a flow referenced herein includes a plurality of nodes wherein at least two nodes in such a graph are not connected by any edges (e.g., directed edges) or ordered pairs of vertices so that the flow node may be freely relocated in such a graph without affecting the outcome of the software application represented by the flow.

FIG. 3 further illustrates that one or more users or client applications 354 (e.g., an electronic tax preparation and filing software product or service) may further interact with the software product or service. More specifically, the flow or the identified flow nodes may be presented in a sequential manner that may be incrementally determined, fine-tuned, or funneled based on the runtime data 356 that is identified at runtime during the execution of the flow or the plurality of flow nodes. For example, the flow or the plurality of flow nodes may be executed in such a way and order by guiding a user through a much larger number of possible flow nodes via acquiring runtime data, performing one or more relevance analyses or classification, and incrementally eliminating irrelevant flow nodes or incrementally identifying more or most relevant flow node(s) based on the results of relevance analyses or classification runtime.

The module group 300 may include one or more data models or data model creation modules 302 that may be invoked to generate one or more data models 316 with various different techniques. The data model creation modules 302 may include or function in conjunction with, for example, one or more word embedding modules or term embedding modules 304 that apply word embedding techniques or term embedding techniques to various data and/or one or more data or recognition modules that may be a part of the one or more term embedding modules 304 and are configured or devised to identify or recognize terms in a data set (e.g., a corpus of descriptions of various entities such as object models, screens, metadata, etc.)

The word embedding or term embedding modules and/or the data modules created by the data model creation module(s) 302 are responsible for creating software application code modules (e.g., data models 316) that classify and/or cluster data such as user inputs, object model descriptions, metadata, etc. (e.g., a string of characters, word, a plurality of words, phrases, sentences, etc.) expressed in natural language in one or more data sets. Some or all of these data model creation modules may be used in tandem with one or more additional modules or data sets to generate the data models 316. These one or more additional modules or data sets may include, for example, a plurality of artificial intelligence (AI) or machine learning modules 308 providing built-in intelligence for various applications, data models, object models, etc., one or more training modules 310 for training and fine-tuning data models, object models, etc., one or more active and/or passive learning data sets 312 that may be used as inputs for the training modules 310, or one or more training or re-training data sets 314 for the training modules 310, etc. More details about the word embedding or term embedding modules are described below.

Regarding the data models 316 and the real-time data models 322, the data models 316 may include a plurality of rules, constraints, and/or requirements (hereinafter "rules" for plural or "a rule" for singular) and may be executed to classify one or more sets of data into predetermined classes in some embodiments. In some other embodiments, these data models 316 may not include any rules, yet a set of rules may nevertheless be inferred from these data models 316. For example, some data models 316 may be built upon word embedding techniques or term embedding techniques or other data classification or clustering techniques and thus does not contain any explicit rules.

In this example, various techniques described herein may nevertheless derive or infer a set of rules from these data models. These predetermined classes, rules, etc. determined by the data models 316 or the classes or classification results may be arranged and stored hierarchically in one or more hierarchical data structures 324. It shall be noted that the verbs "classify" and "cluster" as well as their corresponding variants and equivalents are used interchangeably to refer to the determination of a class or a group of similar data for a specific piece of data.

Regarding the other modules that may be invoked in a system or process for implementing software products or services with dynamic conditions and dynamic actions or for implementing intelligent systems with dynamic configurability, the module 300 may also interact with various data structures including, for example, one or more hierarchical data structures 370, one or more repositories 372, one or more completion graphs 352, and/or one or more decision tables 358, etc. These one or more hierarchical data structures 324 may be further arranged to include or correspond to an index data structure that may be further used to skip a portion of the rules or a portion of the classes during classification, determination of recommendations, etc. in order to facilitate and expedite the manipulation (e.g., access, retrieval, storage, etc.) of these classes and/or rules.

These one or more data models 316 may be provided to a converter (not shown) as an input for the converter 320 to generate a corresponding real-time data model 322 in a selectable or configurable target programming language. In some embodiments, each pair of a data model (316) in a source programming language and a real-time data model (322) in a target programming language may correspond to a converter. In some other embodiments, a converter may be used to transform a plurality of pairs of data models 316 and real-time data models 322, especially in the cases where the source programming languages and/or the target programming languages have certain degree of similarity or commonality.

The real-time data models 322 may be deployed to a server for execution on the server in some embodiments or to individual user computing systems for execution on these individual user computing systems in some other embodiments. For example, a data model 316 generated by a plurality of AI (artificial intelligence) or machine learning modules 308A may be transformed by a converter into a real-time data model in an interpretive language (e.g., JavaScript, etc.), and this real-time data model 322 may then be deployed to client computing systems, rather than on one or more remote servers or host computers, for local execution of the real-time data model 322 by the browsers on the client computing systems to classify terms entered into the browser by the end users during the sessions of a software licensing or delivery model (e.g., an electronic tax return preparation software licensing or delivery model).

The real-time data models 322 may also be operatively connected to one or more recommendation modules 350 that determine and furnish one or more recommendations to the inquiring users based in part or in whole upon the results of the real-time data models 322. One of the advantages of these real-time data models 322 is that these real-time data models are constructed with reactive computing techniques or real-time computing techniques so that these transformed data models may classify and cluster live, real-time data (e.g., runtime data 356) at runtime and return recommended actions in real-time or substantially real-time, instead of in a batch mode processing as conventional approaches often employ.

During the interactions between a plurality of users and a software application, these users may often encounter issues and thus submit runtime data 356 (e.g., inquiries, users provided answers to interview questions, etc.) that may be digitally transmitted to, for example, one or more data models 316, one or more real-time data models 322, and/or one or more word or term embedding modules 304. Such runtime data may be classified, or the relevance of such runtime data may be determined. Based on the classification results and/or the relevance, a recommendation 326 may be generated by, for example a recommendation module 350. A recommendation may be referred to as an action and may also be efficiently stored in a repository 326 (e.g., an action repository) that may further include or correspond to a link structure that delineates the association or links between an action stored in the action repository 372 and one or more classes associated with the action.

A system thus illustrated in FIG. 3 may be used to generate data models for classifying or clustering data in a large corpus (e.g., descriptions of various object models, data models, data items, etc.), transforming the generated data models into classifying or clustering code modules in various configurable programming languages, determining relevance or irrelevance of one or more entities (e.g., flow nodes, object models, etc.) with these generated data models based on some runtime data that may be incrementally acquired during the execution of an application, and generating one or more recommendations to the users or to the system (e.g., recommended next flow node, recommendations to the users, etc.) These data models may be constructed in such a way to provide fast and accurate prediction and description of the data in the corpus as well as data that are not contained in the corpus. These data models (316 and/or 322) or at least some of the modules in the module group 300 may then be used to determine relevant object models for a dynamic application and further function in conjunction with one or more other modules described herein to more efficiently guide the flow of execution of a dynamic application based on runtime data acquired during the execution of the dynamic application.

Some embodiments described herein perform various tasks comprising classification, determination, and presentation of recommendations, etc. in real-time (RT) or nearly real-time (NRT). It shall be noted that the term "real-time" does not necessarily refer to generating instantaneous responses and may refer to the scenarios that include a brief time delay introduced by, for example, data transmission, executions of instructions by various processors (e.g., central processing units, graphic processors, etc.), etc. Nonetheless, these real-time data models guarantee the responses within a pre-specified temporal constraint or timeframe (e.g., in the order of one millisecond, one microsecond, or less).

Nearly real-time refers to the amount of temporal delay introduced by these modules and/or models described herein between the occurrence of an event (e.g., the receipt of a user inquiry) and the completion of processing (e.g., presentation of a recommended action in a user interface) is insignificant or within a relatively small threshold limit. The amount of temporal delay in nearly real-time is slightly larger than that in real-time although either approach guarantees that the temporal delay is not greater than a corresponding temporal constraint or timeframe.

In other words, a real-time data model receives an input data, processes the input data to generate a result, and returns the result within the pre-specified, guaranteed temporal constraint or timeframe where missing a temporal constraint or timeframe may either downgrade the service of the real-time data model or even cause a system error or failure in some embodiments. In some other embodiments, infrequently missing the temporal constraint or timeframe may be tolerated, especially in the scenarios involving terms that cannot be successfully clustered or classified.

A real-time data model (322) may be stored on a user's computing device or communication device (e.g., laptops, smart phones, tablets, etc.) and executed locally to perform real-time clustering or classification of data entered by the user in some embodiments. In some other embodiments, a transformed data model may be stored on a remote computing node (e.g., a server) on which a subscribed or hosted software application runs. In these latter embodiments, the remote computing node receives inquiries from user computing nodes that are connected to the remote computing node via computing networks, processes the inquiries by executing the transformed real-time data model, and returns the processing result to the requesting user computing nodes in real-time.

As a simplified example with reference to FIG. 1A, an initial screen 102A may be presented to and ask a user whether the user would like to order a chocolate, vanilla, or strawberry milkshake. The user may select, for example, a strawberry milkshake. This user's input is regarded as the runtime data that is acquired during the execution of the software application. This piece of runtime data may then be provided to a data model (316) or a real-time data model (322) that may, for example, reference a decision table listing whether a set of rules apply to a set of questions, each of which may be the subject of a screen that may be further deemed as an object model.

The data model (316 or 322) may determine, based on this runtime data (user's selection of a strawberry milkshake), which other flow nodes (e.g., subsequent screens with corresponding questions) are still applicable. For example, the data model may identify that flow node 110A is relevant based on the relevance analyses performed on the description of various flow nodes in some embodiments. In addition or in the alternative, the data model may determine that flow nodes 106A and 108A are irrelevant based on this piece of runtime data (user's selection of a strawberry milkshake) and scratch these two flow nodes from the flow so that the data model or the other modules no longer need to consider these two flow nodes in the remainder of the execution. More details about the operations of various modules described above are described in the remaining portion of this application.

Figure 4A:
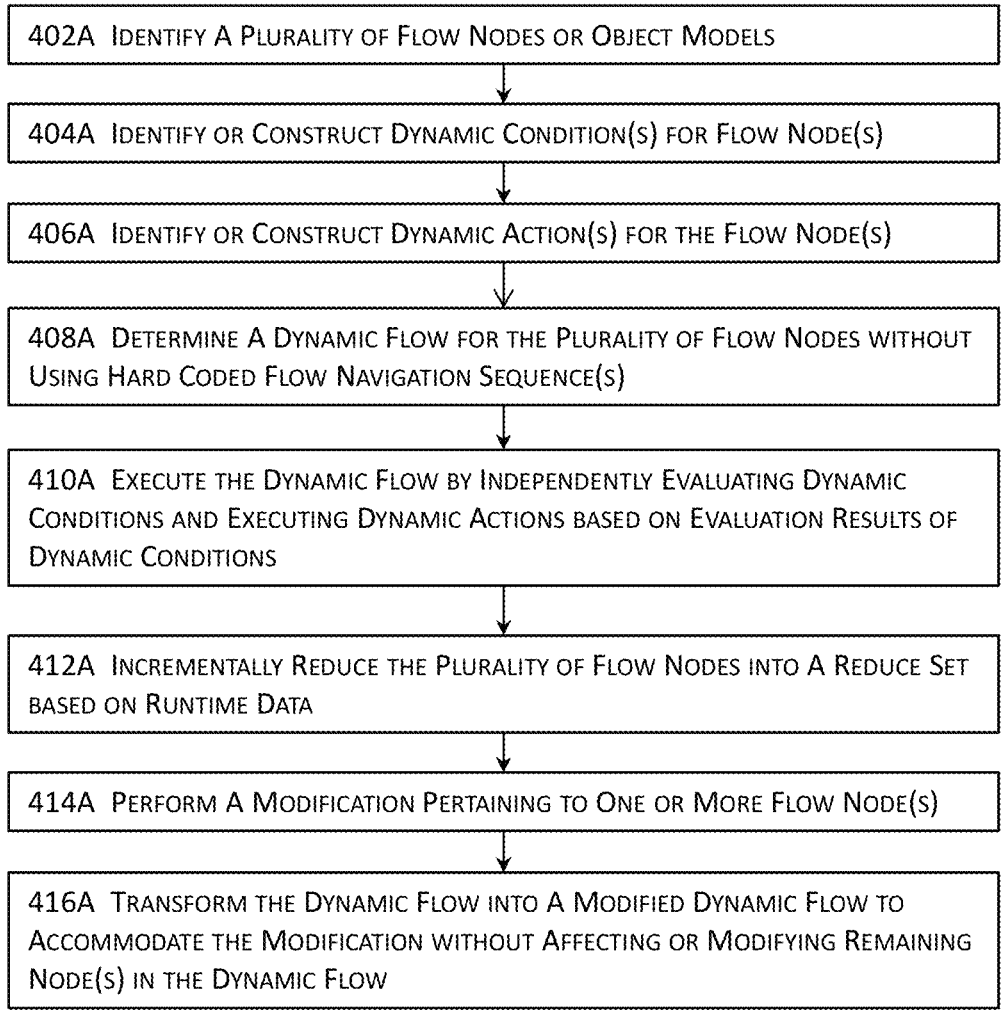
FIG. 4A illustrates a high level block diagram for implementing software products or services with dynamic conditions and dynamic actions in one or more embodiments.

FIG. 4A illustrates a high level block diagram for implementing software products or services with dynamic conditions and dynamic actions in one or more embodiments. In these embodiments, a plurality of flow nodes, object models, or code modules may be identified at 402A. These plurality of flow nodes may be identified based on, for example, various requirements or intended functions or purposes of an underlying dynamic software application of a portion thereof. For example, a plurality of interview screens, each of which may include or may be implemented as an object model concerning one or more interview questions, may be identified for a dynamic interview module of an electronic tax return preparation and filing software product or service.

It shall be noted that the terms "flow node," "object model," and "code module" may be used interchangeably in this application to represent a block of computer program code in various suitable forms to facilitate the execution of the underlying software application. An object model thus may include or may be associated with its own one or more dynamic conditions and/or one or more dynamic actions to provide the capability of individual, self-contained, and/or independent execution and thus facilitate the ease of modification of the dynamic software application of which the object model is a part.

One or more dynamic conditions may be optionally identified (if already existing) from a condition repository (e.g., 372 in FIG. 3) or determined (if non-existing) at 404A for at least one object model of the plurality of object models identified at 402A. A dynamic condition may include a stand-alone code module with a unique identifier to be referenced by or incorporated into an object model in some embodiments. In some other embodiments, a dynamic condition may be incorporated into an object model directly. Optionally, one or more dynamic actions may also be identified (if already existing) from an action repository (e.g., 372 in FIG. 3) or determined (if non-existing) at 406A for at least one object model of the plurality of object models identified at 402A. An object model may include one or more dynamic conditions alone, one or more dynamic actions alone, or a combination of one or more dynamic conditions and one or more dynamic actions.

A dynamic flow for a dynamic software application may be determined at 408A with the plurality of flow nodes, without hard coded inter-relations or inter-dependencies between at least two flow nodes of the plurality of flow nodes. In some embodiments, none of the plurality of flow nodes correspond to any hard coded navigation or execution algorithm of any forms. The at least two flow nodes can be independently executed in any order without altering the final outcome of the dynamic flow in some embodiments. The dynamic flow may be executed at 410A by independently executing one or more flow nodes in the dynamic flow. In some embodiments, the dynamic flow may be executed by executing any flow node in the plurality of flow nodes when the plurality of flow nodes are independent of each other. A flow node may be devised to terminate or exit its execution when, for example, a dynamic condition cannot be evaluated at the time of execution. For example, if the regular vanilla or French vanilla screen (108A in FIG. 1A) is executed first or before the screen 104A is executed, the flow node 108A may exit or terminate execution and call the flow control or execution module to identify another flow node for execution.

Of course, the aforementioned example of executing the flow node 108A first or before the execution of 104A is to demonstrate the flexibility of the dynamic software application. To improve the efficiency and conserve computational resources, a dynamic flow may be executed based on the general applicability that may be determined for the plurality of flow nodes. For example, the word embedding or term embedding module 304 may determine the relevance or classifications among the plurality of flow nodes by analyzing their respective descriptions or metadata with word or term embedding techniques. The applicability or relevance of the plurality of flow nodes with respect to other characteristics may also be similarly determined. In an example of interview screens, for example, the relevance of each interview screen to users may be determined similarly. For example, it may be determined that the interview screen inquiring whether a user is married is relevant to most, if not all users, and may thus be assessed with a higher general applicability score, and the plurality of flow nodes may thus be ranked accordingly.

In some of these embodiments, the first flow node or the first few flow nodes for a dynamic flow may be identified based on such general applicability scores so that the dynamic flow initiates its execution with a flow node having higher or even the highest general applicability scores. If two or more flow nodes are assessed with the same, highest general applicability score, any of these two or more flow nodes may be identified to initiate the dynamic flow execution in some embodiments. In some other embodiments, a tie breaker among these two or more flow nodes may be determined by, for example, which flow node's execution result further curtails or filters out more flow nodes from further consideration.

For example, a flow node whose execution result is determined to reduce the extent of the state space of the remaining flow nodes may be identified from multiple flow nodes having the same general applicability. Of course, general applicability score is just one way to determine where to start the flow execution, and other criteria or factors may also be used. This general applicability or such other criteria or factors may be referenced or included in, for example, a priority list described above or may be provided as an input to a data model (316 or 322) or a navigation model that identifies flow nodes for execution in conjunction with the functioning of one or more other modules (e.g., a data model that manipulates the decision table based on runtime data).

In some embodiments, a flow node may be executed by evaluating the one or more dynamic conditions, if available and included in or associated with the flow node, and by executing the dynamic action corresponding to the evaluation result of the one or more dynamic conditions, if the flow node includes or is associated with such one or more dynamic actions. The plurality of flow nodes or the remainder thereof may thus be incrementally reduced at 412A into a reduced set of flow nodes based at least in part upon some runtime data obtained during the execution of the dynamic flow. In some embodiments where additional runtime data is acquired during or after the execution of the flow node, the plurality of flow nodes or the remainder thereof may be reduced into the reduced set based at least in part upon the runtime data.

In some of these embodiments illustrated in FIG. 4A, a modification to the dynamic flow may be optionally performed at 414A. Modifications to a flow may include, for example, adding one or more flow nodes into the dynamic flow, removing one or more flow nodes from the dynamic flow, or changing the location of a flow node in the dynamic flow. The dynamic flow may then be transformed into a modified dynamic flow at 416A to accommodate the modification performed at 414A, without affecting or modifying the other flow nodes that are not affected by the modification in the dynamic flow. That is, the modification may be implemented in such a way to exert minimal or even no impact on a dynamic flow due to the independent execution of at least one flow node that is not hard coded with any inter-relation or inter-dependency in the dynamic flow or elsewhere (e.g., in a navigation algorithm, flow control, etc.)

Figure 4B:
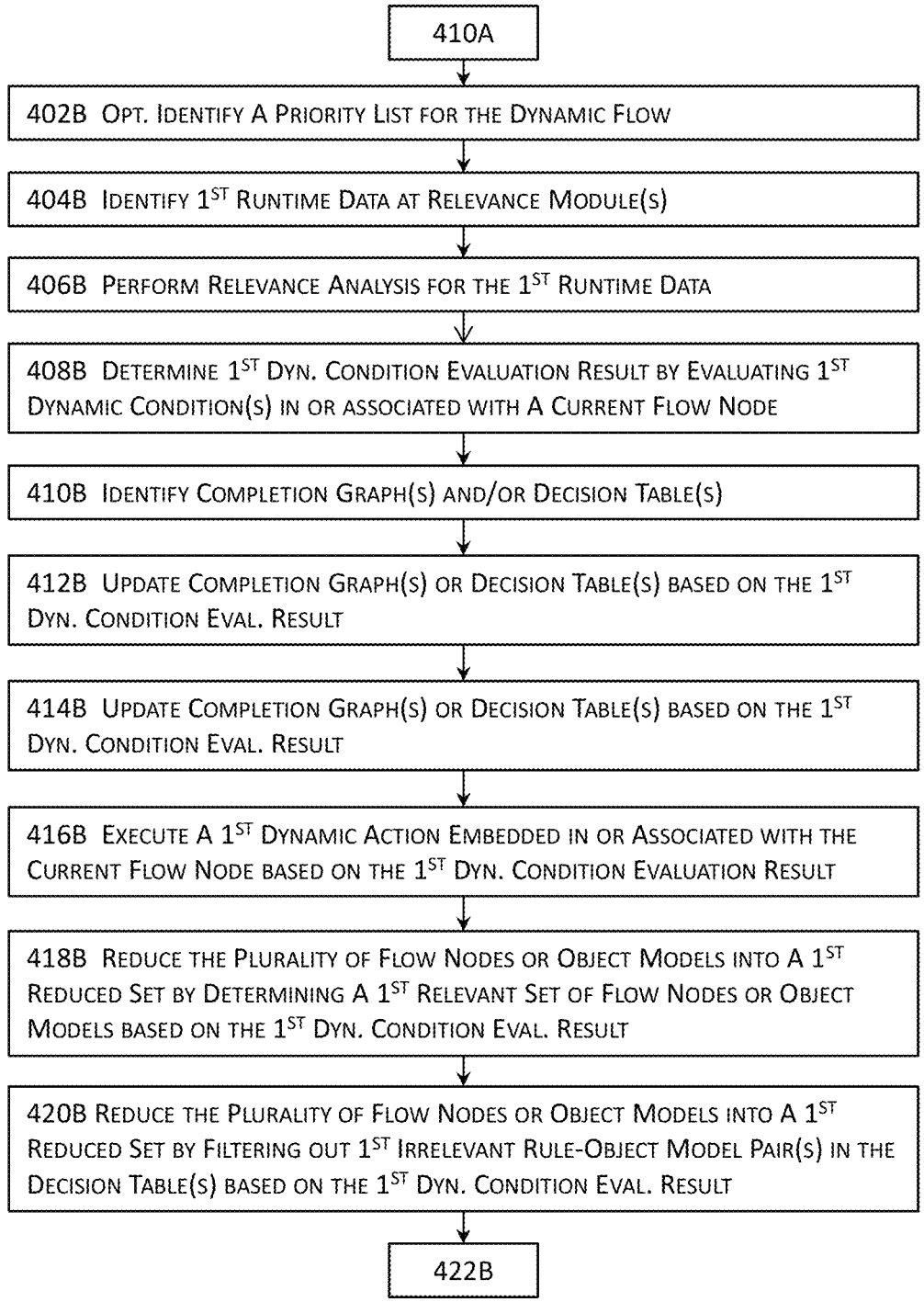
FIGS. 4B-4C illustrate more details about a portion of the high level block diagram illustrated in FIG. 4A in one or more embodiments.
Figure 4C:
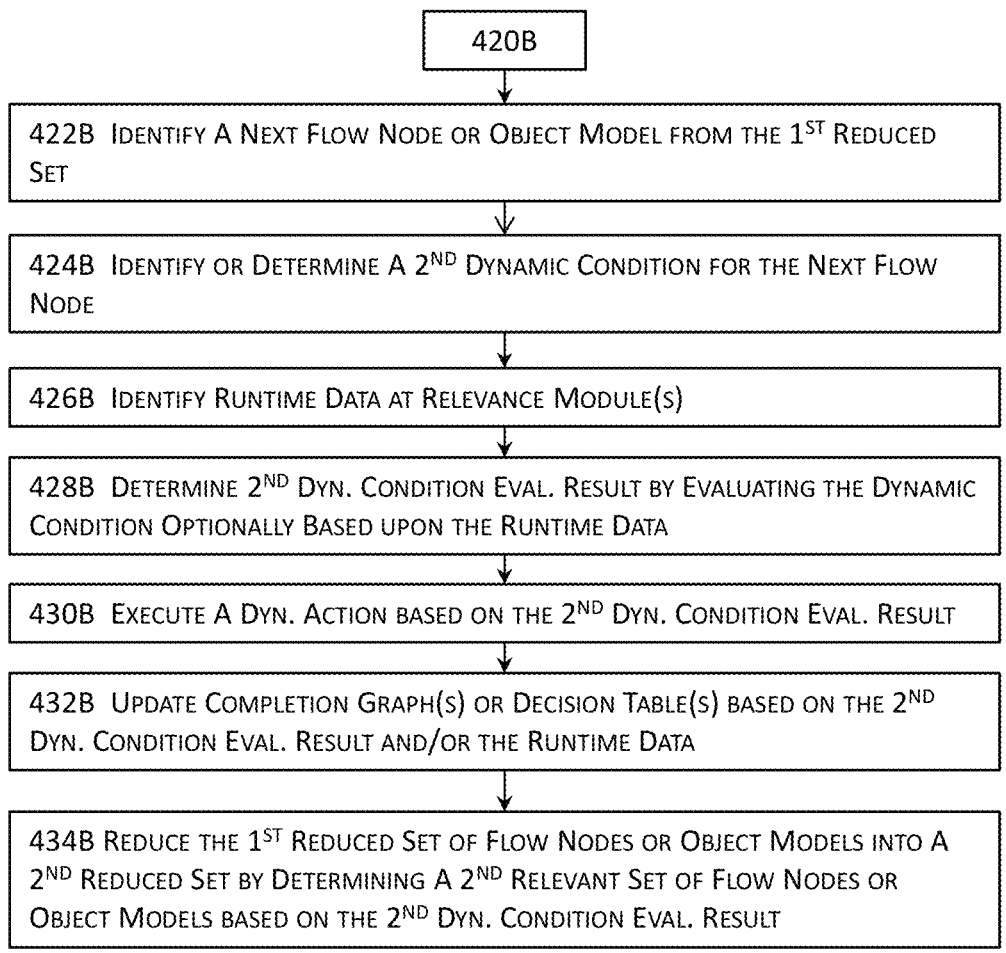

FIGS. 4B-4C illustrate more details about a portion of the high level block diagram illustrated in FIG. 4A in one or more embodiments. More specifically, FIGS. 4B-4C illustrate more details about executing a dynamic flow at 410A in FIG. 4A. It shall be noted that the execution of a dynamic flow illustrated in FIGS. 4B-4C may or may not necessarily start from the beginning. That is, the following description applies to the flow execution that starts from the beginning when the dynamic flow is first initialized or from an intermediate stage where the dynamic flow has started execution and proceeded through one or more flow nodes. In these embodiments, a priority list may be optionally identified at 402B. A priority list may provide, for example, some general guidance as to which flow nodes or which groups of flow nodes may be performed before (or after) some other flow nodes or groups of flow nodes. A priority may also include some rules indicating flow nodes having one or more characteristics (e.g., higher general applicability) may be executed before other flow nodes. Nonetheless, a priority list does not indicate a fixed sequence or order from one flow node to a specific next flow node in the plurality of flow nodes.

First runtime data may be identified 404B at a relevance module such as a data model (316 or 322 of FIG. 3). The first runtime data may include, for example, information or data provided by a user during runtime. For example, a user may provide an input (e.g., an answer to an interview screen); and the input provided by the user may be identified as the first runtime data. One or more relevance analyses may be performed for the first runtime data at 406B. These one or more relevance analyses determine which flow nodes are relevant and/or which flow nodes are irrelevant based at least in part upon the execution results of the previous flow node and/or the runtime data, if available. More details about relevant analyses at 406B are described below with reference to FIGS. 5A-5G.

A first dynamic condition evaluation result may be determined at 408B at least by evaluating one or more first dynamic conditions included in or associated with the current flow node that is executing. In some embodiments, one or more completion graphs and/or one or more decision tables may be optionally identified at 410B. As described above, some embodiments determine relevant flow nodes and/or irrelevant flow nodes in the remaining flow nodes of the plurality of flow nodes by using one or more data models that operate upon one or more completion graphs and/or one or more decision tables that may be derived from the one or more completion graphs. Some other embodiments may determine relevant flow nodes and/or irrelevant flow nodes by using one or more data models (e.g., 316 and/or 322) that apply word embedding or term embedding techniques to, for example, the descriptions, metadata, etc. of the plurality of flow nodes. Therefore, 410B is performed when one or more data models reference such completion graphs and/or decision tables in determining relevant and/or irrelevant flow nodes.

The one or more completion graphs and/or the one or more may be updated at 4146 based at least in part upon the evaluation results of the one or more first dynamic conditions generated at 408B. In the example illustrates in FIG. 1A, if the execution results of 104A is that a user selects chocolate milk shake, the entries corresponding to 108A (regular vanilla or French vanilla) and 110A (Albion or Florence strawberry) may be labeled as irrelevant for the remainder of the dynamic flow.

If the currently executing flow node is associated with or includes one or more dynamic actions, at least one of the one or more dynamic actions corresponding to the evaluation results of the one or more dynamic conditions is executed at 416B. For example, if a dynamic condition is evaluated to be false, the failure dynamic action corresponding to this dynamic condition is executed at 416B. On the other hand, if a dynamic condition is evaluated to be true, the success dynamic action corresponding to this dynamic condition is executed at 416B.

The plurality of flow nodes or the remainder thereof may be reduced into a first reduced set at 418B at least by determining a first relevant set of flow nodes that has been determined to be relevant to the currently executing, next flow node based in part or in whole upon the evaluation of the one or more dynamic conditions. In addition or in the alternative, the plurality of flow nodes or the remainder thereof may be reduced at 420B into the first reduced set at least by discarding, ignoring, or filtering out one or more irrelevant flow nodes that have been determined to be irrelevant to the currently executing, next flow node based in part or in whole upon the evaluation of the one or more dynamic conditions. Once a flow node is discarded, ignored, or filtered out, the included or associated dynamic conditions will no longer be evaluated, and the included or associated dynamic actions will not be executed in some embodiments, unless a dynamic action is labeled as always executed.

A next flow node may be identified at 422B from the first reduced set. In some embodiments, a next flow node may be identified based at least in part upon the execution of the previous flow node. For example, a flow node that is identified to be closest to the previous flow node may be identified at 422B. The closeness between two flow nodes may be determined by, for example, applying the word embedding or term embedding techniques to the descriptions, metadata, or any other available information, etc. of or associated with these two flow nodes. For example, a word or term embedding module may determine the vector representations of the descriptions of various flow nodes including the previous flow node.

Taking an electronic tax return preparation and filing software application delivery model as an example of the application of word or embedding techniques, a developer accessing an electronic tax return preparation and filing software application delivery model may provide various pieces of information in the form of natural language via an input device (e.g., a keyboard, a microphone, etc.) of a computing device.

The electronic tax return preparation and filing software application delivery model may be a standalone installation that locally executes on the computer in some embodiments. In some other embodiments, the electronic tax return preparation and filing software application delivery model may be hosted on a remote computer, on an Internet-based computing environment providing shared computer processing resources and data to computers and other devices on demand (e.g., in a cloud computing environment) for a plurality of developers working toward a release of the software application. In these latter embodiments, the developer may access the electronic tax return preparation and filing software application delivery model during various stages of a release via, for example, a browser on a developer computing device operatively connected to the remote host via a computer network component.

A developer for the electronic tax return preparation and filing software application delivery model may be operating on or connected to a computing system that includes or operatively connects to one or more word embedding or term embedding modules. This computing system may be the computing device when the electronic tax return preparation and filing software application delivery model is a standalone installation. The word embedding or term embedding modules included or associated with the computer may perform various word embedding or term embedding processes on various inputs in the form of a natural language, free text, or one or more computer programming languages (e.g., source code, description of an object model or a code module, metadata, header information, release notes, etc.) for the electronic tax return preparation and filing software application delivery model. These inputs may be provided by a plurality of developers developing the electronic tax return preparation and filing software application delivery model.

These word embedding or term embedding processes may include, for example, normalization of the inputs into normalized tokens such as characters, words, phrase, sentences, or even documents. These normalized tokens may be further embedded into a vector space. More specifically, one or more word embedding or term embedding processes may transform these normalized tokens into corresponding vector representations where closer vector representations correspond to more similar normalized tokens and hence more similar inputs.

These word embedding or term embedding modules may further classify the inputs into a plurality of clusters. These classification processes may be performed independently of each other or in a hierarchical manner. In the aforementioned examples, the business clusters and expense categories may be performed independently of one another to determine the clusters for a plurality of developers in some embodiments.

In some other embodiments, such clustering may be performed in a hierarchical, multi-stage manner where a plurality of descriptions of businesses or professions may be first clustered into a plurality of business clusters.

The normalization, vectorization, and clustering processes may be performed offline in some embodiments due to the vast amount of natural language inputs to process and thus may not be suitable for storage or processing on a developer computing device. The results of the normalization, vectorization, and clustering processes may nevertheless be stored locally on a developer's computing device in some embodiments. In some other embodiments, the results of the normalization, vectorization, and clustering may be stored remotely (e.g., on a computer server hosting the portal) for developer computing devices to access via one or more computer networks.

With these vector representations determined, these processing results of the one or more word embedding or term embedding modules may be further utilized by a software application licensing or delivery model. In the aforementioned example involving tax returns, a specific developer may access an electronic tax return preparation and filing software application delivery model and submit a particular input via an input device (e.g., a computer mouse, a touch interface, a virtual or physical keyboard, a microphone, etc.) of the computing device.

This specific input may be similarly processed by one or more word embedding or term embedding modules that execute locally in a standalone installation or remotely in a hosted or cloud environment. For example, this specific input may be normalized into normalized description which may be further transformed into a specific vector representation in the same vector space that now includes the specific vector representation with other vector representations for the descriptions from a plurality of developers of the electronic tax return preparation and filing software application licensing or delivery model. This specific input of the specific developer may then be classified into one or more classes. One or more actions (in one or more classes) corresponding to these one or more classes may also be identified. These one or more actions may include, for example, the action that are associated with the one or more classes.

At least one of these one or more actions may be presented to the specific developer in a variety of different manners such as a corresponding screen or link in the portal. A more complex, automated task such as initiating one or more modules in response to the at least one action may also be constructed for the specific developer. Because these one or more actions are identified from one or more classes to which the specific developer is determined to belong based on the specific input provided by the specific developer, these one or more actions may thus represent recommended actions or candidate actions in response to the specific input submitted by the specific developer. If the specific developer also provides additional inputs, these additional natural language inputs may also be similarly normalized, vectorized, and clustered. A data model may then classify the specific inquiry while referencing these additional inputs as described above.

The flow node whose vector representation is determined to be closest to that of the previous flow node may be identified as the next flow node for execution in some embodiments. In some of these embodiments where two or more flow nodes whose vector representations are determined to be equidistant to that of the previous flow node, or whose vector representations are determined to be within certain proximity of the vector representation of the previous flow node, a tie break may be determined among these flow nodes based on one or more criteria. For example, the flow node which, when executed, causes the most number of remaining flow nodes, provides least restrictions or constraints to the remainder of the dynamic flow, provides the maximum flexibility to the identification of subsequent flow nodes, or best facilitates the designed purposes or functions of the dynamic software application may be identified as the next flow node at 422B.

One or more second dynamic conditions may be identified (if already existing) or determined (if not yet existing) at 424B for the next flow node. In some embodiments, a custom dynamic condition may be generated for these one or more second dynamic conditions. In some of these embodiments, such custom dynamic conditions may even be generated on the fly during the execution of the flow when the situation merits the generation of such custom dynamic conditions. For example, if an artificial intelligence module or a machine learning module determines that during the execution of a flow node, an additional dynamic condition and hence the corresponding success dynamic action and the failure dynamic action need to be generated to better facilitate the functions of the dynamic application or to better serve the user's experience or inquiries, a dynamic code generation module may be invoked via an inter-process function call to dynamically create such dynamic condition and actions.

Runtime data may further be identified at 426B during or after the execution of the previous flow node. For example, a user may provide additional inputs (e.g., an additional answer to a new interview question presented in the previous flow node), and these addition inputs may be identified as runtime data at 426B. This runtime data may be analyzed by one or more data models and/or the word embedding or term embedding modules to determine its relevance to or impact on one or more remaining flow nodes.

A second evaluation result may be determined at 428B at least by evaluating the one or more second dynamic conditions. In some embodiments, the second evaluation result may be determined based upon the runtime data identified at 426B when the runtime data is determined to be relevant to the currently executing flow node or the one or more second dynamic conditions.

A dynamic action corresponding to the second evaluation result may be executed at 430B. For example, if a second dynamic condition is evaluated to be false, the failure dynamic action corresponding to this dynamic condition is executed at 430B. On the other hand, if a second dynamic condition is evaluated to be true, the success dynamic action corresponding to this dynamic condition is executed at 430B.

The one or more completion graphs and/or the one or more decision tables may be updated at 432B in an identical or substantially similar manner as that described at 414B. In some embodiments, one or more completion graphs and/or the one or more decision tables may be updated at 432B based in part or in whole upon the execution result of the next flow node and/or the second evaluation result. In addition or in the alternative, these one or more completion graphs and/or the one or more decision tables may be updated at 432B based in part or in whole upon the runtime data identified at 426B. In the example described with reference to 414B above, if the execution result of the next flow node is that the fries are not in stock ("false" for 102C), then the entries corresponding to 112A (asking a user whether the user would like to order fries) will be discarded, ignored, or filtered out in the one or more completion graphs or one or more decision tables.

The first reduced set may be reduced at 434B into a second reduced set at least by determining a second relevant set of flow nodes based in part or in whole on the execution result of the next flow node and/or the second evaluation result of the one or more second dynamic conditions. In addition or in the alternative, the first reduced set may be reduced at 434B into a second reduced set at least by discarding, ignoring, or filtering out one or more flow nodes that have been determined to be irrelevant based in part or in whole on the execution result of the next flow node and/or the second evaluation result of the one or more second dynamic conditions.

Figure 5A:
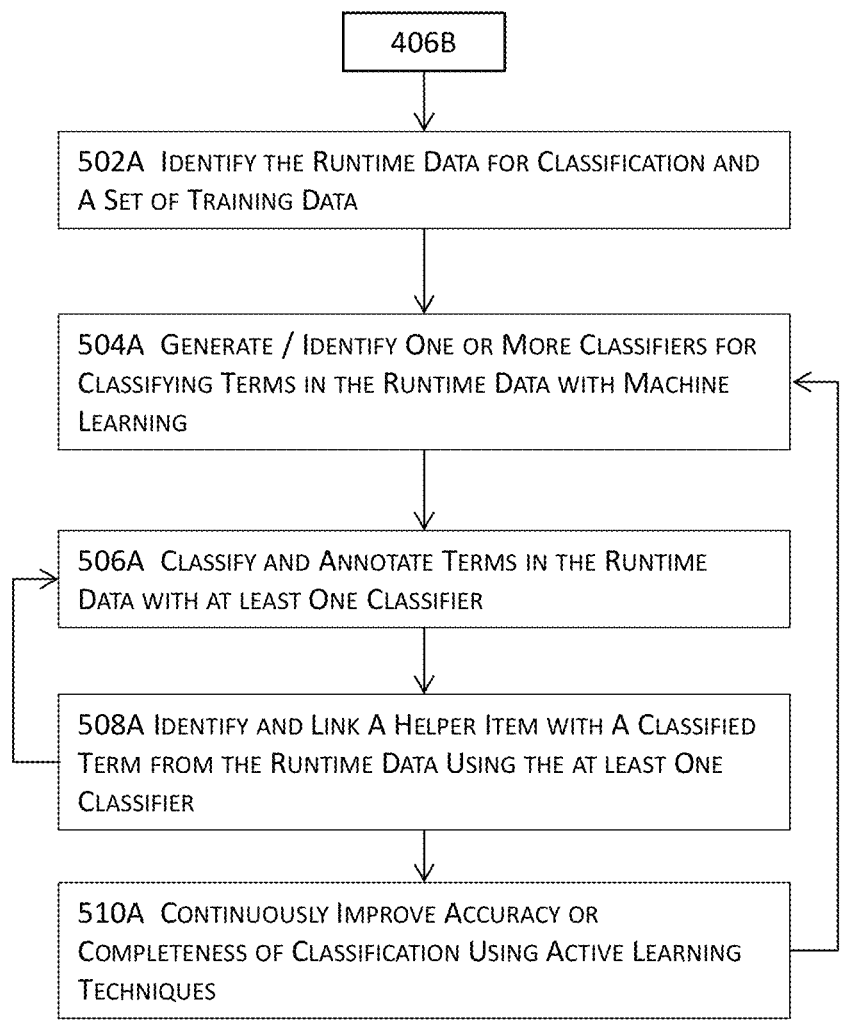
FIG. 5A illustrates more details about a portion of the block diagram illustrated in FIG. 4B in one or more embodiments.

FIG. 5A illustrates more details about a portion of the block diagram illustrated in FIG. 4B in one or more embodiments. More specifically, FIG. 5A illustrates more details about performing one or more relevance analyses at 406B in FIG. 4B. In some embodiments, a set of digital contents may be identified at 502A for a software application licensing or delivery model. In some of these embodiments, a set of training data may also be identified at 502A. This set of training data may be used to train one or more machine learning modules prior to employing these one or more machine learning modules to process the set of digital contents. The software model may include a software application or suite hosted on a remote server or in a cloud-based or Internet-based platform, a software application or suite separately and independently installed on a computing system (e.g., a client computing system), or a software model that is centrally hosted and licensed on a subscription basis such as a software as a service (SaaS). The set of digital contents may include unlabeled digital data, labeled digital data, partially labeled data, or any combinations thereof.

The software model may include the functionalities of preparing and filing electronic tax returns in some embodiments or the functionalities of fulfilling accounting needs or purposes in some other embodiments. The set of digital contents may include any presentations or views of the software model presented in a user interface interacting with users, online and/or offline documentation, help files, various data from database queries and/or inquiries, various data provided by customer feedback modules, customer retention modules, and/or customer development modules, data from crowdsourcing, data from past or real-time usage of the software model by users, etc. The set of digital contents may be in various different formats that are not intended to limit the scope of this disclosure and may include, for example, one or more characters, one or more symbols, one or more words, one or more phrases, one or more sentences, one or more paragraphs, audio streams, images, or any combinations thereof, etc. More details about identifying digital contents are described below.

One or more data models may be identified or generated at 504A for identification of terms of interest and/or helper items with machine learning techniques and the set of digital contents identified at 502A. For example, if these one or more data models have been previously generated, these one or more previously generated data models may be identified at 504A. Otherwise, these one or more data models may be generated anew at 504A. These one or more data models may be subsequently employed to identify terms of interest in some embodiments. In some of these embodiments, these one or more data models may be further employed to identify helper items for the identified terms of interest, whereas one or more additional data models may be generated for identifying helper items for the identified terms of interest. More details about generating one or more data models are described below.

One or more terms of interest may be classified at 506A from at least a portion of the set of digital contents with at least one data model of the one or more data models generated at 504A. In some embodiments, these one or more terms identified as one or more terms of interest may be further annotated or labeled in the set of digital contents at 506A. For example, one or more data models may be employed to process and identify terms of interest from digital contents that may be presented in a user interface to users of the software application licensing or delivery model. Because these digital contents may be presented to users of the software model, the identification of terms of interest that may hinder the user experience with the software model and the subsequent identification of helper items and linking between these terms of interest and their corresponding helper items may improve the user experience as well as the functioning (e.g., the correctness of the functioning and results of the software model). In some embodiments, a term of interest in a digital content may also be annotated with one or more measures or metrics that are described below.

One of the advantages of these techniques described herein is the use of data models to identify terms of interest as well as helper items through machine learning techniques such that no subjective determinations by humans are needed in the identification of terms of interest or the identification of helper items from the received set of digital contents. This advantage is especially beneficial because a term may be considered as a term of interest to one user but not to another user due to different backgrounds of the two users (e.g., different education, different professions, etc.) Also, one person may classify a term as a term of interest when, for example, the person is not familiar with the term, whereas another person may not classify the same term as such. These techniques described herein not only eliminate the subjective determinations by humans but also identify terms of interest as well as their corresponding helper items dynamically while accounting for variations in the characteristics of users. As described elsewhere in the application, these data models may be subsequently transformed into real-time data models that are employed to classify digital contents (e.g., users' inquiries) in real-time or nearly real-time.

One or more helper items for an identified term of interest may be identified at 508A from the set of digital contents using at least one of the data models generated at 504A. As described above, the identification of terms of interest and the identification of helper items utilize different techniques to process different sets of inputs in order to generate different outputs and may be performed with the same one or more data models in some embodiments or with different data models in some other embodiments. The one or more identified helper items may be linked with the corresponding term of interest at 508A, and a data structure may be used to store information about the links and to facilitate the construction of views or presentations of the software model to the users.

In some embodiments, helper items are identified only from the set of digital contents that are with the control of the entity developing or hosting the software model but not from any external sources such as any third-parties. In some of these embodiments where no helper items may be identified from such set of digital contents for a term of interest, the system described herein may flag and forward this term of interest to, for example, a domain expert. The feedback from the domain expert may then be transformed into a part of the set of digital contents, also without referencing external contents from sources outside the entity. In some other embodiments, these techniques may separately generate or invoke one or more different models to access external sources, instead of using the one or more data models to access these external sources although these one or more data models are nevertheless capable of accessing such external sources to retrieve the needed information for helper items.

The flow illustrated in FIG. 5A may return to 506A if there are more terms of interest for which helper items have not been identified. Otherwise, the accuracy or completeness of the one or more data models may be continuously improved at 510A by using active learning techniques. In some embodiments, a data model may be processed by a conversion or transformation module into a real-time data model every time the data model is updated. A data model may have previously identified a term as a term of interest and provided one or more helper items therefor. During subsequent usage of the software model, the usage patterns from users nevertheless show that this term of interest has a relatively lower click-on rate. That is, relatively fewer users have accessed the one or more helper items for this term of interest to gain further information. In this example, the usage pattern information, the information about the users who actually accessed the one or more helper items, or any other pertinent information may be group as active learning data that may be further forwarded to the machining learning modules to adjust the data model generation processes.

Figure 5B:
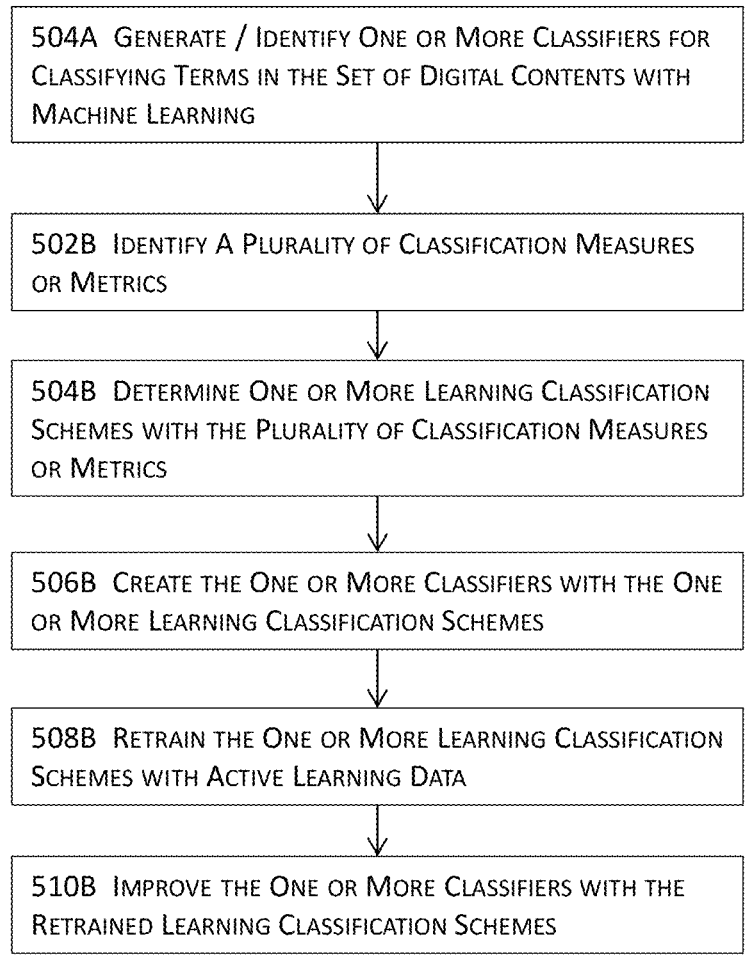
FIG. 5B illustrates more details about a portion of the block diagram illustrated in FIG. 5A in one or more embodiments.

FIG. 5B illustrates more details about a portion of the block diagram illustrated in FIG. 5A in one or more embodiments. More specifically, FIG. 5B illustrates more details about generating one or more data models (504A) of FIG. 5A. In these embodiments illustrated in FIG. 5B, a plurality of classification measures or metrics may be identified at 502B. These classification measures or metrics may include, for example, the frequency of a word appearing within N words of another word, the frequency of appearance or familiarity of a term in the corpus generated from the set of digital contents or from another corpus (e.g., SUBTLEX corpus, the Brown corpus by Francis and Kucera, the American Heritage Word Frequency Book, etc.), or any other suitable measures or metrics.

These classification measures or metrics may optionally include the number of definitions of a term from one or more dictionaries. For example, a term having more different definitions may be associated with a higher score for its complexity status because such a term may require users to become aware of more definitions and to discern one possible definition from the other definitions and is thus more likely to cause confusion or understanding issues.

These complexity measures or metrics may optionally include the context in which a term appears. The same term appearing in a more familiar context is less likely to raise confusion or understanding issues and hence classification issues than the same term appearing in a less familiar context. This contextual measure or metric may thus be tied to the general familiarity of a term in a specific context. For example, a term with M preceding words or characters and/or N following words or characters that corresponds to a higher probability or frequency (e.g., a frequency value generate by an n-gram model) may indicate that this specific context in which the term is in may reduce the probability of the term being incorrectly classified. Consequently, the context may be associated with a higher confidential level or score for the classification status of the term.

These classification measures or metrics may optionally include the morphology or the number of morphemes of a term. For example, a term having fewer morphemes may be may be associated with a relatively lower confidential level or score for its classification status than a term having more morphemes because the general meanings of morphemes are often understood, and more morphemes in a term may thus provide more information for users to piece the general meanings of these morphemes together to derive the meaning of the term.

These classification measures or metrics may optionally include one or more of the number of synonyms, the number of antonyms, the number of hypernyms, the number of hyponyms, or any combinations thereof. For example, a term corresponding to a larger number of synonyms having different meanings may be associated with a lower confidential level or score for its classification status because such a term may be more likely to cause classification issues than other terms having a smaller number of synonyms due to more synonyms for users to correlate with the term.

The aforementioned classification measures or metrics are provided as non-limiting examples, and each measure or metric may be assigned with a range of scores to accommodate the possible variations in a single classification measure or metric. In addition or in the alternative, classification measures or metrics may or may not be independent of each other. For example, one classification measure or metric of a term may also influence another classification measure or metric the same term. In some embodiments, the machine learning modules may construct a data model while assuming that the considered classification measures or metrics are independent of each other. In some other embodiments, the machine learning modules construct a data model while considering the non-linearity or dependency of the considered classification measures or metrics.

With the plurality of classification measures or metrics identified at 502B, one or more learning classification schemes may be determined with one or more of the plurality of classification measures or metrics at 504B. The machine learning modules may account for one or several of the aforementioned classification measures or metrics in the determination of the one or more learning classification schemes in a variety of ways. For example, the machine learning modules may account for multiple classification measures or metrics on an individual basis where each classification measure or metric individually indicates whether the term is to be classified in a certain way. The final determination may be based on, for example, the majority of the individual determinations of the plurality of classification measures or metrics.

As another example, the machine learning modules may construct a first data model by arranging a first number of classification measures or metrics in a linear combination where each classification measure or metric corresponds to its own coefficient or weight. As another example, the machine learning modules may construct a first data model by arranging a first number of classification measures or metrics in a non-linear combination where one classification measure or metric may exhibit a non-linear behavior or may affect one or more other classification measures or metrics. The coefficients, weights, and/or the non-linear behaviors of the classification measures or metrics are the targets of the machine learning techniques that iteratively use the set of digital contents and/or active learning data to refine or fine tune the coefficients, weights, and/or the non-linear behaviors of the classification measures or metrics for one or more data models to improve the accuracy and/or completeness of the one or more data models.

With the one or more learning classification schemes determined at 504B, one or more data models may be generated at 506B with the one or more learning classification schemes. These one or more data models may then be executed to identify and classify terms from the set of digital contents. The identification and classification of a term involves the computation of classification confidence levels or scores of the accommodated classification measures or metrics.

To reduce the consumption of computational resources, the machine learning modules may optionally reduce the set of digital contents or the corpus into a reduced set of digital contents or reduced corpus by using at least one of the plurality of classification measures or metrics. For example, the machine learning modules may adopt various filtering processes and/or tweak the hierarchical application of rules while skipping a plurality of rules, etc. These reduction techniques will be described in greater details below, to reduce the amount of data to be processed. As another example, the machine learning modules may identify any terms that correspond to a sufficiently high frequency of appearance (e.g., the definite article "the", the indefinite article "a" or "an", certain pronouns such as "he", "she", "I", etc.) and prohibit these terms from being classified. In these embodiments, the size of the corpus or the set of digital contents and hence the number of terms are effectively reduced to conserve processor cycles for identifying complex terms and memory footprint to accommodate the terms to be processed.

In some other embodiment, the machine learning modules may reduce the corpus or the set of digital contents by identifying terms to be classified, rather than eliminating terms that will not be further processed. For example, the machine learning modules may identify terms that have low frequency of occurrence or appearance below a predetermined threshold value. As another example, the machine learning modules may identify terms that have their respective numbers of definitions below a threshold number. In these aforementioned embodiments, a data model simply look up the classes for these terms, rather than performing classification tasks on these terms. In some other embodiments, the machine learning modules may reduce the corpus or the set of digital contents by both eliminating terms not to be further processed and by identifying terms that will be further processed.

The one or more learning classification schemes may be retrained at 508B with active learning data. In these embodiments, the active learning data may be acquired by flagging and forwarding some terms that one or more data models cannot classify or cannot classify with sufficiently high confidence level or score to domain experts and further by funneling the opinions of the domain experts into a digital form of the active learning data. The machine learning modules may then adjust one or more of the classification schemes to better fit the active learning data. The one or more data models may be continuously improved at 510B with the retrained learning classification schemes.

Figure 5C:
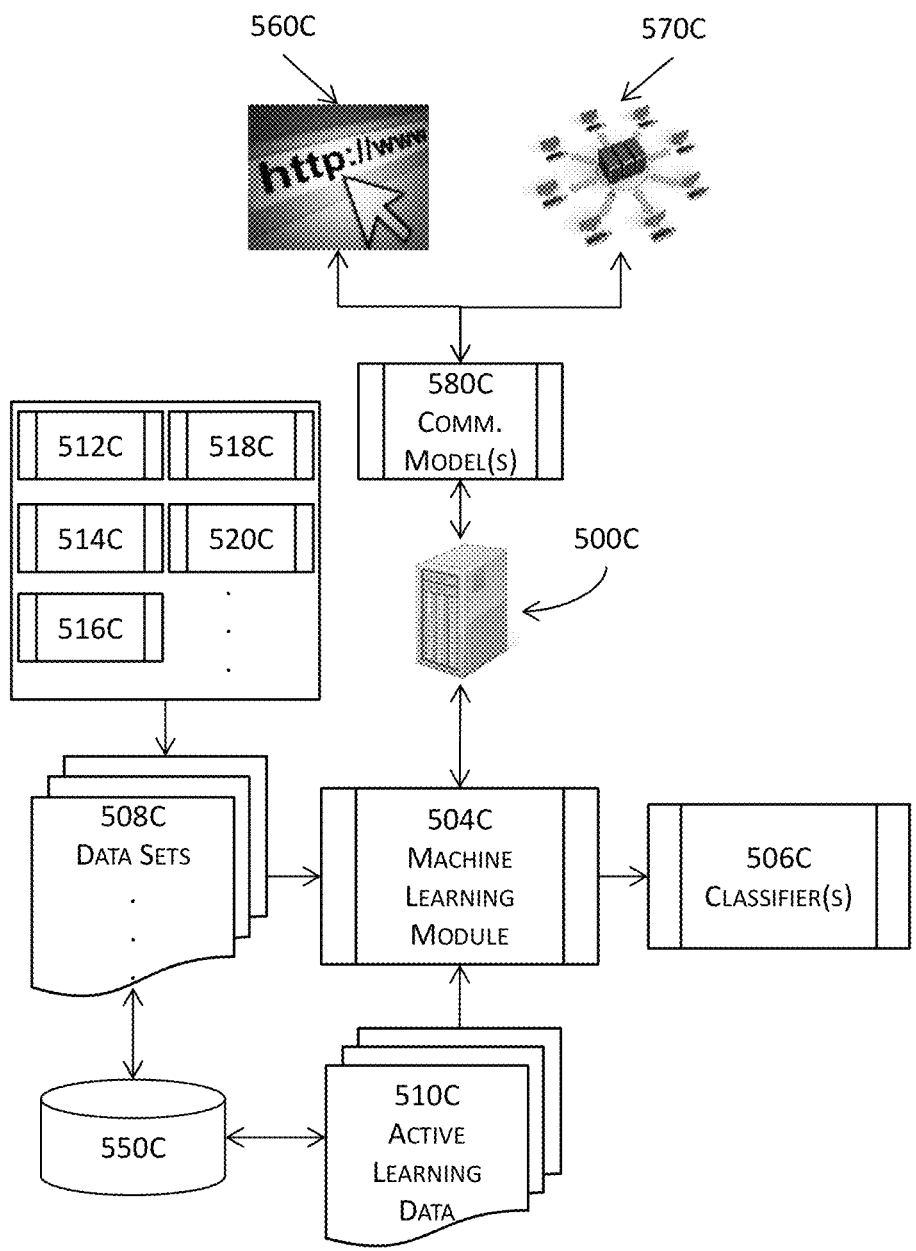
FIG. 5C illustrates a high level block diagram for a portion of the process or system block diagram illustrated in FIG. 3 in one or more embodiments.

FIG. 5C illustrates a high level block diagram for a portion of the process or system block diagram illustrated in FIG. 3 in one or more embodiments. In these embodiments illustrated in FIG. 5C, a computing system 500C may include or may be operatively coupled to a machine learning module 504C. In some embodiments, the computing system 500C is located in an isolated environment and is thus not connected to the Internet 560C although the computing system 100 may nevertheless be connected to the Internet 560C via a separate communication layer or communication module 580C in some other embodiments.

In these embodiments, the computing system on which term of interest and helper item identification are identified is not connected to the Internet without at least the separate communication layer or communication module 580C. The computing system 500C may nevertheless include a separate communication layer or module 580C to interface with one or more other computing systems on the intranet 570C. For example, the computing system 100 may interact with one or more other computing system on the intranet to obtain at least some of the plurality of data sets 508C for constructing data models. The plurality of data sets 108 forms the corpus for the software model of interest for the purposes of term of interest identification and helper item determination.

A data model may use various inputs such as one or more predetermined patterns, rules, constraints, requirements, or algorithms, information about terms from, for example, databases or data structures, etc. but is merely a set of patterns, rules, constraints, requirements, or algorithms or simply a database or data structure of information. Instead, a data model may include a software object that is stored at least partially in memory during execution and includes, for example, one or more formulae or logic, one or more sets of vectors, etc. that are executed or used to generate desired or required results. Moreover, a data model may be trained (e.g., with active learning data, historical data, etc.) to generate more accurate results by using artificial intelligence techniques such as machine learning techniques and is thus different from a set of hard coded or predetermined patterns, rules, constraints, requirements, or algorithms or a database or data structure of information.

The computing system 500C includes or functions in tandem with a machine learning module 504C. The machine learning module 504C receives a plurality of data sets 508C and processes the plurality of data sets 508C to generate one or more data models 506C for the identification of terms of interest and helper items. The plurality of data sets 508C may include, for example, generic term of interest identification data from generic term of interest identification modules 512C (e.g., term of interest or word of interest identification results from third-parties or from entities that are not the developers of or are not hosting the software model).

The plurality of data sets 508C may also include query results sets or query log records generated by one or more database engines 514C, customer specific data, customer retention data, and/or customer development data collected from one or more customer retention or development modules 516C. The plurality of data sets 508C may further include any online and/or offline documentation 518C (e.g., technical specification, help files, etc.) generated or maintained by a documentation module 520C for the software model for which identification of terms of interest and helper items is performed.

The plurality of data sets 508C may also include data generated by or collected from one or more crowdsourcing modules 520C that represent specific sourcing models where the entity (e.g., the entity that hosts or develops the software model for which identification of terms of interest and helper items is performed) uses an open call to obtain services from the parallel contributions of a large, specifically defined or named network of Internet participants (e.g., individual users including domain experts, groups of individuals, institutions, etc.), instead of any undefined segments of the public or employees or contractors of the entity. The plurality of data sets 508C may be persistently or non-persistently stored in a non-transitory storage medium 550C.

These data sets 508C may include digital contents of various formats including, for example, textual format, images, audio streams (e.g., speech data), etc. In some embodiments, the machine learning module 504C may process at least some of the plurality of data sets 508C to form the corpus for term of interest and helper item identification. For example, the machine learning module 508C may parse some textual data in the plurality of data sets 508C and tokenize the textual data into a plurality of tokens including, for example, one or more characters, one or more symbols, one or more words, one or more phrases, one or more sentences, one or more paragraphs, or any combinations thereof, etc. For example, a description of an object model or code module may be tokenized a plurality of tokens including, for example, one or more characters, one or more symbols, one or more words, one or more phrases, one or more sentences, one or more paragraphs, or any combinations thereof, etc.

The plurality of tokens may further include n-grams (e.g., unigrams, bigrams, trigrams, four-grams, five-grams, etc.) extracted from the data of interest in some embodiments. An n-gram is a contiguous sequence of n terms from a sequence of text or speech data. In these embodiments, the statistical properties of the plurality of tokens may be used in one or more probabilistic computational linguistics models for predicting certain item(s) in a sequence in the context of one or more preceding and/or following items or tokens. Some embodiments may further utilize various recognition and extraction techniques to recognize pertinent contents of digital images or audio streams in tokenizing these digital images or audio streams for the purpose of identification of terms of interest and helper items therefor.

The machine learning module 504C may use one or more different techniques including, for example, supervised learning techniques (e.g., support vector machines, decision trees, artificial neural network, inductive logic programming, statistical relational leaning, etc.) and/or unsupervised learning techniques (e.g., clustering, expectation-maximization techniques, multivariate analysis, etc.) for various pattern recognition and identification of terms of interest as well as helper items. In some embodiments, various techniques identify a term of interest and one or more helper items for the term of interest without even understanding the semantics or meanings of the term of interest or the one or more helper items. Rather, these techniques employ specific classification processes to identify terms of interest and pattern recognition techniques to identify the helper items, without understanding the meanings or semantics or performing any semantic analyses for the identification of terms of interest and helper items.

The machine learning module 504C may further be supplemented with active learning data 510C to adjust or fine tune one or more data models that are subsequently used in processing the plurality of data sets 508C for identification of terms of interest. The active learning data 510C may be acquired automatically by, for example, the machine learning module 504C in resolving or determining undetermined terms or terms associated with relatively lower accuracy measures (e.g., confidence scores, confidence intervals, or any other appropriate measures or metrics) in some embodiments. In some other embodiments, the active learning data 510C may be acquired by flagging and forwarding some terms that one or more data models cannot classify as terms of interest or cannot classify as terms of interest with sufficiently low accuracy measures to domain experts and further by funneling the opinions of the domain experts into a digital form of the active learning data 510C accessible by the machine learning module 504C. Like the plurality of data sets 508C, the active learning data 510C may also be persistently or non-persistently stored in a non-transitory storage medium 550C.

Figure 5D:
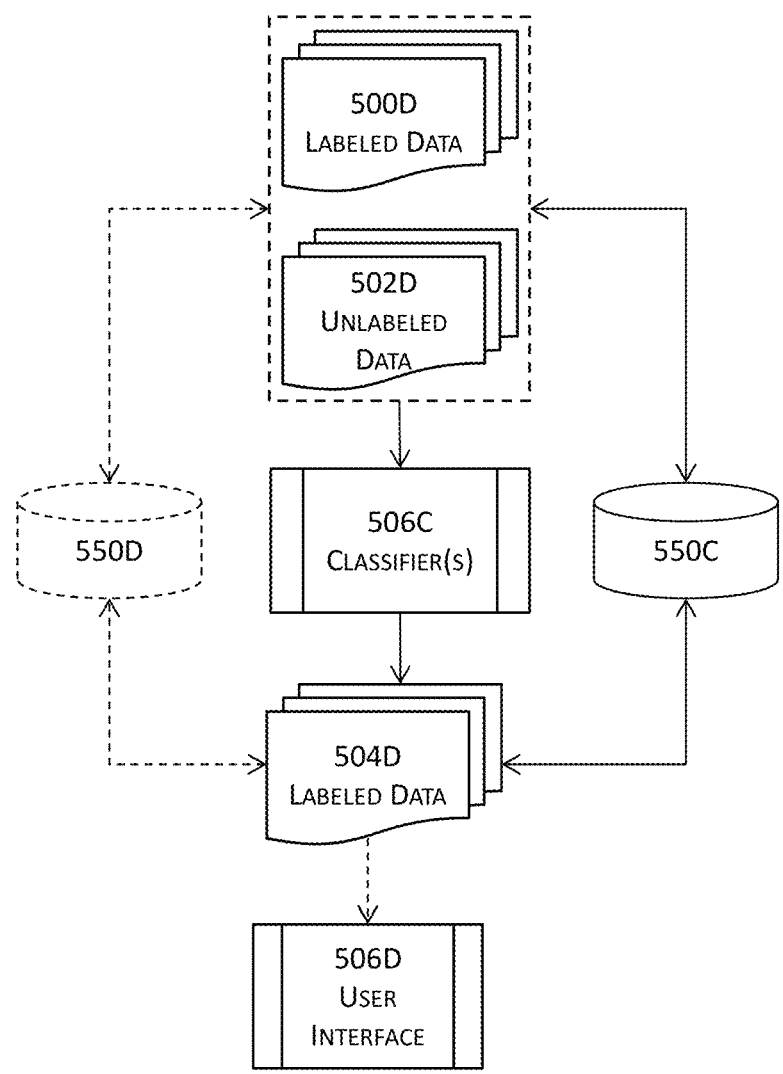
FIG. 5D illustrates more details about a portion of the high level block diagram illustrated in FIG. 5C in one or more embodiments.

FIG. 5D illustrates more details about a portion of the high level block diagram illustrated in FIG. 5C in one or more embodiments. More specifically, FIG. 5D illustrates the high level block diagram for one or more data models that identify terms of interest. In these embodiments, the one or more data models may identify unlabeled data 502D from, for example, the plurality of data sets 508A in FIG. 5A stored in the non-transitory computer accessible storage medium 550A or in another non-transitory computer accessible storage medium 550D. Unlabeled data includes the data in the plurality of data sets for which terms of interest have not been identified in some of these embodiments.

In some embodiments, labeled data 500D may also be provided to the one or more data models for the purpose of term of interest identification. Such labeled data 500D may be produced by, for example, outputs of one or more prior versions (e.g., before training) of one or more data models, domain experts, etc. The labeled data 500D may be generated by human reviewers or one or more generations of the one or more data models. For example, domain experts may manually identify and label some terms of interest from a set of digital contents of a software model to form labeled data (e.g., a partially labeled set of digital contents) in some embodiments. The labeled data 500D may include data that has been completely labeled with identified terms of interest and/or even the corresponding helper items in some embodiments and/or data that has only been partially labeled with some but not all of the identified terms of interest and/or even the corresponding helper items in some other embodiments.

This labeled data may be provided to one or more data models that further process the unlabeled portion of the labeled data based on the labeled portion provided by domain experts in these embodiments. In some of these embodiments, the one or more data models may process the labeled portion of the labeled data 500D to validate one or more previously identified terms of interest. For example, the labeled data 500D that was previously labeled by a first generation (e.g., a previous generation) of a data model may be processed by a second generation (e.g., a next generation) data model to validate whether the identified terms have been identified correctly as respective terms of interest by the first generation.

In some embodiments, a training data set (e.g., a set of data labeled with terms of interest), instead of domain expert inputs in the aforementioned example, may be provided to train the machine learning modules so that the machine learning modules may adjust its algorithms to generate one or more data models that further process the training data set to identify terms that match with those already labeled as terms of interest in the training data set. Once these one or more data models have been validated to generate accurate results for the training set, these one or more data models may receive unlabeled data 502D as inputs and process the unlabeled data 502D to identify terms of interest therefrom and to label the unlabeled data 502D into labeled data 504B.

In some other embodiments involving active training that is described below with greater details with reference to FIG. 5D, a first data model may also receive labeled data 500D that was processed by a prior version of the first data model or by another data model of the one or more data models. This first data model may be generated with some active training data (e.g., domain expert review results of prior identification results) to correct or fine tune the classification scheme of the prior version of the first data model. This first data model may then be used to process the labeled data 500D to identify one or more new terms of interest and/or to reclassify one or more terms of interest identified by the prior version of the first data model or the another data model as terms not of interest.

These one or more data models may then perform a term of interest identification process or analysis to identify terms of interest in the unlabeled data. More details about the term of interest identification process or analysis are described below. Upon or shortly after the identification of the terms of interest from the unlabeled data 502D, at least some of the unlabeled data 502D may be annotated, labeled, or associated (collectively labeled) with the identified terms to transform the unlabeled data 502D into labeled data 504D. For example, the terms identified as terms of interest may be assigned to or associated with a label indicative of their status as the terms of interest. A label may be a binary label indicative of whether a term is of interest in some embodiments and thus may need only one bit to store the label. In some other embodiments, a label may include or may be associated with some other information such as the accuracy measure, or any other pertinent information, etc. and thus may require multiple bits to store the label. The labeled data may be further processed (e.g., through the identification and linking of helper items) and presented to a user interface 506D.

Figure 5E:
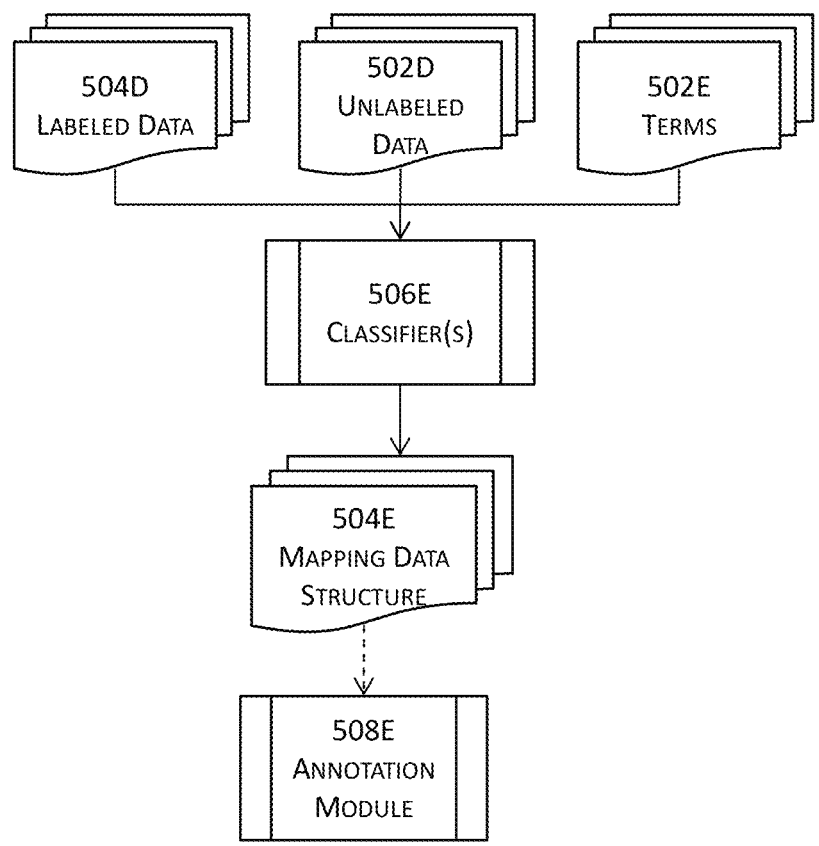
FIG. 5E illustrates more details about a portion of the high level block diagram illustrated in FIG. 5C in one or more embodiments.

FIG. 5E illustrates more details about a portion of the high level block diagram illustrated in FIG. 5C in one or more embodiments. More specifically, FIG. 5E illustrates a high level block diagram of a portion of a computing system to identify helper items for terms of interest and to link the terms of interest with their corresponding helper items. In these embodiments, one or more data models or classifiers (e.g., data models) may receive and process the identified terms of interest 502E, the unlabeled data 502D, and/or the labeled data 504D as inputs to identify one or more helper items for an identified term of interest.

It shall be noted that one or more sets of the aforementioned data (e.g., the labeled data 504D) may be entirely optional in this block diagram illustrated in FIG. 5E, and that the labeled data 504D may include data that is completely or partially labeled with, for example, identified terms of interest, identified helper items, or one or more accuracy measures or metrics, etc. The one or more data models or classifiers may then link or associate the one or more helper items with the term of interest and store the information about the link in a mapping data structure 504E. The information about the link or the mapping data structure 504E may be further processed by an annotation module 508E to label at least some of the unlabeled data 502D and/or the labeled data 504D.

It shall be noted that the one or more data models 506E may be identical to or different from the one or more data models or classifiers in FIG. 5D. In FIG. 5D, a data model (e.g., classifier, a data model, a transformed data model, etc.) receives and processes input data (e.g., the unlabeled data 502D) and identifies terms of interest from the inputs and optionally label the unlabeled data to form the partially or completely labeled data 504D. In FIG. 5E, a data model receives and processes inputs (e.g., the identified terms of interest 502E, the unlabeled data 502D, and/or the labeled data 504D) and generates outputs including helper items for the terms of interest. The data model in FIG. 5E may also generate or update the mapping data structure 504E including the information about the links between terms of interest and their corresponding one or more helper items. In some embodiments, a data model may be configured in such a way to perform both functions at different stages of the process flow. In some other embodiments, two different data models may be used for the identification of terms of interest (e.g., in the flow illustrated in FIG. 5D) and the identification of helper items (e.g., in the flow illustrated in FIG. 5E).

Strictly as a simplified example, a data model 506E may identify the term "imputed interest" as a term of interest in a Web page presented to users of an electronic tax return preparation and filing software model. A data model 506E may then process the inputs (e.g., the identified terms of interest 502E, the unlabeled data 502D, and/or the labeled data 504D) to identify a helper item for the identified term of interest "imputed interest" for an electronic tax return preparation and filing software model. For example, the data model 506E may process the inputs and find that one of the inputs includes a sentence "imputed interest refers to a portion of a future payment that is treated as interest if parties to the transaction do not provide a stated amount of interest at a rate acceptable to the IRS" by using, for example, pattern matching techniques. The data model may then identify the definition for the term of interest "imputed interest" to be "a portion of a future payment that is treated as interest if parties to the transaction do not provide a stated amount of interest at a rate acceptable to the IRS". This identified definition may be stored as a helper item object and may be further linked to the term of interest "imputed interest".

As another example, a data model 506E may identify the term "VAT" as a term of interest in a Web page presented to users of an accounting software model. A data model 106E may then process the inputs (e.g., the identified terms of interest 502E, the unlabeled data 502D, and/or the labeled data 504D) to identify a helper item for the identified term of interest "VAT". For example, the data model 506E may process the inputs and find that one of the inputs includes a sentence stating "VAT simply stands for Value Added Tax, a tax that is charged on most business transactions and is added by businesses in the price they charge for goods and services to the consumer" by using, for example, pattern matching techniques. The data model may then identify the definition for the term of interest "VAT" to be "Value Added Tax that is charged on most business transactions and is added by businesses in the price they charge for goods and services to the consumer". This identified definition may be again stored as a helper item object and may be further linked to the term of interest "VAT".

In the aforementioned examples, the helper items are generated from a portion of the contents in digital objects (e.g., files) by extracting the pertinent information from the digital objects and creating helper items therefor. In some other embodiments, the digital objects including the pertinent information may be identified as the helper items, and the terms of interest may be linked to these digital objects. In some other embodiments, the digital objects may be further textually or graphically annotated or emphasized so that when the terms of interest are clicked upon, the pertinent portion of the digital objects are automatically presented to the user with graphical or textual emphasis.

Strictly as an example of the process flows illustrated in FIGS. 5D-5E, a set of digital contents (e.g., files, Web pages, images, audio streams, etc.) may be identified for an electronic tax return preparation and filing software model. In some embodiments, only a smaller portion of the set such as the Web pages, help files, etc. presented to users will be processed with, for example, the flow illustrated in FIG. 5D to identify terms of interest therein. With the terms of interest identified from this smaller portion of the set of digital contents, the process flow illustrated in FIG. 5E may be executed to identify one or more helper items for an identified term of interest. In this flow for identification of helper items, the entire set of digital contents may potentially be processed.

For example, the specification, white papers, etc. that may not be exposed to users of the software model may be processed to identify helper items for the identified terms of interest. This process flow may exclude any digital contents from external sources (e.g., sources other than the entity developing or hosting the software model) in some embodiments. One of the purposes of processing the entire set of digital contents of a software model but not digital contents from external sources is to ensure the completeness of the set of digital contents for the software model.

In these embodiments, both the labeled data 504D (e.g., the smaller portion of the set of digital contents processed and hence labeled by the term of interest identification process) and the unlabeled data 502D (e.g., the remaining portion of the set of digital contents) may be provided to the one or more data models 506E in FIG. 5E. The identified terms of interest 502E that have been determined either by the process flow illustrated in FIG. 5D or by domain experts may also be provided to the one or more data models 506E so that the one or more data models 506E may reference these identified terms of interest in identifying their corresponding helper items and in linking a term of interest with its one or more helper items in the mapping data structure 504E.

Figure 5F:
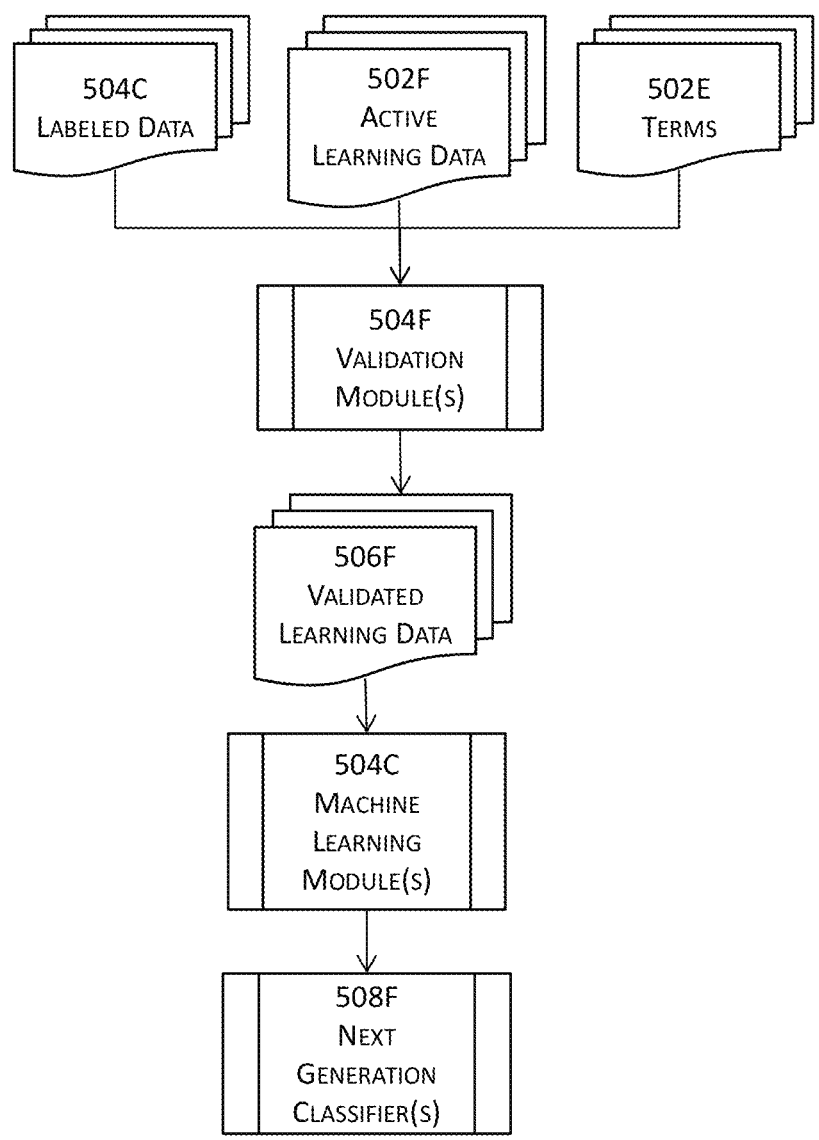
FIG. 5F illustrates more details about a portion of the high level block diagram illustrated in FIG. 5C in one or more embodiments.

FIG. 5F illustrates more details about a portion of the high level block diagram illustrated in FIG. 5E in one or more embodiments.

FIG. 5F illustrates another high level block diagram for training term classification modules for software licensing or delivery models in one or more embodiments. In these embodiments, one or more sets of active learning data 502F, labeled data 504F, and a set of identified terms of interest 502E identified from the labeled data 504C may be identified. These one or more sets of data may be used by one or more machine learning modules (e.g., 504C in FIG. 5C) for retraining one or more data models (e.g., the data models or classifiers 506C for identifying terms of interest and/or the data models or classifiers 506C for identifying helper items) to improve their accuracy and/or completeness of coverage.

In some embodiments, these one or more sets of data may be validated before they are used for training or retraining data models. One of the purposes of validating these one or more sets of data is to reduce less relevant or less useful data that, when used for training or retraining data models, may waste unnecessary computational resources or may skew or worsen the accuracy or coverage completeness of the data models. The validation process thus discards certain information or data pertaining to the identification of a term of interest and maintains the pertinent information or data as the validated learning data 506D.

Strictly as an example, the validation process may filter the one or more sets of data by ignoring data or information pertaining to terms of interest associated with sufficiently high confidence scores (e.g., larger than or equal to 0.75 on a 0 to 1 scale) as well as terms of interest with sufficiently low confidence scores (e.g., below 0.4 on the 0 to 1 scale). Terms of interest associated with sufficiently low confidence scores are more likely not of interest, whereas terms associated with sufficiently high confidence scores are more likely terms of interest. As a result, the information or data pertaining to these two categories of terms of interest has marginal values when used as learning data. The one or more validation modules 504F may retain the data or information pertaining to terms of interest associated with confidence scores between 0.4 and 0.75 to form the validated learning data 506F.

The validated learning data 506F may then be provided to one or more machine learning modules (e.g., 504C in FIG. 5C) that train or retrain one or more data models for the identification of terms of interest and/or for the identification of helper items therefor. For example, the machine learning modules (e.g., 504C in FIG. 5C) may use domain expert review results, user feedback, identification results generated by previous generations of data models, etc. to tweak the algorithms, formulae, rules, constraints, patterns, or any other suitable information referenced in the generation of the one or more data models into improved schemes that correctly identify certain terms as terms of interest or not of interest as reflected in the validated learning data 506F. These one or more machine learning modules (e.g., 504C in FIG. 5C) may then generate one or more next generation data models 508F with such improved schemes from machine learning with at least the active learning data 502F.

Figure 5G:
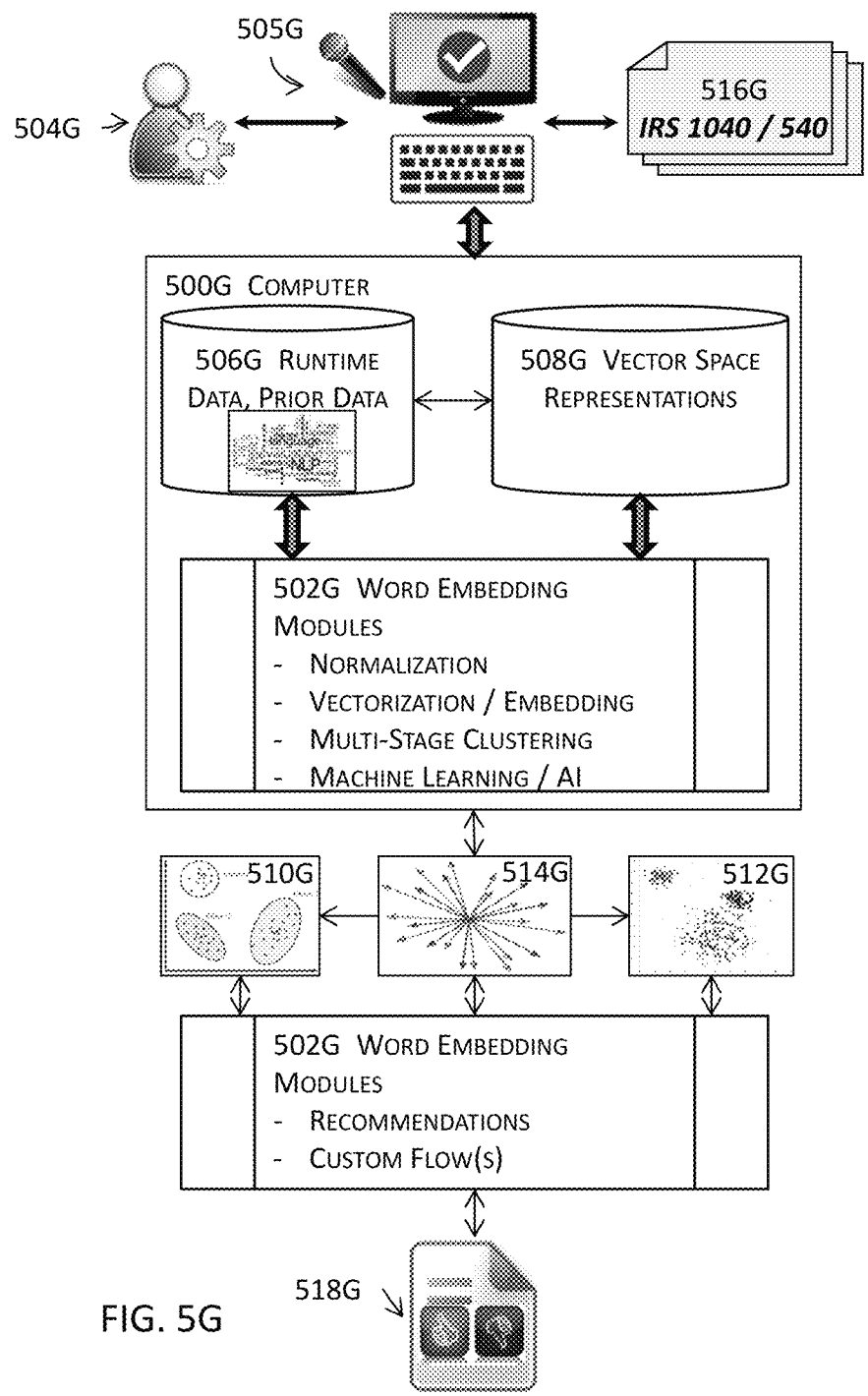
FIG. 5G illustrates a high level block diagram of a relevance module in one or more embodiments.

FIG. 5G illustrates a high level block diagram of a relevance module in one or more embodiments.

FIG. 5G illustrates another high level block diagram for classification of data for software licensing or delivery models in one or more embodiments. In these embodiments, a user 504G accessing an electronic tax return preparation and filing software application delivery model may provide various pieces of information and/or inputs (e.g., answers to interview questions, selections, etc.) 516G in the form of natural language via an input device (e.g., a keyboard, a microphone, etc.) of a computing device 505G.

The electronic tax return preparation and filing software application delivery model may be a standalone installation that locally executes on the computer 500G in some embodiments. In some other embodiments, the electronic tax return preparation and filing software application delivery model may be hosted on a remote computer, on an Internet-based computing environment providing shared computer processing resources and data to computers and other devices on demand (e.g., in a cloud computing environment), or provided as a software licensing and delivery model in which software is licensed on a subscription basis and is centrally hosted (e.g., software as a service or SaaS). In these latter embodiments, the user 504G may access the electronic tax return preparation and filing software application delivery model via, for example, a browser on a user computing device operatively connected to the remote host via a computer network component.

The user 504G may be operating on or connected to a computing system 500G that includes or operatively connects to one or more word embedding or term embedding modules 502G. This computing system may be the computing device 505G when the electronic tax return preparation and filing software application delivery model is a standalone installation. The word embedding or term embedding modules 502G included or associated with the computer 500G may perform various word embedding or term embedding processes on runtime data 506G (e.g., user's answers to interview questions, prior data acquired during runtime of the same user or different users, etc.) of a software application delivery model. These runtime data or prior data records 506G may be provided by a plurality of users accessing the software application delivery model. For example, the runtime data or prior data records 506G may include answers or selections in response to interview questions presented in one or more interview screens. This prior data may also include any suitable information or data about the functions, purposes, etc. of various object models, code modules, dynamic applications, dynamic conditions, dynamic actions, etc.

These word embedding or term embedding processes may include, for example, normalization of the runtime data or prior data records into normalized tokens such as characters, words, phrase, sentences, or even documents. These normalized tokens may be further embedded into a vector space. More specifically, one or more word embedding or term embedding processes may transform these normalized tokens into corresponding vector representations 508G where closer vector representations correspond to more similar normalized tokens and hence more similar runtime data or prior data records (506G).

These word embedding or term embedding modules 502G may further classify the runtime data or prior data records 506G into a plurality of clusters. These classification processes may be performed independently of each other or in a hierarchical manner. The normalization, vectorization, and clustering processes may be performed offline at least initially in some embodiments due to the vast amount of runtime data or prior data records (506G) to process (e.g., nearly a hundred thousand object models for interview screens, etc.) and thus may not be suitable for storage or processing on a user computing device. The results of the normalization, vectorization, and clustering processes may nevertheless be stored locally on a user's computing device for a locally executing software applications such as an electronic tax return preparation and filing software application delivery model in some embodiments. In some other embodiments, the results of the normalization, vectorization, and clustering may be stored remotely for user computing devices to access via one or more computer networks.

With these vector representations determined, these processing results of the one or more word embedding or term embedding modules 502G may be further utilized by a software application licensing or delivery model. In the aforementioned example involving tax returns, a specific user 504G may access an electronic tax return preparation and filing software application delivery model and submit a particular input 516G (e.g., an answer or selection to an interview question in an interview screen) via an input device (e.g., a computer mouse, a touch interface, a virtual or physical keyboard, a microphone, etc.) of the computing device 505G.

This specific runtime data 516G may be similarly processed, if it has been processed, by one or more word embedding or term embedding modules 502G that execute locally in a standalone installation or remotely in a hosted or cloud environment. For example, this specific runtime data 516G may be normalized into normalized description which may be further transformed into a specific vector representation in the same vector space 514G that now includes the specific vector representation with other vector representations for the descriptions from a plurality of users of the electronic tax return preparation and filing software application licensing or delivery model.

This specific runtime data 516G of the specific user 504G may then be classified into one or more classes 510G. One or more recommendations 512G (in one or more classes) corresponding to these one or more classes 510G may also be identified. These one or more recommendations 512G may include, for example, one or more recommended flow nodes, object models, code modules, etc. (e.g., one or more subsequent interview screens) that are associated with the one or more classes 510G or that are closer to the vectorized representation of the specific runtime data 516G. Of course, in the examples of dynamically presenting customized interview screens to a user, the vast number of interview screens may have already been processed with the word embedding or term embedding techniques and thus vectorized and classified.

At least one of these one or more recommendations 512G may be presented directly or indirectly through a code generation module to the specific user 504G in a variety of different manners such as a customized sub-flow 518G in the overall flow of the specific user's interaction with the software application licensing or delivery model. A customized or personalized software application flow may also be constructed with one or more of these one or more recommendations (e.g., customized, personalized dynamic interview screens, etc.) for the specific user 504G. Because these one or more recommendations 512G are identified from one or more classes 510G that are determined to be closer to the runtime data 506G based on the vectorized representation of the specific runtime data 516G acquired during the execution of a current flow node from the specific user 504G, these one or more recommendations may thus deemed to be relevant to the specific runtime data 516G for the specific user 504G.

Figure 6A:
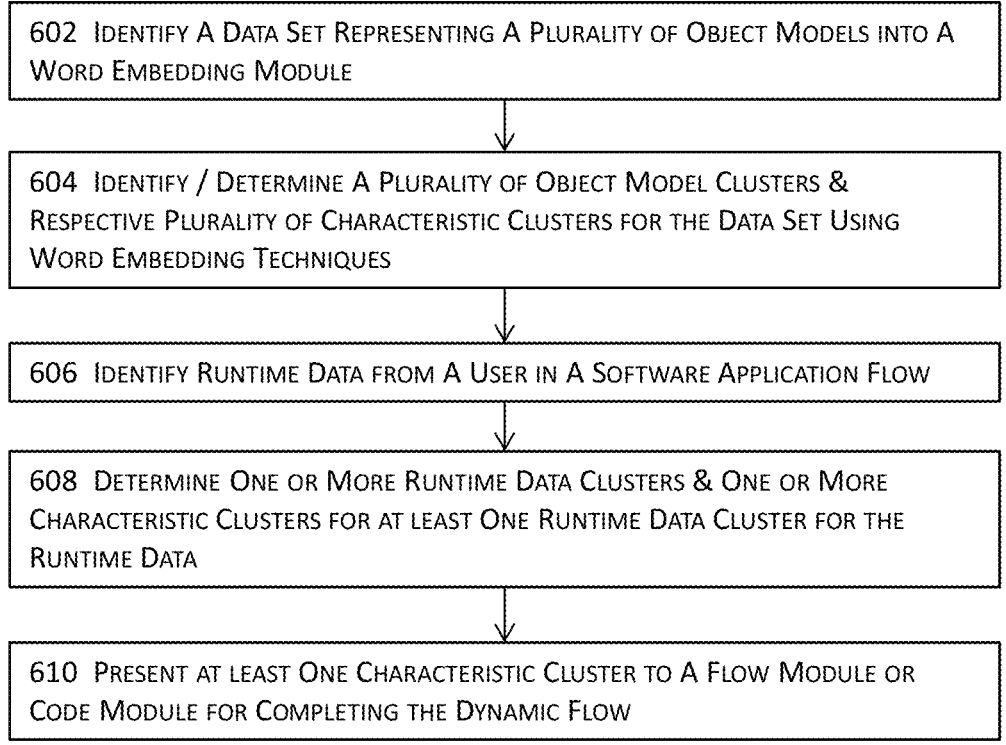
FIG. 6A illustrates a high level block diagram for performing a relevance or irrelevance analysis to identify or determine one or more relevant or irrelevant entities in one or more embodiments.

FIG. 6A illustrates a high level block diagram for performing a relevance or irrelevance analysis to identify or determine one or more relevant or irrelevant entities in one or more embodiments. A relevance or irrelevance analysis may be performed on a set of flow nodes (e.g., object models) in some embodiments to cluster similar flow nodes having one or more similar characteristics into the same cluster. The results of such a relevance or irrelevance analysis may be further used in, for example, prioritizing which flow nodes are to be considered or even executed first in a flow for a dynamic application. For example, one or more clusters of similar flow nodes may be first or even solely considered and processed during the generation of a flow for a dynamic software application delivery model in some embodiments. As a practical working example, flow nodes that are in the same cluster as the current flow node may be first or solely considered to be the next flow node for execution, rather than seeking and determining the next flow node from the entire set of flow nodes. Of course, the clustering of flow nodes or object models does not prohibit the identification of flow nodes or object models from the entire set of flow nodes in some other embodiments.

In these embodiments, a data set or corpus for a plurality of users may be identified at 602 as an input of a word embedding module. The data set includes information about or provided by the plurality of users. For example, a user may manually enter a data item during the use of a software application delivery model. As another example, another user may provide such data item via a microphone as a voice input to a software application delivery model that may utilize voice recognition and voice transcription modules to transcribe the voice input into a data item.

A plurality of object model clusters and the respective plurality of characteristic clusters (e.g., dynamic condition cluster, dynamic action cluster, one or more subsequent data models, etc.) may be identified (if already existing) or determined (if not existing) at 604 for the data set at one or more word embedding modules. These one or more word embedding modules vectorize tokens in the data set (or corpus) into multi-dimensional vector representations in a multi-dimension vector space using word embedding techniques that transform two similar tokens into corresponding vector representations in closer proximity to each other. Prior to vectorization of tokens, these one or more word embedding modules may optionally normalize the data set into normalized tokens that have a smaller size than the original data set.

With the vector representations determined, these one or more word embedding modules may perform multi-stage clustering tasks to cluster the users represented in the data set into a set of user clusters where similar users are clustered into the same user cluster. With a user cluster, these one or more word embedding modules may further cluster a plurality of characteristics corresponding to the users in the user cluster into one or more characteristic clusters where similar characteristics are clustered into the same characteristic cluster. In the aforementioned example involving expense types, the expense types of "performance wear," "performance attire," "yoga pants," "clothes," "clothing," "uniforms", etc. may be clustered into, for example, the characteristic cluster of "clothing".

A input from a specific user in a software application flow of a software application delivery model may be identified at 606. The one or more word embedding modules may determine one or more user clusters at 608 for the specific user. For example, the input (e.g., descriptions, metadata, etc. of data models) identified at 606 may be transformed into a specific vector representation in the same vector space and may be further clustered into one or more user clusters at 608. For each user cluster of the one or more identified user clusters, one or more characteristic clusters that have been determined for the data set may also be identified at 608 for the user.

For example, the one or more word embedding modules may determine that the input may be clustered into a data model cluster of "marriage" and identify a number of characteristic clusters (e.g., spouse information inquiry cluster) corresponding to the "marriage" data model cluster. The number of characteristic clusters may be ranked based in part or in whole upon the percentage or number of separate data models in the data model cluster associated with these characteristic clusters, etc. in some embodiments. In some other embodiments, one or more specific characteristic clusters may be identified in addition to or in the alternative of the standard characteristic clusters associated with the data model cluster for a specific user based on, for example, the runtime data (e.g., information provided by the specific user).

A data model (e.g., an interview screen) corresponding to at least one characteristic cluster of the one or more characteristic clusters may be presented to the specific user at 610 in a user interface of the software application delivery model to aid the user to complete the software application flow. This data model may be identified by, for example, identifying one or more vector representations of the descriptions of respective data model. These vector representations may be further compared to the vector representation associated with the current flow node (e.g., the vectorized representation of the description of the current data model associated with the current flow node) and/or to the vector representation of runtime data acquired during the execution of the software application flow (e.g., during the execution of the current flow node and optionally of one or more previously executed flow node in the software application flow).

One of the advantages of these techniques described herein is the scalability of these techniques for software application products or services. More specifically, these techniques utilize word embedding techniques to process a targeted corpus that may potentially include any number of natural language descriptions of various entities (e.g., data models, code modules, etc.) in an effective and efficient manner to determine a plurality of data model clusters. A targeted corpus includes not only natural language descriptions of object models, code modules, etc. from commonly available corpora such as Google corpora but also specific words, phrases, sentences, etc. that that are utilized in various computer programming languages as well as various terms or candidate user's answers to interview questions concerning a set of specific forms (e.g., I.R.S. tax forms). Experiments have demonstrated processing speeds in the range of tens of thousands to hundreds of thousands words per second so the initial clustering of data models into data model clusters for a target corpus including billions of descriptions may take only about an hour. Once the initial clustering is completed, the vectorizations and the clustering are determined and can be reused in similar software application products or services. For any new descriptions, metadata, etc. that may arise during the execution of a software application flow may be quickly processed due to the much smaller number of such new descriptions, metadata, etc., without hindering the execution of the underlying software application flow or user experiences with the underlying software application flow.

Moreover, the computational intensity may be the highest in applying the word embedding techniques to the corpus to determine various clusters. Nonetheless, this intense computation only occurs when processing the corpus for the first time. Moreover, once these various clusters, once determined, may simply be referenced in subsequent determination of a new data model cluster with a new description provided by a user in a software delivery model. Embedding such a new description and determining one or more candidate data model clusters as well as the corresponding characteristic clusters (e.g., dynamic condition cluster, dynamic action cluster, one or more subsequent data models, etc.) involve simple arithmetic operations that are completed in less than a split of a second. As a result, these predetermined data model clusters may be efficiently deployed to process individual descriptions of individual data models in less than a split of a second to determine the respective candidate data model clusters as well as their corresponding characteristic clusters (e.g., dynamic condition cluster, dynamic action cluster, one or more subsequent data models, etc.) and thus may be implemented in any software application delivery models (e.g., standalone installation, hosted, etc.)

Another advantage of these techniques described herein is that these techniques handle large corpora and small corpora in an identical or substantially similar manner, and the difference lies in the initial processing of the corpora to determine various clusters based on vectorization. In other words, these techniques apply to both large and small corpora with full and equal effects and are thus much more scalable than conventional techniques. Once these various clusters have been determined, these techniques can be ported to any software delivery models with the same or substantial similar effectiveness, regardless of, for example, whether there exist merely a few distinct user clusters or millions of distinct user clusters (and/or their respective corresponding characteristic clusters).

Figure 6B:
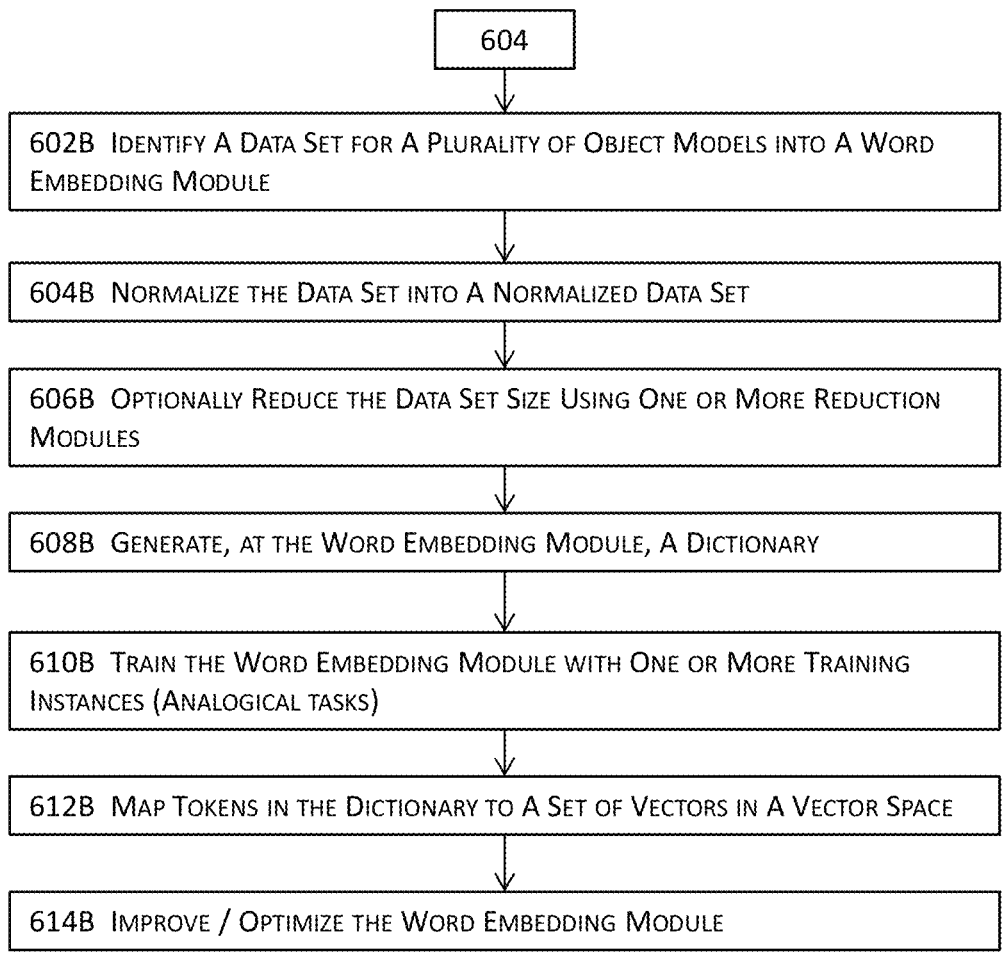
FIG. 6B illustrates a more detailed block diagram for a portion of the high level block diagram illustrated in FIG. 6A in one or more embodiments.

FIG. 6B illustrates a more detailed block diagram for a portion of the high level block diagram illustrated in FIG. 6A in one or more embodiments. More specifically, FIG. 6B illustrates more details about the normalization and vectorization aspects of a word embedding module. In these embodiments, a data set including a plurality of tokens (e.g., characters, words, phrases, sentences, paragraphs, and/or documents) for data or information (e.g., descriptions, metadata, computer programming language elements, etc.) concerning a plurality of data models, code modules, etc. may be identified as an input to a word embedding module at 602B.

The example flow illustrated in FIG. 6B transforms the data set or a reduced version thereof into vector representations in a vector space where more similar tokens are transformed into vector representations in closer proximity of each other in the vector space having a plurality of dimensions. The data set may include a large number of tokens (e.g., billions of words, millions of phrases, etc.) some of which may not necessarily be useful even when transformed into vector representations. On the other hand, vectorizing the data set requires computational resources that are proportional to the product of the number of tokens to be vectorized and the degrees of freedom. The data set may thus be normalized at 604B into a normalized data set and optionally reduced in size at 606B by using one or more reduction modules.

Normalization of the data set transforms the tokens in the data set into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization not only transforms tokens into standard forms but also reduces the size of the data set due to, for example, the transformation of various tenses of verbs into the same tense and transformation of plural nouns into singular forms.

One or more reduction techniques may be applied to the data set or the normalized data set to further reduce the size at 606B. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding processing may nevertheless learn these names. These filtered out words or phrases may be determined not to add value or usefulness. Stop or function words and phrases contribute primarily to the grammatical structures of tokens, rather than the meanings or contents thereof.

For example, a word embedding module may customize a set of stop and/or function words and phrases to include auxiliary verbs (e.g., be verbs, can, must, need, etc.), articles (e.g., the, a, an, etc.), and/or some pronouns (e.g., which, what, etc.) These words primarily contribute to the grammatical meaning of a phrase or sentence but have limited or no usefulness in determining the semantic meaning of the phrase or sentence. In some other embodiments, a word embedding module may iteratively customize the set of stop and/or function words to fit the intended functions of the underlying software application delivery model so as not to mistakenly filtering out words that may actually contribute to determining the similarity of tokens.

A dictionary or a data structure including unique tokens may be optionally generated at 608B. The unique tokens in this dictionary or data structure will be sent to a word embedding module that transform these unique tokens into corresponding vector representations. Prior to actually transforming these unique tokens, the word embedding module or the artificial intelligence modules therein may be trained with one or more training instances at 610B.

A training instance may include one or more analogical reasoning tasks that include words, phrases, etc. as well as vector arithmetic and/or additive compositionality to iteratively calibrate the word embedding module in a supervised, unsupervised, or reinforcement learning environment. An example of an analogical task is "A is to B as C is to D" such as "man is to woman as king is to queen", "man is to woman as uncle is to aunt", etc. Another example of an analogical reasoning task involving vector arithmetic is "king−man+woman=?"; and the word embedding module is trained to determine the answer to be "queen".

In some embodiments, predictive models such as the continuous skip-gram model, continuous-bag-of-words (CBOW), non-linear sigmoidal recurrent neural networks, distributed memory (DM), distributed bag of words (DBOW), etc. may be used with non-uniform, adjustable weight matrices, instead of uniform weight matrices assigning an equal weight to all tokens, may be used in a word embedding module at 610B, and the training at 610B adjusts the weights of tokens so that the word embedding module correctly determines the answers to the analogical reasoning tasks in the training instances. The word embedding modules may be derived from Word2vec algorithm, the Doc2vec algorithm, the locally linear embedding (LLE), etc. with adjustable weight matrices that assign lower weights to tokens that are known to cause incorrect or imprecise clustering results and/or assign higher weights to tokens that are known to cause more correct or precise clustering results, whereas the aforementioned algorithms have been proven to cause incorrect or imprecise clustering results for financial management software application delivery models.

Once the word embedding modules are trained to achieve desired accuracy with the one or more training instances at 6106, the tokens in the dictionary, the normalized data set, or the reduced, normalized data set may be transformed at 612B into corresponding vector representations where more similar tokens are transformed into vector representations that are in closer proximity to each other in the vector space. The vector representations may be stored with the or associated with the corresponding tokens in the same or in a different data structure; and an individual vector representation may be access by, for example, "model['computer'] # raw NumPy vector of a word with the returned result of "array([−0.00449447, −0.00310097, 0.02421786, . . . ], dtype=float32)".

The word embedding modules may further be optionally improved or optimized at 614B using techniques such as the hierarchical softmax technique, the negative sampling technique, the softmax technique, the noise contrastive estimation (NSE) technique, the subsampling of frequent words technique, etc. As described above, the data set or corpus may include an enormously large number of tokens and hence vector representations, the improvement or optimization is to reduce the number of updates per training instance or per training task. For example, the data set may include billions of words, tens of millions of phrases, and millions of sentences, each of which may be transformed into a vector representation having hundreds of dimensions.

These improvement or optimization techniques thus further reduce the utilization of computational resources. For example, a word embedding module may invoke the hierarchical softmax technique that uses a Huffman tree to reduce computation intensity, especially targeting infrequent tokens. As another example, a word embedding module may invoke the negative sampling technique that minimizes the log-likelihood of sampled negative instances, especially for frequent tokens. In addition or in the alternative, sub-sampling of frequent words during training may also be utilized to result in speedup and improve accuracy of the vector representations of less frequent tokens.

The dimensionality of the vector space may also be improved or optimized. Generally, the quality of word embedding increases as the dimensionality of the vector space increases. Nonetheless, the increase in quality of word embedding slows down as the dimensionality of the vector space reaches a threshold number beyond which the accuracy results in a limited return that is disproportional to the increase in dimensionality and hence in computational intensity. Therefore, the word embedding module may impose a threshold limit on the dimensionality of the vector space to further conserve computational resources. The word embedding modules may also impose a limit on the context for the aforementioned predictive models. The context imposes a limit on a number of tokens before and a number of tokens after a given token for predictions. For example, a word embedding module may limit the context to 10 when continuous skip-gram is utilized and to 5 when CBOW is utilized.

Figure 6C:
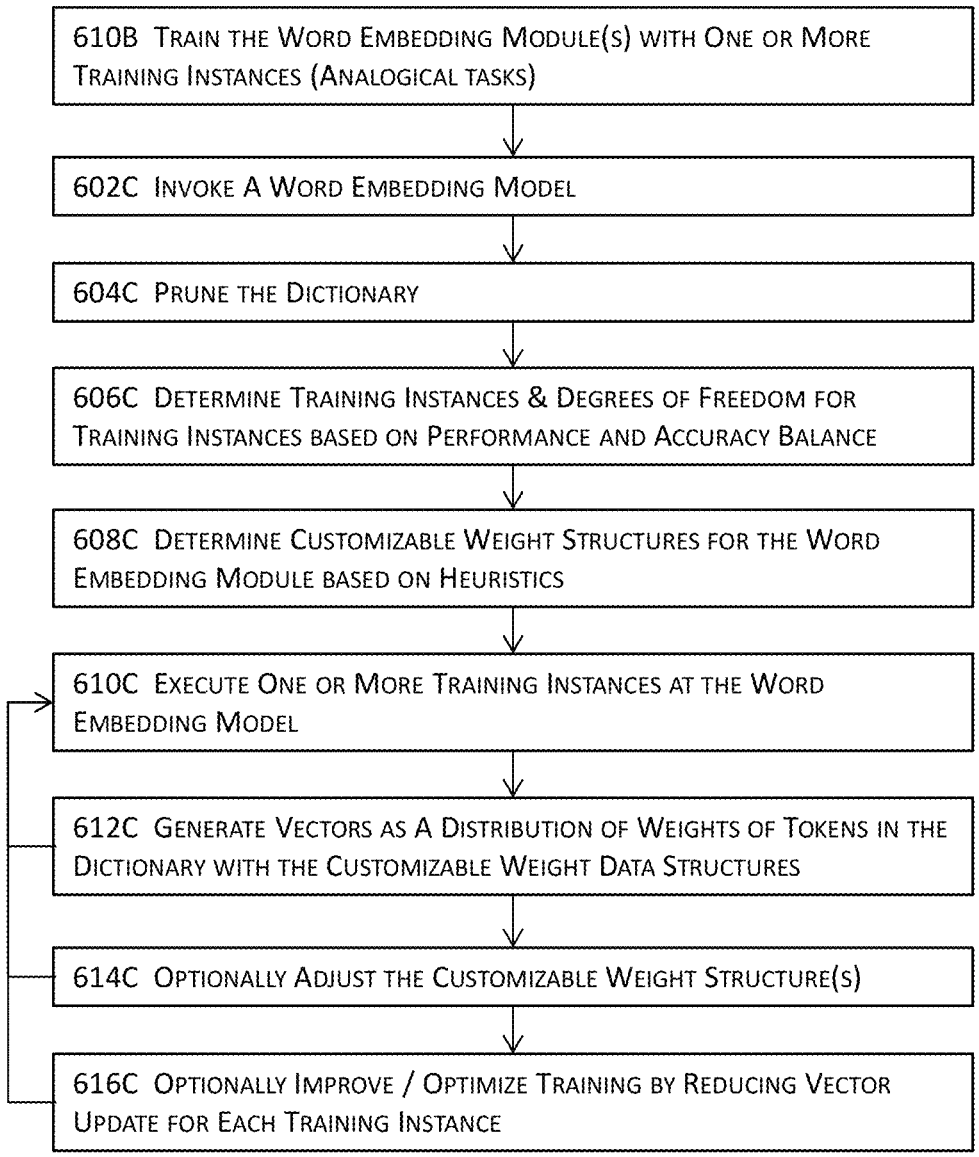
FIG. 6C illustrates a more detailed block diagram for a portion of the high level block diagram illustrated in FIG. 6B in one or more embodiments.

FIG. 6C illustrates a more detailed block diagram for a portion of the high level block diagram illustrated in FIG. 6B in one or more embodiments. More specifically, FIG. 6C illustrates more details about training one or more word embedding modules at 610B of FIG. 6B. In these embodiments, a word embedding model (a software model) may be invoked at 602C. As described above, the word embedding model may include one or more processes including, for example, continuous skip-gram model, continuous-bag-of-words (CBOW), non-linear sigmoidal recurrent neural networks, etc. The dictionary or data structure, if generated at 608B, may be pruned at 604C. For example, tokens having a predetermined number of times of occurrences in the dictionary, tokens that are equivalent to each other, etc. may be pruned from the dictionary or data structure. As described above, the computational resource requirement (e.g., memory footprint, processor cycles, etc.) is roughly proportional to the product of the number of tokens to be vectorized and the degrees of freedom. Pruning the dictionary at 604C may thus further conserve computational resources.

One or more training instances and the degrees of freedom for these one or more training instances may be determined at 606C based in part or in whole upon a balance between performance of training and/or the word embedding modules in training and the desired accuracy of the word embedding modules in generating vector representations in closer proximity for tokens that are more similar to each other. The degrees of freedom are associated with the number of layers utilized in the word embedding that generate the vector representations and will be described below in greater details.

Customizable, adjustable weight data structures may be determined at 608C for the word embedding module under training. One of the advantages of these techniques described herein is that unlike conventional approaches that assign an equal weight to all the tokens and thus often lead to incorrect or imprecise vectorization and clustering results, these techniques assign unequal weights to certain tokens to achieve more accurate and precise results and to enhance the computers' ability to truly understand the natural language input from users. For example, a word embedding module may assign lower weights to tokens that are known to cause incorrect or imprecise clustering results and/or assign higher weights to tokens that are known to cause more correct or precise clustering results during training. Another advantage of the word embedding modules is that, unlike conventional approaches that focus on individual words (unigrams), these modules also provide the learning and hence embedding functionalities for multi-grams (e.g., phrases, sentences, and even documents) that include more than just the unigrams.

These one or more training instances may be executed at these one or more word embedding module under training at 610C. More specifically, a training instance may include one or more analogical reasoning tasks that include words, phrases, etc. as well as vector arithmetic and/or additive compositionality. These analogical reasoning tasks iteratively calibrate the word embedding modules under training in a supervised, unsupervised, or reinforcement learning environment until the desired accuracy is achieved. For example, the weights in the weight data structures may be iteratively adjusted until the word embedding modules produce correct answers to the one or more training instances.

More specifically, a vector representation for a token may be generated at 612C as a distribution of weights of the tokens in the dictionary. The resulting vector representation of the token may be checked to determine whether the resulting vector representation correctly answers the analogical reasoning tasks in a supervised, unsupervised, or reinforcement learning environment. A word embedding module is determined to have correctly answered an analogical reasoning task if the vector operations results in the vector of the result. In the example illustrated in FIG. 6F, if a word embedding module vectorizes the tokens "Intuit," "tax return software," "apple," and "mobile phones" in the simplified vector space as shown in 602F.

The word embedding module is determined to have correctly answered the analogical reasoning tasks of "Intuit−tax return software+apple=?" if the result determined by the word embedding module of the vector operations is the same as the vector "mobile phones". For example, 602F represents the vector operation of subtracting the vector "tax return software" from the vector "Intuit". If the resulting vector of the vector operation that adds the resulting vector 604F to the vector "apple" is the same as the vector "mobile phones" then the word embedding module is determined to have correctly answered the analogical reasoning task.

If an answer is not entirely correct, one or more weights for one or more corresponding tokens in the dictionary may be optionally adjusted at 614C; and the process returns to 610C to repeat the acts of 610C through 614C until the word embedding module is determined to answer the analogical reasoning tasks with satisfactory accuracy. The training of the word embedding modules may be optionally improved or optimized at 616C in an identical or substantially similar manner as that described above with reference to 614B in FIG. 6B.

Figure 6D:
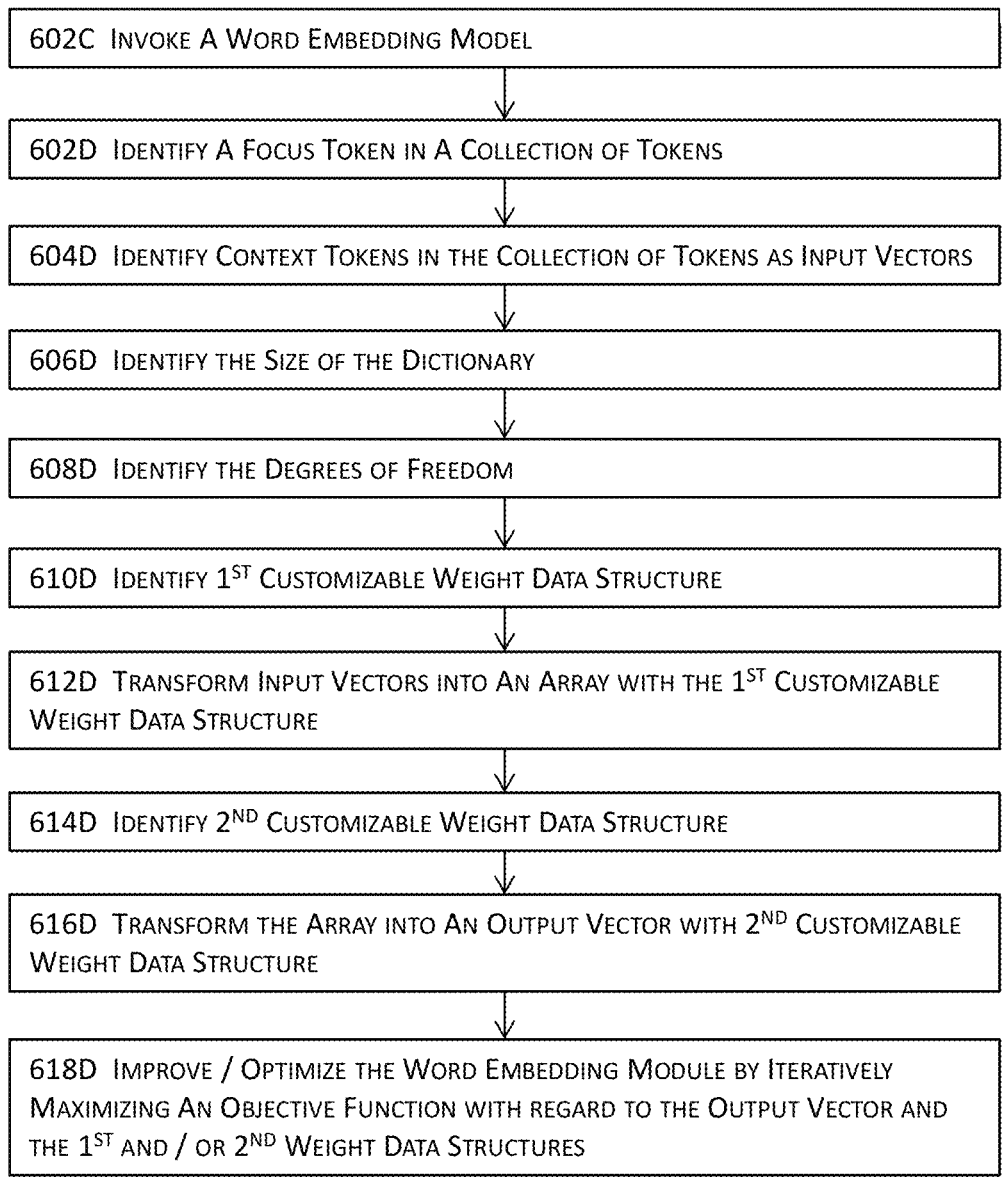
FIG. 6D illustrates a more detailed block diagram for a portion of the high level block diagram illustrated in FIG. 6C in one or more embodiments.

FIG. 6D illustrates a more detailed block diagram for a portion of the high level block diagram illustrated in FIG. 6C in one or more embodiments. More specifically, FIG. 6D illustrates an example of using a predictive model to predict a focus token from a window of surrounding tokens. In these embodiments, a focus token may be identified at 602D from a collection of tokens (e.g., a phrase, a sentence, a set of tokens, etc.) An objective of the flow illustrated in FIG. 6D is to predict the focus word from the surrounding tokens in a window encompassing the focus token. The window may encompass only one side (e.g., to the right of the focus token or to the left of the focus token) or both sides of the focus token. In some embodiments, the size of the window may be determined to be around five (5) to achieve a balance between the amount of time for the training and the accuracy of the output of the word embedding module.

One or more context tokens may be identified at 604D; and the one or more corresponding context vector representations of these one or more context tokens may be provided as input vector representations at 604D. The size of the dictionary may be identified at 606D. For example, the total number of unique tokens or the vocabulary size (V) in the dictionary may be identified at 606D; and the degrees of freedom (N) may be determined at 608D. As described above, the computational resources required are proportional to the product of the number of tokens to be vectorized and the degrees of freedom, the input vector is thus a [1×V] vector, where V denotes the number of unique tokens (or the vocabulary size). Each token is expressed as a distribution of all the unique tokens in the dictionary and may thus be represented as a [1×V] array with a "1" in the field representing the token and "0" in the remaining fields of the [1×V] array to simplifying operations although values other that "0" and "1" may also be used.

The distribution coefficients or the weights of these tokens may be captured in a weight data structure. These embodiments illustrated in FIG. 6D include two weight data structures that successively transform the input [1×V] vectors representing the unique tokens in the dictionary into the vector representations where vector representations in closer proximity represent more similar tokens.

The first customizable weight data structure may be determined at 610D. The first weight data structure determined at 610D is to transform an [1×V] input vector into an intermediate representation while encompassing the degrees of freedom (N) and is thus a [V×N] array structure based on fundamentals of linear algebra. This intermediate representation may be called a hidden layer and is thus a [1×N] vector representation as a result of the product of the [1×V] input vector of a token and the [V×N] array. This [1×N] intermediate representation is further transformed via the second weight data structure into the final output vector representation for the input token. The output vector representation is also a [1×V] vector. As a result, the second weight data structure is a [N×V] array.

With these introductory remarks, the input vectors each representing a unique token in the dictionary may be transformed at 612D into an intermediate array with the first weight data structure. The second weight data structure may be identified at 614D; and the intermediate array generated at 614D may be further transformed into an output vector at 616D with the second weight data structure. As described above, the objective of these one or more training instances is to predict the focus token using the context tokens. The process may thus iteratively adjust the first and/or the second weight data structure via the application of a plurality of analogical reasoning tasks until the word embedding module under training produces output vectors with desired accuracy. That is, until the word embedding module can correctly predict the focus token by using its surrounding tokens with sufficient accuracy.

The word embedding modules may be improved or optimized at 618D by iteratively maximizing an objective function with regard to the output vector representations and the first and/or the second weight data structures. More specifically, the process may iterate through every token in the dictionary and compute each input probability prediction as well as the prediction error and use the prediction error to update the corresponding output vector representation. Using the prediction error to update the corresponding output vector representation may be further improved or optimized by using one or more optimization techniques such as the aforementioned hierarchical softmax technique, the negative sampling technique, the softmax technique, the noise contrastive estimation (NSE) technique, the subsampling of frequent words technique, etc. The objective function may be constructed so that tokens occurring in similar contexts have similar embeddings (as measured by cosine similarity); and capturing the multiple degrees of similarity between tokens may be further enhanced by using the aforementioned analogical reasoning tasks.

For example, the hierarchical softmax technique may be used to estimate the overall probability distribution using an output layer that is proportional to log(unigram.perplexity (V)) instead of V (the vocabulary size described above) to reduce utilization of computational resources. Moreover, the weight data structures may be tuned during the iteration or independently of the iteration by adjusting one or more weights in either or both weight data structures. Another improvement or optimization technique involves the use of different techniques to process different tokens. More particularly, a word embedding module may establish a threshold frequency of appearances for the tokens and use one technique for frequent tokens and another technique for infrequent tokens. For example, a word embedding module may use the hierarchical softmax that utilizes a Huffman tree to reduce computation for infrequent tokens and negative sampling that minimizes the log-probability of sampled negative instances for frequent tokens.

This process flow illustrated in FIG. 6D may be applied to tokens more than just unigrams. For example, a similar approach may be adopted to multi-grams or n-grams (e.g., phrases, sentences, etc.) rather than unigrams (e.g., single words) to train the word embedding modules. In doing so, tokens that frequently appear together may be identified as a focus token (an n-gram). The focus token may be similarly predicted in one or more similar training instances using surrounding tokens where the analogical reasoning tasks may be revised to encompass n-grams, rather than just unigrams. In some embodiments, a word embedding module may be trained with all the n-grams (unigrams, bi-grams, etc.) This approach requires more computational resources than an alternative approach that train a word embedding module using just some of the n-grams (e.g., using just the unigrams, bi-grams, etc. but not all the n-grams).

Figure 6E:
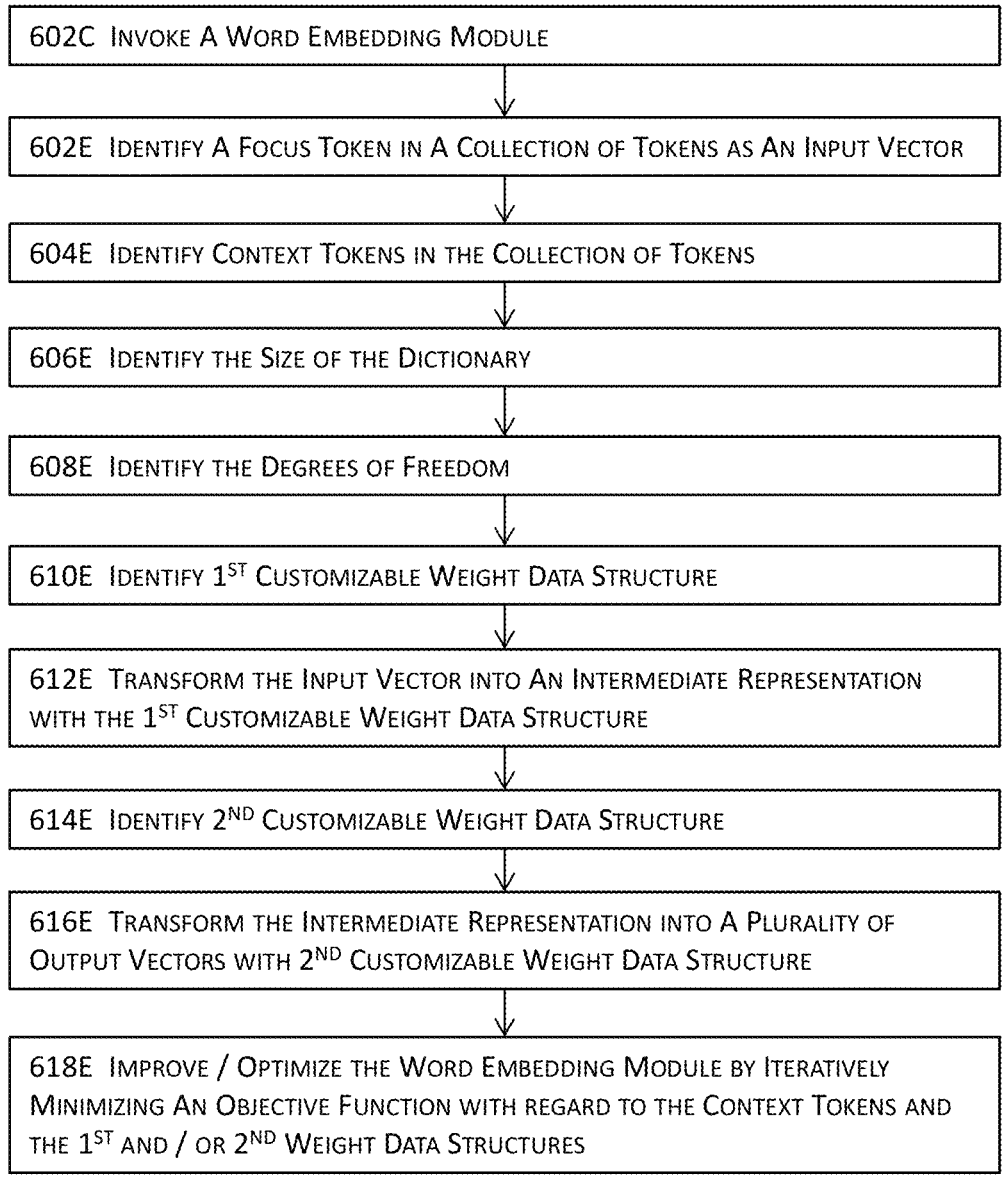
FIG. 6E illustrates another more detailed block diagram for a portion of the high level block diagram illustrated in FIG. 6C in one or more embodiments.
Figure 6F:
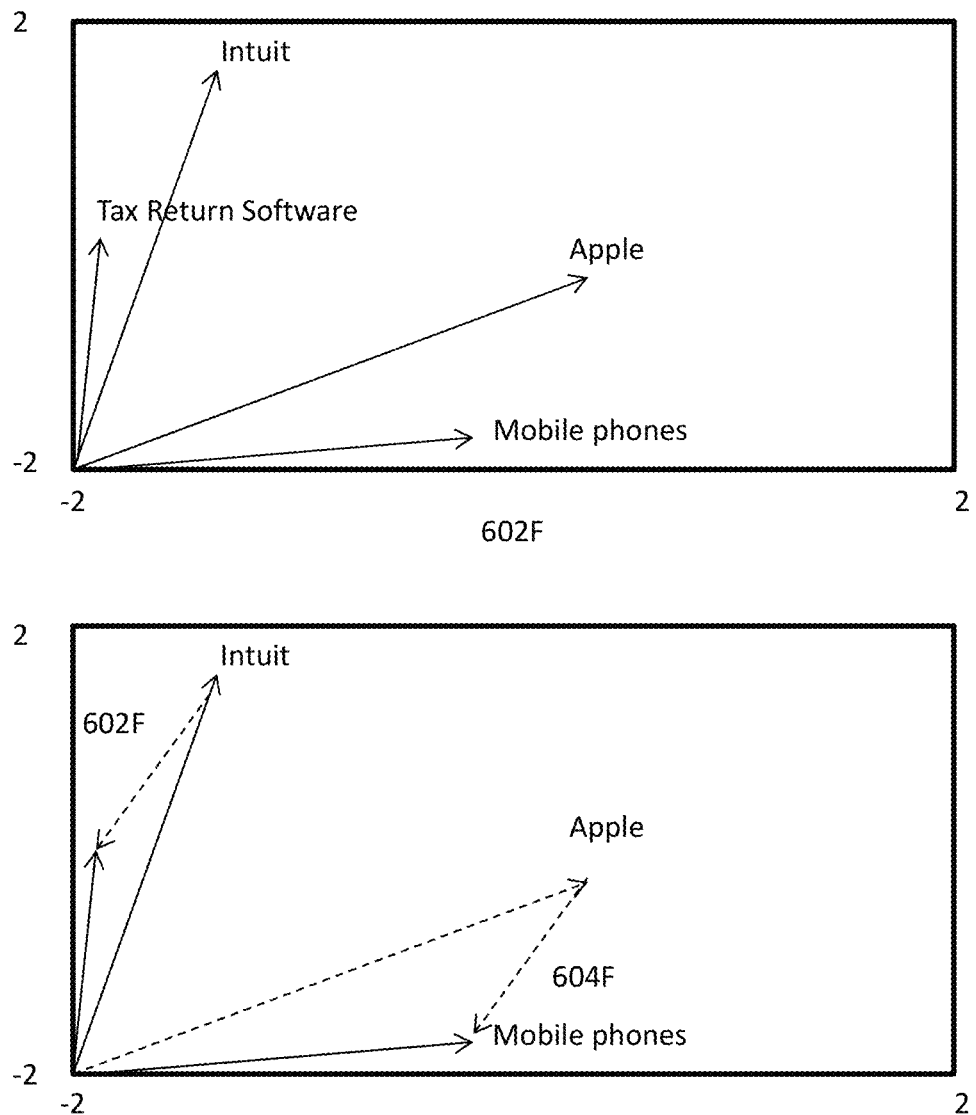
FIG. 6F illustrates a simplified example of relevance determination with the techniques illustrated in one or more of FIGS. 6A-6E in one or more embodiments.
Figure 6G:
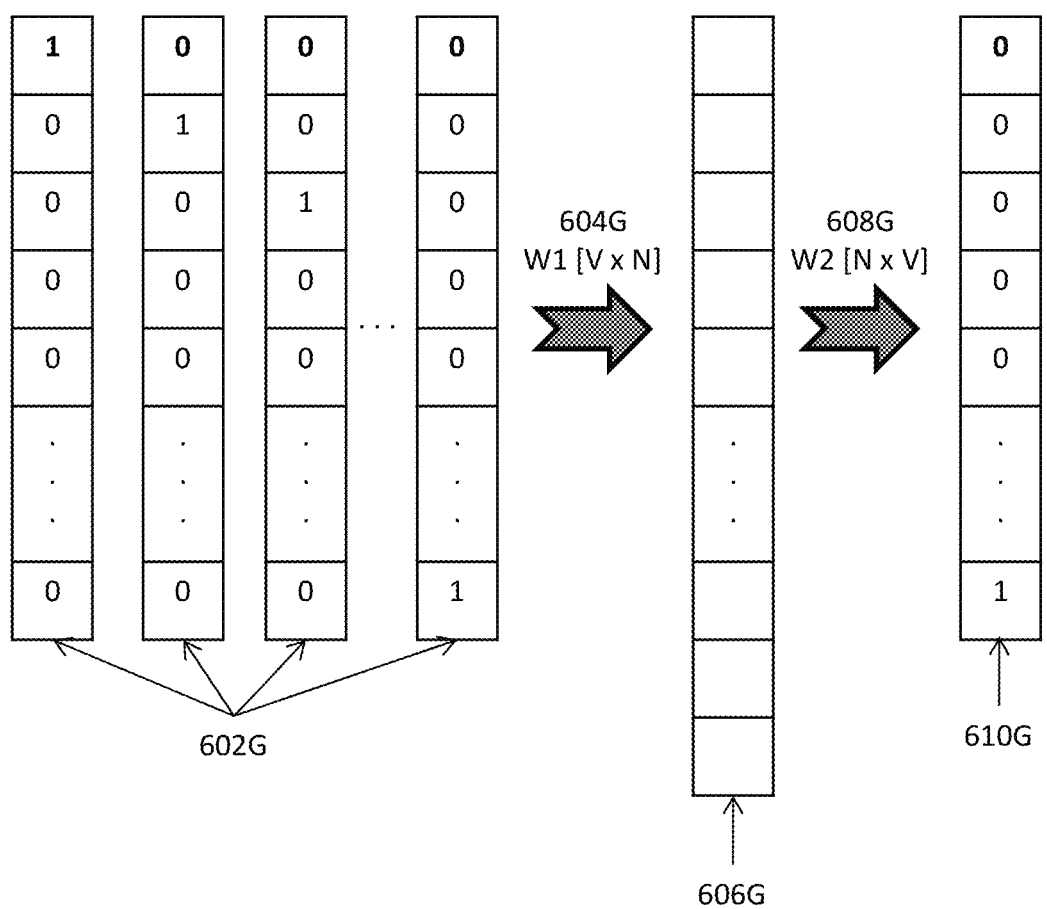
FIG. 6G illustrates an example of the process illustrated in FIG. 6D.

FIG. 6G illustrates an example of the process illustrated in FIG. 6D. In this example, a plurality of input vectors 602G may be determined for each of the tokens in a dictionary. As FIG. 6G shows, each input vector contains a "1" in the field representing the token in the dictionary, and the other fields are filled with "0". If the vocabulary size is V, each input vector is a [1×V] array as shown in FIG. 6G. Each input vector is then transformed into the intermediate representation 606G via the first weight data structure 604G which is a [V×N] array where V denotes the vocabulary size, and N denotes the degrees of freedom. As a result, the intermediate representation 606G is a [1×N] array.

This intermediate representation 606G is again transformed via the second weight data structure 608G into the output vector 610G for the input vector so both the input vector 602G and the output vector 610G are [1×V] arrays. As a result, the second weight data structure 608G is a [N×V] array. Unlike conventional approaches that assign an equal weight to all tokens (and hence input vectors), these techniques described herein use adjustable, variable weights for at least some of the tokens in the dictionary. As a result, conventional approaches merely amount to summing the non-zero entries in the first weight data structure and dividing the sum by the number of input vectors to obtain the average, whereas the word embedding modules described herein utilize adjustable, variable weights. Although the word embedding modules may need more time for training due to more complex computations, the word embedding modules nevertheless produce more accurate and useful results.

FIG. 6E illustrates more details of a part of the block diagram illustrated in FIG. 6C in some embodiments. More specifically, FIG. 6E illustrates an example of using another predictive model to predict surrounding tokens from a target token. Compared with the approach illustrated in FIG. 6D that predicts the focus token by using surrounding tokens in a defined window encompassing the focus token, the approach illustrated in FIG. 6E predicts the surrounding tokens by using the focus token. In other words, the approach in FIG. 6D predicts the focus token from its context, and the approach in FIG. 6E predicts the context from the focus token. A token may include, for example, one or more characters, one or more symbols, one or more words, one or more phrases, one or more sentences, one or more paragraphs, or any combinations thereof, etc. of a description of an object model or a code module such as that for an interview screen of an electronic tax preparation and filing software application product or service.

In these embodiments, a focus token may be identified at 602E from a collection of tokens as an input vector to a word embedding module. For training purposes, the context tokens may also be identified at 604E from the collection of tokens. These identified context tokens may be used to evaluate the prediction errors of the word embedding module during training. The size of the dictionary (V) and the degrees of freedom (N) may be respectively identified at 606E and 608E. The dictionary may be normalized and optionally reduced to include unique tokens as described above.

The degrees of freedom determine the size of the intermediate representation after the transformation with the first weight data structure. Generally, higher degrees of freedom result in better accuracy but require more computational resources because the memory footprint is proportional to the product of the size of the dictionary and the degrees of freedom. Therefore, a threshold limit may be established (e.g., several hundreds) for the degrees of freedom to achieve a balance between training performance and accuracy of the trained word embedding modules.

The first customizable, variable weight data structure may be identified at 610E. The input vector may then be transformed into an intermediate representation at 612E using the first customizable, variable weight data structure. The input vector for the focus token may be similarly constructed as that in FIG. 6D and may include a [1×V] array. Theoretically, there may be V input vectors for a dictionary having V unique tokens. The first customizable, variable weight data structure thus includes a [V×N] array to transform a [1×V] input vector into a [1×N] array for the intermediate representation.

Because the output vector is also in the same vector space as the input vector, the output vector thus includes a [1×V] vector representation. As a result, a second customizable, variable weight data structure, a [N×V] array, may be identified at 614E. The first and/or the second customizable, variable weight data structure are to be adjusted with variable weights to optimize an objective probability function (e.g., a log probability based on the training context and the size of the dictionary, a stochastic gradient descent object function, etc.) The intermediate representation may then be transformed into the corresponding output vector representation at 616E.

More specifically, with the objective function identified, the loss or error may be computed for a pair of observed and noisy examples. At least one weight in the first or the second weight data structure may be updated to improve the objective function by, for example, determining the gradient of the loss or error with respect to the weights and by updating the weights by taking a small step in the direction of the gradient that moves the output vectors around for each token until the word embedding model correctly discriminating real tokens from noise tokens. The learned output vectors may be projected to a two-dimensional space using a dimensionality reduction technique.

Similar to the word embedding module in FIG. 6D, the word embedding modules trained in FIG. 6E may also be improved or optimized at 618E by iteratively optimizing an objective function with regard to the context tokens and the first and/or the second weight data structure. The context tokens identified at 604E may be compared with the results of the word embedding module during training to compute the prediction errors that may be further used to calibrate the first and/or the second weight data structures until the word embedding module under training produce correct predictions of the context tokens with desired accuracy.

In addition or in the alternative, a data set including natural language or computer programming language tokens (e.g., characters, words, phrases, sentences, paragraphs, and/or documents) for a plurality of developers may be identified as an input to a word embedding or term embedding module. As described above, developers may include natural persons, entities such as corporate entities, or a combination of one or more natural persons and one or more entities.

The data set or a reduced version thereof is thus transformed into vector representations in a vector space where more similar language tokens are transformed into vector representations in closer proximity of each other in the vector space having a plurality of dimensions. The data set may include a large number of tokens (e.g., billions of words, millions of phrases, etc.) some of which may not necessarily be useful even when transformed into vector representations. On the other hand, vectorizing the data set requires computational resources that are proportional to the product of the number of tokens to be vectorized and the degrees of freedom. The data set may thus be normalized into a normalized data set and optionally reduced in size by using one or more reduction modules.

Normalization of the data set transforms the tokens in the data set into a normal, canonical, or standard (collectively standard) form that uniquely represents the token as well as one or more other equivalent tokens. For example, all characters in the data set may be mapped to the Unicode expression; letters may be transformed into the lower case; different tenses of the same verb (e.g., fly, flies, flew, flown) may be converted into the same tense (e.g., fly); and/or singular and plurality tokens may be transformed into the same form (e.g., singular); etc. Normalization not only transforms tokens into standard forms but also reduces the size of the data set due to, for example, the transformation of various tenses of verbs into the same tense and transformation of plural nouns into singular forms.

One or more reduction techniques may be applied to the data set or the normalized data set to further reduce the size. For example, punctuations may be removed. In some embodiments, one or more stop or function words or phrases (e.g., auxiliary verbs, some pronouns such as which, what, I, you, she, he, we, etc.) and/or one or more lexical words or lexical phrases that have little or ambiguous meaning may be filtered out from subsequent processes such as vectorization and clustering. Names of named entities (e.g., New York Times as the newspaper) may also be optionally extracted although the subsequent word embedding or term embedding processing may nevertheless learn these names. These filtered out words or phrases may be determined not to add value or usefulness. Stop or function words and phrases contribute primarily to the grammatical structures of tokens, rather than the meanings or contents thereof.

For example, a word embedding or term embedding module may customize a set of stop and/or function words and phrases to include auxiliary verbs (e.g., be verbs, can, must, need, etc.), articles (e.g., the, a, an, etc.), and/or some pronouns (e.g., which, what, etc.) These words primarily contribute to the grammatical meaning of a phrase or sentence but have limited or no usefulness in determining the semantic meaning of the phrase or sentence. In some other embodiments, a word embedding or term embedding module may iteratively customize the set of stop and/or function words to fit the intended functions of the underlying software application delivery model so as not to mistakenly filtering out words that may actually contribute to determining the similarity of tokens.

A dictionary or a data structure including unique tokens may be optionally generated. The unique tokens in this dictionary or data structure will be sent to a word embedding or term embedding module that transform these unique tokens into corresponding vector representations. Prior to actually transforming these unique tokens, the word embedding or term embedding module or the artificial intelligence modules therein may be trained with one or more training instances.

A training instance may include one or more analogical reasoning tasks that include words, phrases, etc. as well as vector arithmetic and/or additive compositionality to iteratively calibrate the word embedding or term embedding module in a supervised, unsupervised, or reinforcement learning environment. An example of an analogical task is "A is to B as C is to D" such as "man is to woman as king is to queen", "man is to woman as uncle is to aunt", etc. Another example of an analogical reasoning task involving vector arithmetic is "king−man+woman=?"; and the word embedding or term embedding module is trained to determine the answer to be "queen".

In some embodiments, predictive models such as the continuous skip-gram model, continuous-bag-of-words (CBOW), non-linear sigmoidal recurrent neural networks, distributed memory (DM), distributed bag of words (DBOW), etc. may be used with non-uniform, adjustable weight matrices, instead of uniform weight matrices assigning an equal weight to all tokens, may be used in a word embedding or term embedding module, and the training adjusts the weights of tokens so that the word embedding or term embedding module correctly determines the answers to the analogical reasoning tasks in the training instances. The word embedding or term embedding modules may be derived from Word2vec algorithm, the Doc2vec algorithm, the locally linear embedding (LLE), etc. with adjustable weight matrices that assign lower weights to tokens that are known to cause incorrect or imprecise clustering results and/or assign higher weights to tokens that are known to cause more correct or precise clustering results, whereas the aforementioned algorithms have been proven to cause incorrect or imprecise clustering results for financial management software application delivery models.

Once the word embedding or term embedding modules are trained to achieve desired accuracy with the one or more training instances, the tokens in the dictionary, the normalized data set, or the reduced, normalized data set may be transformed into corresponding vector representations where more similar tokens are transformed into vector representations that are in closer proximity to each other in the vector space. The vector representations may be stored with the or associated with the corresponding tokens in the same or in a different data structure; and an individual vector representation may be access by, for example, "model ['computer'] # raw NumPy vector of a word with the returned result of "array([−0.00449447, −0.00310097, 0.02421786, . . . ], dtype=float32)".

The word embedding or term embedding modules may further be optionally improved or optimized using techniques such as the hierarchical softmax technique, the negative sampling technique, the softmax technique, the noise contrastive estimation (NSE) technique, the subsampling of frequent words technique, etc. As described above, the data set or corpus may include an enormously large number of tokens and hence vector representations, the improvement or optimization is to reduce the number of updates per training instance or per training task. For example, the data set may include billions of words, tens of millions of phrases, and millions of sentences, each of which may be transformed into a vector representation having hundreds of dimensions.

These improvement or optimization techniques thus further reduce the utilization of computational resources. For example, a word embedding or term embedding module may invoke the hierarchical softmax technique that uses a Huffman tree to reduce computation intensity, especially targeting infrequent tokens. As another example, a word embedding or term embedding module may invoke the negative sampling technique that minimizes the log-likelihood of sampled negative instances, especially for frequent tokens. In addition or in the alternative, sub-sampling of frequent words during training may also be utilized to result in speedup and improve accuracy of the vector representations of less frequent tokens.

The dimensionality of the vector space may also be improved or optimized. Generally, the quality of word embedding or term embedding increases as the dimensionality of the vector space increases. Nonetheless, the increase in quality of word embedding or term embedding slows down as the dimensionality of the vector space reaches a threshold number beyond which the accuracy results in a limited return that is disproportional to the increase in dimensionality and hence in computational intensity. Therefore, the word embedding or term embedding module may impose a threshold limit on the dimensionality of the vector space to further conserve computational resources. The word embedding or term embedding modules may also impose a limit on the context for the aforementioned predictive models. The context imposes a limit on a number of tokens before and a number of tokens after a given token for predictions. For example, a word embedding or term embedding module may limit the context to 10 when continuous skip-gram is utilized and to 5 when CBOW is utilized.

The following illustrates an example of using a predictive model to predict a focus token from a window of surrounding tokens in some embodiments. In these embodiments, a focus token may be identified from a collection of tokens (e.g., a phrase, a sentence, a set of tokens, etc. in an artifact, a source code module, etc.) An objective of the this process is to predict the focus word from the surrounding tokens in a window encompassing the focus token. The window may encompass only one side (e.g., to the right of the focus token or to the left of the focus token) or both sides of the focus token. In some embodiments, the size of the window may be determined to be around five (5) to achieve a balance between the amount of time for the training and the accuracy of the output of the word embedding or term embedding module.

One or more context tokens may be identified; and the one or more corresponding context vector representations of these one or more context tokens may be provided as input vector representations. The size of the dictionary may be identified. For example, the total number of unique tokens or the vocabulary size (V) in the dictionary may be identified; and the degrees of freedom (N) may be determined. As described above, the computational resources required are proportional to the product of the number of tokens to be vectorized and the degrees of freedom, the input vector is thus a [1×V] vector, where V denotes the number of unique tokens (or the vocabulary size). Each token is expressed as a distribution of all the unique tokens in the dictionary and may thus be represented as a [1×V] array with a "1" in the field representing the token and "0" in the remaining fields of the [1×V] array to simplifying operations although values other that "0" and "1" may also be used.

The distribution coefficients or the weights of these tokens may be captured in a weight data structure. These embodiments may include two weight data structures that successively transform the input [1×V] vectors representing the unique tokens in the dictionary into the vector representations where vector representations in closer proximity represent more similar tokens.

The first customizable weight data structure may be determined. The first weight data structure determined is to transform an [1×V] input vector into an intermediate representation while encompassing the degrees of freedom (N) and is thus a [V×N] array structure based on fundamentals of linear algebra. This intermediate representation may be called a hidden layer and is thus a [1×N] vector representation as a result of the product of the [1×V] input vector of a token and the [V×N] array. This [1×N] intermediate representation is further transformed via the second weight data structure into the final output vector representation for the input token. The output vector representation is also a [1×V] vector. As a result, the second weight data structure is a [N×V] array.

With these introductory remarks, the input vectors each representing a unique token in the dictionary may be transformed into an intermediate array with the first weight data structure. The second weight data structure may be identified; and the intermediate array generated may be further transformed into an output vector with the second weight data structure. As described above, the objective of these one or more training instances is to predict the focus token using the context tokens. The process may thus iteratively adjust the first and/or the second weight data structure via the application of a plurality of analogical reasoning tasks until the word embedding or term embedding module under training produces output vectors with desired accuracy. That is, until the word embedding or term embedding module can correctly predict the focus token by using its surrounding tokens with sufficient accuracy.

The word embedding or term embedding modules may be improved or optimized by iteratively maximizing an objective function with regard to the output vector representations and the first and/or the second weight data structures. More specifically, the process may iterate through every token in the dictionary and compute each input probability prediction as well as the prediction error and use the prediction error to update the corresponding output vector representation. Using the prediction error to update the corresponding output vector representation may be further improved or optimized by using one or more optimization techniques such as the aforementioned hierarchical softmax technique, the negative sampling technique, the softmax technique, the noise contrastive estimation (NSE) technique, the subsampling of frequent words technique, etc. The objective function may be constructed so that tokens occurring in similar contexts have similar embeddings (as measured by cosine similarity); and capturing the multiple degrees of similarity between tokens may be further enhanced by using the aforementioned analogical reasoning tasks.

For example, the hierarchical softmax technique may be used to estimate the overall probability distribution using an output layer that is proportional to log(unigram.perplexity (V)) instead of V (the vocabulary size described above) to reduce utilization of computational resources. Moreover, the weight data structures may be tuned during the iteration or independently of the iteration by adjusting one or more weights in either or both weight data structures. Another improvement or optimization technique involves the use of different techniques to process different tokens. More particularly, a word embedding or term embedding module may establish a threshold frequency of appearances for the tokens and use one technique for frequent tokens and another technique for infrequent tokens. For example, a word embedding or term embedding module may use the hierarchical softmax that utilizes a Huffman tree to reduce computation for infrequent tokens and negative sampling that minimizes the log-probability of sampled negative instances for frequent tokens.

This process flow described in this example may be applied to tokens more than just unigrams. For example, a similar approach may adopt multi-grams or n-grams (e.g., phrases, sentences, etc.) rather than unigrams (e.g., single words) to train the word embedding or term embedding modules. In doing so, tokens that frequently appear together may be identified as a focus token (an n-gram). The focus token may be similarly predicted in one or more similar training instances using surrounding tokens where the analogical reasoning tasks may be revised to encompass n-grams, rather than just unigrams. In some embodiments, a word embedding or term embedding module may be trained with all the n-grams (unigrams, bi-grams, etc.) This approach requires more computational resources than an alternative approach that train a word embedding or term embedding module using just some of the n-grams (e.g., using just the unigrams, bi-grams, etc. but not all the n-grams).

Figure 6H:
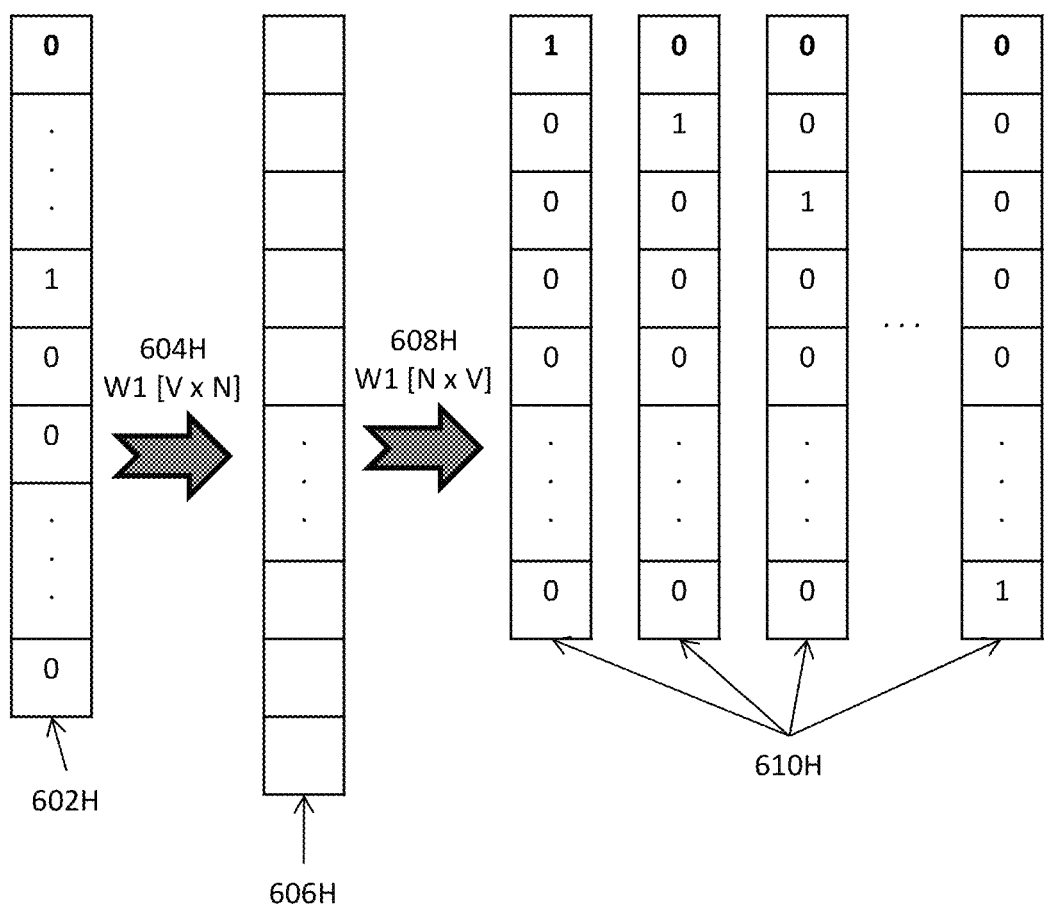
FIG. 6H illustrates an example of the process illustrated in FIG. 6E.

FIG. 6H illustrates an example of the process illustrated in FIG. 6E. In this example, an input vectors 602K may be determined for a focus token in a dictionary. As FIG. 6H shows, the input vector contains a "1" in the field representing the focus token in the dictionary, and the other fields are filled with "0". If the vocabulary size is V, each input vector is a [1×V] array as shown in FIG. 6H. The input vector 602H is then transformed into the intermediate representation 606H via the first weight data structure 604H which is a [V×N] array where V denotes the vocabulary size, and N denotes the degrees of freedom. As a result, the intermediate representation 606H produced by the first transformation is a [1×N] array. This intermediate representation 606H is again transformed via the second weight data structure 608H into output vectors 610H each of which is also a [1×V] array. As a result, the second weight data structure 608H is a [N×V] array.

With the vector representations determined for a corpus including natural language inputs, the corpus may be clustered based on the close proximity of the vector representations. As a practical example including an electronic tax return preparation software delivery model, a first corpus may be identified for the runtime data or other data records provided by users in response to one or more interview screens for Section A "Principal business or profession, including product or service" of Schedule C, Form 1040. The first corpus may be normalized and vectorized into first vector representations using the approaches illustrated in FIGS. 6B-6E so that the first vector representations in closer proximity indicate tokens that are more similar to each other. These "principal business or profession" in the first natural language inputs may be clustered into a plurality of user clusters based on the proximity of the first vector representations. A plurality of data models (e.g., interview screens) may thus be clustered into the same data model cluster if the respective data records (e.g., the descriptions, metadata, or computer programming language code) are transformed into first vector representations that are within a threshold proximity to each other.

In preparing electronic tax returns, a user may provide second runtime data as additional inputs. For example, a user may further provide additional answers or selections in response to one or more interview screens seeking information to determine whether Part V "Other Expenses" in I.R.S. Form 1040 is to be included to indicate the expenses for prepare an electronic tax return. This second runtime data may be acquired as a part of the second corpus for the user. This second runtime data may be normalized and vectorized into one or more second vector representations, if it has not been done, and may be further clustered into one or more characteristic clusters based on the proximity of these second vector representations. These second vector representations may be used to determine which additional data models (e.g., interview screens) may be selected as the next flow nodes. For example, a second vector representation of a piece of runtime data provided by a user may be used to identify one or more additional data models whose vector representations of their respective descriptions are determined to be within certain proximity of the second vector representation. These one or more additional data models may then be used for the one or more subsequent flow nodes for a dynamic flow of the software application product or service delivery model.

Figure 7A:
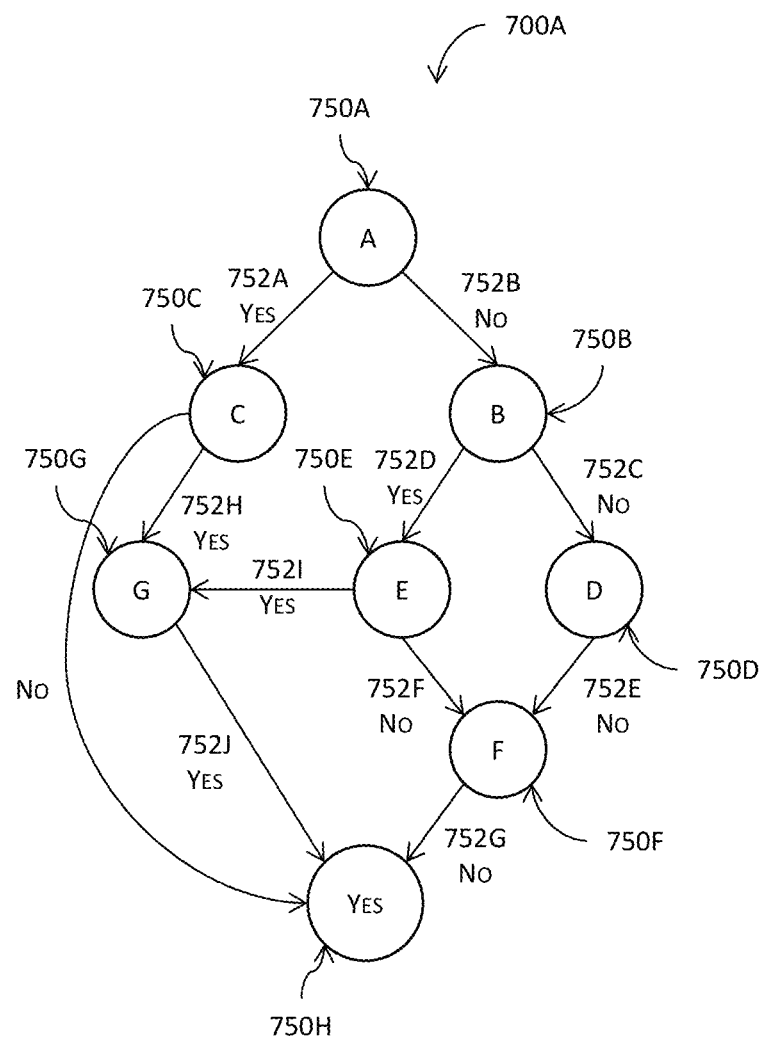
FIG. 7A illustrates an example of a directed graph or a completion graph in one or more embodiments.

FIG. 7A illustrates an example of a directed graph or a completion graph in one or more embodiments. FIG. 7A generally illustrates completion graph 700A in the form of a tree structure including nodes (750A, 750B, 750C, 750D, 750E, 750F, 750G, 750H), in which node 750A is a beginning or start node, a "Yes" or termination node 750H indicating completion, and arcs (752A, 752B, 752C, 752D, 752E, 752F, 752G, 752H, 752I, 752J) representing different possible answers and the relationship between different nodes 750A or questions depend on a basic or general version of a completion graph 700A for the particular topic, such as determining whether a child qualifies as a dependent for federal income tax purposes. A more complete flow chart-based representation of questions related to determining a "qualified child" may be found in U.S. patent application Ser. No. 14/097,057, which is incorporated by reference herein.

Each node (750A-H) includes a condition that in this example is expressed as a Boolean expression that, in the illustrated embodiment, can be answered in the affirmative or negative. Arcs (752A-H) that connect each node (750A-H) illustrate the answers and dependencies between nodes (750A-H), and the combination of arcs (752A-H) in completion graph 700A illustrates the various pathways to completion. A single arc (752A-H) or combination of arcs (752A-H) that result in a determination of "Done" represent a pathway to completion. As generally shown in FIG. 7A, there are several pathways to completion.

More specifically, FIG. 7A generally illustrates completion or directed graph 700A that includes beginning node (Node A) 750A, intermediate nodes (Nodes B-G) 750B-G and a termination node (Node "Yes" or "Done") 750H. Each of the beginning node 750H, and intermediate nodes 750B-H represents a question. Inter-node connections or arcs (752A-H) represent response options. In the illustrated embodiment, each inter-node connection (752A-H) represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, one pathway to completion is where an affirmative (True) answer is given to the question of whether you or a spouse can be claimed on someone else's tax return. If such a condition is true, a user's child is not a qualifying dependent because under IRS rules the user cannot claim any dependents if someone else can claim the user as a dependent. In another example, if a user had a child and that child did not live with the user for more than 6 months of the year, then your child is not a qualifying dependent. Again, this is a separate IRS requirement for a qualified dependent.

As will be understood, given the complexities and nuances of the tax code, many tax topics may contain completion graphs 700A that have many nodes (750A-H) with a large number of pathways to completion. However, by many branches or lines within the completion graph 700A can be ignored, for example, when certain questions internal to the completion graph 700A are answered that eliminate other pathways, or other nodes (750A-H) and arcs (752A-H), within the completion graph 700A. The dependent logic expressed by the completion graph 700A utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

FIG. 7B illustrates an example of a decision table that is based on or derived from a directed graph or a completion graph in one or more embodiments. FIG. 7C illustrates another example of a decision table that incorporates statistics (718B and/or 720B) for the corresponding rules and is based on or derived from a directed graph or a completion graph to determine likelihood or probability of an answer to a question of the decision table in one or more embodiments. Moreover, the decision table illustrated in FIG. 7B includes the question-and-answer flow of the completion or directed graph 700A. In the illustrated example, rows of decision table 700B define rules (718B, 720B, 722B, 724B, and 726B), and columns of the decision table 700B indicate questions A-G (702B, 704B, 706B, 708B, 710B, 712B, 714B) as well as the respective goals 716B. A goal may be the expected or default response to a corresponding rule in some embodiments. During processing, decision table 700B s scanned by tax module 364 to determine which answers or which aspects of a rule or condition elements are included in received runtime data. A tax module determines how much the runtime data (e.g., a user's answer to an interview question) completes decision table 700B, or which conditions or questions remain unanswered or unsatisfied, and determines or selects candidate questions to be presented to user.

A completion or directed graph and hence a decision table derived therefrom may be created for a topic or a sub-topic of a topic (e.g., a "marriage" topic including one or more sub-topics). Tax module uses one or more decision tables 700B to analyze the runtime data (e.g., a user's response to an interview question) and determine whether a tax return is complete as far as the pertinent topic or sub-topic is concerned. A decision table 700B created for each topic or sub-topic is scanned or otherwise analyzed or processed to determine completeness for each particular topic or sub-topic. In the event that completeness has been determined with respect to each decision table 700B, then a data model outputs a "DONE" instruction to the data model. If the data model does not output a "DONE" instruction, this means that there are one or more topics or sub-topics that are not complete, which presents interview questions to a user for answer. Tax module identifies decision table 700B corresponding to one of the non-complete topics or sub-topics and, using the data model, identifies one or more non-binding suggestions or recommendations to present to data model. Non-binding suggestions or recommendations may include a listing of compilation of one or more questions from one or more decision tables 700B.

In one embodiment, as shown in FIG. 7B, statistical data 720B (which may be appended as columns to the rule-question decision table 700B shown in FIG. 7A, may be received from or based on data collected from various historical or prior data records (e.g., prior tax returns, prior dynamic flow sequences of other users or similar users, etc.) indicates how likely an interview question or topic is to be relevant to a user given a set of runtime data and may be utilized by a data model when determining which candidate question(s) or topic(s) to select.

Instead of, or in addition to, statistical data (718B and/or 720B), embodiments may also involve tax module executing one or more predictive models included in the one or more tax modules, in the A.I. or machine learning modules, or in one or more data models for purposes of determining how likely a question or topic is to be relative to a given user based on input runtime data. Examples of predictive models that may be utilized for this purpose include predictive modeling techniques selected from the group consisting of: logistic regression; naive Bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 700B may include columns that contain statistical data (718B and/or 720B) in the form of percentages. Column (STAT1 718B shown in FIG. 7B) may contain a percentage value that indicates taxpayers under the age of thirty-five where Ruler is satisfied. Another column (STAT2 720B shown in FIG. 7B) may contain a percentage value that indicates taxpayers over the age of thirty-five where Ruler is satisfied. Any number of additional columns could be added to the decision table 700B and the statistics (718B and/or 720B) do not have to relate to an age threshold or grouping.

Statistical data (718B and/or 720B) may be used, as explained in more detail below, by the tax return preparation application to determine which of the candidate questions (Qa-Qg) should be selected by tax module for presentation to or asked of user. Statistical data (718B and/or 720B) may be compared to one or more known taxpayer data fields (e.g., age, income level, tax filing status, geographic location, or the like) such that the question that is presented to the user is most likely to lead to a path to completion.

Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Tax module 364 may also receive or otherwise incorporate information pertaining to statistical or probabilistic data that is related to the current user or other users of the electronic tax return preparation application and/or other taxpayers. For example, the information may indicate that taxpayers residing within a particular zip code are more likely to be homeowners than renters. Tax module 364 may use this knowledge to weight particular topics or questions related to these topics when processing rules and questions and generating non-binding suggestions or recommendations.

Non-binding suggestions or recommendations generated by the recommendation module 350 may include, for example, a question, declarative statement, identification of a topic and may include a ranked listing of suggestions or recommendations. Ranking may be weighted in order of importance, relevancy, confidence level, or the like. According to one embodiment, statistical data or results generated by predictive models may be incorporated by the tax module 364 or the recommendation module 350 to be used as part of the candidate question ranking which, in turn, may be used by tax module 364 or the recommendation module 350 to assign a ranking to the non-binding suggestions or recommendations generated by tax module 364 or the recommendation module 350.

The decision tables illustrated in FIGS. 7B-7C may be derived from the completion or directed graph 700A. Moreover, the data value "Yes" in FIGS. 7B-7C indicates that the corresponding rule applies when a user's answer to the corresponding interview question is affirmative. On the other hand, the data value "No" in FIGS. 7B-7C indicates that the corresponding rule applies when a user's answer to the corresponding interview question is negative. A question mark "?" in the decision table indicates that the corresponding rules are irrelevant to corresponding questions. That is, a rule that corresponds to a question with a question mark "?" indicates that the question belongs to a don't-care space for the rule, and that the rule also belongs to the don't-care space for the question.

FIG. 7D illustrates an example of incremental processing of a decision table 700D based at least in part upon some runtime data to identify relevant entries or to filter out irrelevant entries in one or more embodiments. In this example, assuming a user's answer to interview question $Q_A$ 702B is "Yes". As a result, rules 722B, 724B, and 726B that apply when the answer to $Q_A$ 702B is "No" no longer apply. Consequently, the three rows corresponding to 722B, 724B, and 726B are discarded, ignored, or filtered out from further processing for this decision table (and its corresponding completion or directed graph.

In addition, the four columns that include "?" (704B, 708B, 710B, and 712B) may also be discarded, ignored, or filtered out from further processing because these four columns correspond to the don't-care space for the only remaining rules 718B and 720B. On the other hand, the column corresponding to 714B remains because rule 720B applies when the answer to question 714B is affirmative, although rule 718B and question 714B are irrelevant to each other. As such, the original decision table 700B may be significantly reduced to the reduced decision table 700D as illustrated in FIG. 7D with three columns and four columns being crossed out from the original decision table 700A.

Figure 8A:
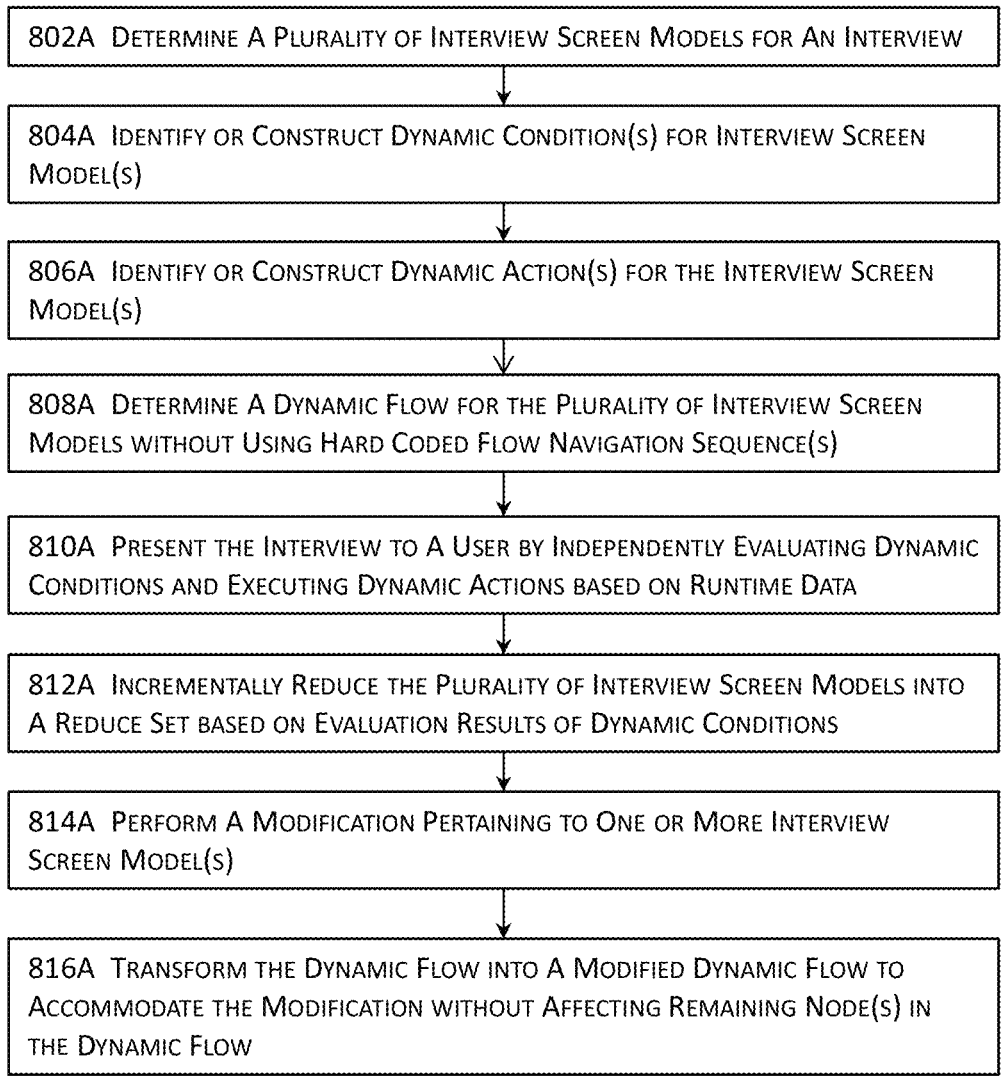
FIG. 8A illustrates a block diagram for implementing intelligent systems with dynamic configurability in one or more embodiments.

FIG. 8A illustrates a block diagram for implementing intelligent systems with dynamic configurability in one or more embodiments. In these embodiments, a plurality of interview screens, topics, or the corresponding data models or code modules therefor (collectively interview screens for plural or interview screen for singular) may be identified at 802A. These plurality of interview screens may be identified based on, for example, various requirements or intended functions or purposes of an underlying dynamic software application of a portion thereof from a set of interview screens. For example, a plurality of interview screens, each of which may include or may be implemented as an object model or a code module concerning one or more interview questions, may be identified for a dynamic interview module of an electronic tax return preparation and filing software product or service.

It shall be noted that the terms "flow node," "object model," and "code module" may be used interchangeably in this application to represent a block of computer program code in various suitable forms to facilitate the execution of the underlying software application. An object model thus may include or may be associated with its own one or more dynamic conditions and/or one or more dynamic actions to provide the capability of individual, self-contained, and/or independent execution and thus facilitate the ease of modification of the dynamic software application of which the object model is a part.

One or more dynamic conditions may be optionally identified (if already existing) from a condition repository (e.g., 372 in FIG. 3) or determined (if non-existing) at 804A for at least one interview screen of the plurality of interview screens identified at 802A. A dynamic condition may include a stand-alone code module with a unique identifier to be referenced by or incorporated into an object model in some embodiments. In some other embodiments, a dynamic condition may be incorporated into an object model directly. Optionally, one or more dynamic actions may also be identified (if already existing) from an action repository (e.g., 372 in FIG. 3) or determined (if non-existing) at 806A for at least one interview screen of the plurality of interview screens identified at 802A. An object model may include one or more dynamic conditions alone, one or more dynamic actions alone, or a combination of one or more dynamic conditions and one or more dynamic actions.

A dynamic flow for a dynamic software application may be determined at 808A with the plurality of interview screens, without hard coded inter-relations or inter-dependencies between at least two flow nodes of the plurality of flow nodes. In some embodiments, none of the plurality of flow nodes correspond to any hard coded navigation or execution algorithm of any forms. The dynamic flow for an interview or a topic may be executed and presented to a user at 810A by independently executing one or more interview screens in the dynamic flow. In some embodiments, the dynamic flow may be executed by executing any interview screen in the plurality of flow nodes when the plurality of flow nodes are independent of each other. A interview screen may be devised to terminate or exit its execution when, for example, a dynamic condition cannot be evaluated at the time of execution. For example, if the regular vanilla or French vanilla screen (108A in FIG. 1A) is executed first or before the screen 104A is executed, the flow node 108A may exit or terminate execution and call the flow control or execution module to identify another flow node for execution.

Of course, the aforementioned example of executing the flow node 108A first or before the execution of 104A is to demonstrate the flexibility of the dynamic software application. To improve the efficiency and conserve computational resources, a dynamic flow may be executed based on the general applicability that may be determined for the plurality of flow nodes. For example, the word embedding or term embedding module 304 may determine the relevance or classifications among the plurality of flow nodes by analyzing their respective descriptions or metadata with word or term embedding techniques. The applicability or relevance of the plurality of flow nodes with respect to other characteristics may also be similarly determined. In an example of interview screens, for example, the relevance of each interview screen to users may be determined similarly. For example, it may be determined that the interview screen inquiring whether a user is married is relevant to most, if not all users, and may thus be assessed with a higher general applicability score, and the plurality of flow nodes may thus be ranked accordingly.

In some of these embodiments, the first flow node or the first few flow nodes for a dynamic flow may be identified based on such general applicability scores so that the dynamic flow initiates its execution with a flow node having higher or even the highest general applicability scores. If two or more flow nodes are assessed with the same, highest general applicability score, any of these two or more flow nodes may be identified to initiate the dynamic flow execution in some embodiments. In some other embodiments, a tie breaker among these two or more flow nodes may be determined by, for example, which flow node's execution result further curtails or filters out more flow nodes from further consideration.

For example, a flow node whose execution result is determined to reduce the extent of the state space of the remaining flow nodes may be identified from multiple flow nodes having the same general applicability. Of course, general applicability score is just one way to determine where to start the flow execution, and other criteria or factors may also be used. This general applicability or such other criteria or factors may be referenced or included in, for example, a priority list described above or may be provided as an input to a data model (316 or 322) or a navigation model that identifies flow nodes for execution in conjunction with the functioning of one or more other modules (e.g., a data model that manipulates the decision table based on runtime data).

In some embodiments, a interview screen may be executed and presented to a user by evaluating the one or more dynamic conditions, if available and included in or associated with the flow node, and by executing the dynamic action corresponding to the evaluation result of the one or more dynamic conditions, if the flow node includes or is associated with such one or more dynamic actions.

The plurality of interview screens or the remainder thereof may thus be incrementally reduced at 812A into a reduced set of interview screens based at least in part upon the execution results of the interview screen or the object model therefor at 810A. This reduction of the original set of interview screens to a reduced set is advantageous and renders the interview flow smoother, especially considering the vast number of interview screens in modern software applications (e.g., in excess of 50,000). In some embodiments where additional runtime data is acquired during or after the execution of an interview screen, the plurality of interview screens or the remainder thereof may be reduced into the reduced set based at least in part upon the runtime data.

In some of these embodiments illustrated in FIG. 8A, a modification to the dynamic flow may be optionally performed at 814A. Modifications to a flow may include, for example, adding one or more interview screens into the dynamic interview flow, removing one or more interview screens from the dynamic interview flow, or changing the location of an interview screen in the dynamic interview flow. The dynamic flow may then be transformed into a modified dynamic flow at 816A to accommodate the modification performed at 814A, without affecting the other flow nodes or interview screens that are not affected by the modification in the dynamic interview flow. That is, the modification may be implemented in such a way to exert minimal or even no impact on a dynamic interview flow due to the independent execution of at least one flow node (e.g., an interview screen) that is not hard coded with any inter-relation or inter-dependency in the dynamic interview flow or elsewhere (e.g., in a navigation algorithm, flow control, etc.).

Figure 8B:
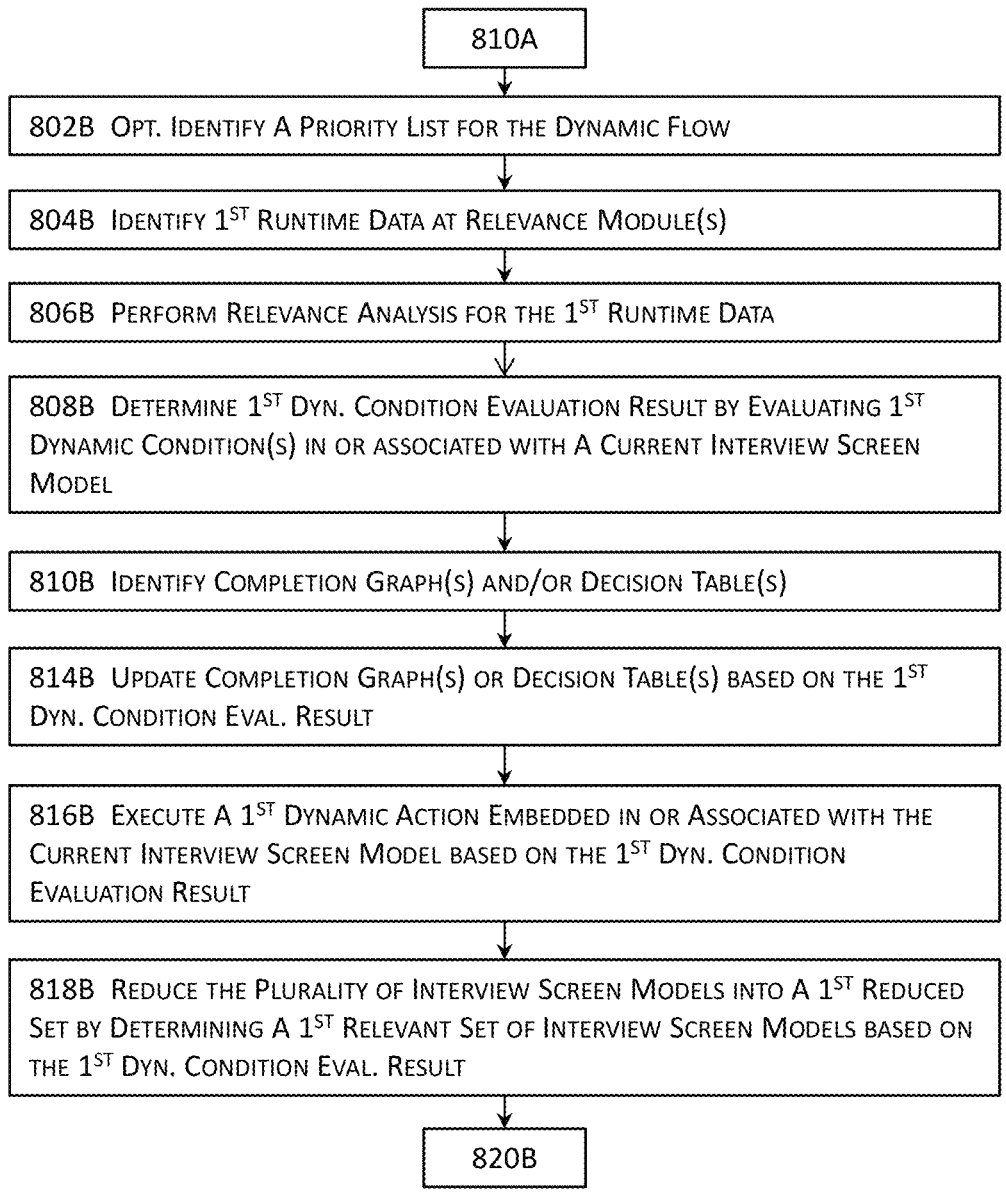
FIGS. 8B-8C jointly illustrates more details about a portion of the block diagram illustrated in FIG. 8A for implementing intelligent systems with dynamic configurability in one or more embodiments.
Figure 8C:
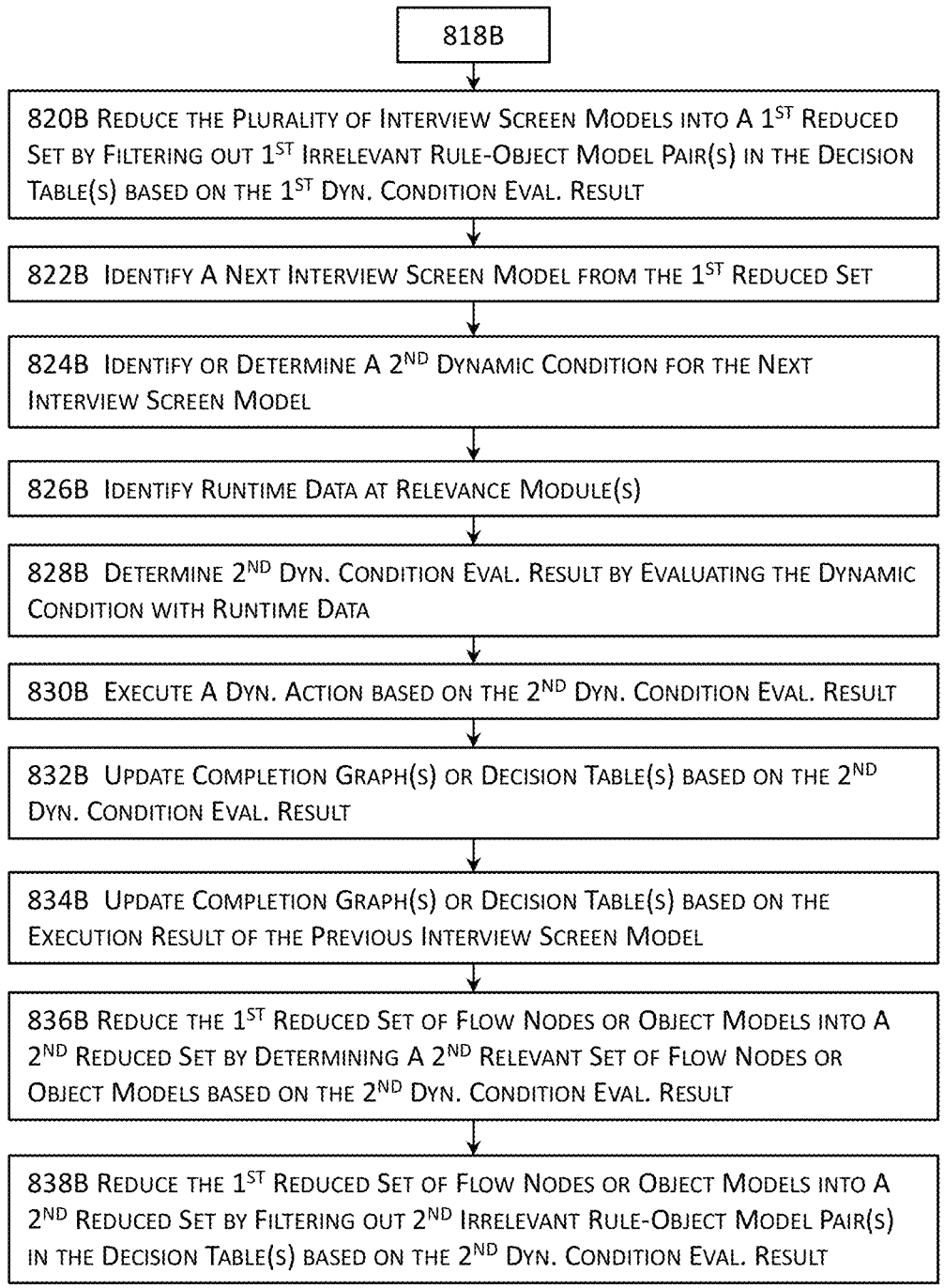

FIGS. 8B-8C jointly illustrates more details about a portion of the block diagram illustrated in FIG. 8A for implementing intelligent systems with dynamic configurability in one or more embodiments. More specifically, FIGS. 8B-8C illustrate more details about executing a dynamic flow at 810A in FIG. 8A. It shall be noted that the execution of a dynamic flow illustrated in FIGS. 8B-8C may or may not necessarily start from the beginning. That is, the following description applies to the flow execution that starts from the beginning when the dynamic flow is first initialized or from an intermediate stage where the dynamic flow has started execution and proceeded through one or more flow nodes. In these embodiments, a priority list may be optionally identified at 802B.

A priority list may provide, for example, some general guidance as to which flow nodes or which groups of flow nodes may be performed before (or after) some other flow nodes or groups of flow nodes. A priority may also include some rules indicating flow nodes having one or more characteristics (e.g., higher general applicability) may be executed before other flow nodes. Nonetheless, a priority list does not indicate a fixed sequence or order from one flow node to a specific next flow node in the plurality of flow nodes.

First runtime data may be identified 804B at a relevance module such as a data model (316 or 322 of FIG. 3). The first runtime data may include, for example, information or data provided by a user during runtime. For example, a user may provide an input (e.g., an answer to an interview screen); and the input provided by the user may be identified as the first runtime data. One or more relevance analyses may be performed for the first runtime data at 806B. These one or more relevance analyses determine which flow nodes are relevant and/or which flow nodes are irrelevant based at least in part upon the execution results of the previous flow node and/or the runtime data, if available. More details about relevant analyses at 806B are described above with reference to FIGS. 5A-5G.

A first dynamic condition evaluation result may be determined at 808B at least by evaluating one or more first dynamic conditions included in or associated with the current flow node that is executing. In some embodiments, one or more completion graphs and/or one or more decision tables may be optionally identified at 810B. As described above, some embodiments determine relevant interview screens and/or irrelevant interview screens in the remaining interview screens of the plurality of interview screens by using one or more data models that operate upon one or more completion graphs and/or one or more decision tables that may be derived from the one or more completion graphs. Some other embodiments may determine relevant flow nodes and/or irrelevant flow nodes by using one or more data models (e.g., 316 and/or 322) that apply word embedding or term embedding techniques to, for example, the descriptions, metadata, etc. of the plurality of interview screens. Therefore, 810B is performed when one or more data models reference such completion graphs and/or decision tables in determining relevant and/or irrelevant interview screens.

The one or more completion graphs and/or the one or more may be updated at 814*b* based at least in part upon the evaluation results of the one or more first dynamic conditions generated at 808B. In the example illustrates in FIG. 1A, if the execution results of 104A is that a user selects chocolate milk shake, the entries corresponding to 108A (regular vanilla or French vanilla) and 110A (Albion or Florence strawberry) may be labeled as irrelevant for the remainder of the dynamic flow.

If the currently executing flow node is associated with or includes one or more dynamic actions, at least one of the one or more dynamic actions corresponding to the evaluation results of the one or more dynamic conditions is executed at 816B. For example, if a dynamic condition is evaluated to be false, the failure dynamic action corresponding to this dynamic condition is executed at 816B. On the other hand, if a dynamic condition is evaluated to be true, the success dynamic action corresponding to this dynamic condition is executed at 816B.

The plurality of interview screens or the remainder thereof may be reduced into a first reduced set at 818B at least by determining a first relevant set of interview screens based in part or in whole upon the evaluation of the one or more dynamic conditions. In addition or in the alternative, the plurality of interview screens or the remainder thereof may be reduced at 820B into the first reduced set at least by discarding, ignoring, or filtering out one or more irrelevant interview screens based in part or in whole upon the evaluation of the one or more dynamic conditions. Once a flow node is discarded, ignored, or filtered out, the included or associated dynamic conditions will no longer be evaluated, and the included or associated dynamic actions will not be executed in some embodiments, unless a dynamic action is labeled as always executed.

A next interview screen model may be identified at 822B from the first reduced set. In some embodiments, a next interview screen model may be identified based at least in part upon the execution of the previous interview screen model. For example, an interview screen model that is identified to be closest to the previous interview screen model may be identified as the next interview screen model at 822B. The closeness between two interview screen models may be determined by, for example, applying the word embedding or term embedding techniques to the descriptions, metadata, or any other available information, etc. of or associated with these two interview screen models. For example, a word or term embedding module may determine the vector representations of the descriptions of various interview screen models including the previous interview screen model.

The interview screen model whose vector representation is determined to be closest to that of the previous interview screen model may be identified as the next interview screen model for execution in some embodiments. In some of these embodiments where two or more interview screen models whose vector representations are determined to be equidistant to that of the previous interview screen model, or whose vector representations are determined to be within certain proximity of the vector representation of the previous interview screen model, a tie break may be determined among these interview screen models based on one or more criteria. For example, the interview screen model which, when executed, causes the most number of remaining interview screen models, provides least restrictions or constraints to the remainder of the dynamic flow, provides the maximum flexibility to the identification of subsequent interview screen models, or best facilitates the designed purposes or functions of the dynamic software application may be identified as the next flow node at 822B.

One or more second dynamic conditions may be identified (if already existing) or determined (if not yet existing) at 824B for the next flow node. In some embodiments, a custom dynamic condition may be generated for these one or more second dynamic conditions. In some of these embodiments, such custom dynamic conditions may even be generated on the fly during the execution of the flow when the situation merits the generation of such custom dynamic conditions. For example, if an artificial intelligence module or a machine learning module determines that during the execution of a flow node, an additional dynamic condition and hence the corresponding success dynamic action and the failure dynamic action need to be generated to better facilitate the functions of the dynamic application or to better serve the user's experience or inquiries, a dynamic code generation module may be invoked via an inter-process function call to dynamically create such dynamic condition and actions.

Runtime data may further be identified at 826B during or after the execution of the previous interview screen model. For example, a user may provide additional inputs (e.g., an additional answer to a new interview question presented in the previous flow node), and these addition inputs may be identified as runtime data at 826B. This runtime data may be analyzed by one or more data models and/or the word embedding or term embedding modules to determine its relevance to or impact on one or more remaining interview screen models.

A second evaluation result may be determined at 828B at least by evaluating the one or more second dynamic conditions. In some embodiments, the second evaluation result may be determined based on the runtime data identified at 826B when the runtime data is determined to be relevant to the currently executing interview screen model or the one or more second dynamic conditions.

A dynamic action corresponding to the second evaluation result may be executed at 830B. For example, if a second dynamic condition is evaluated to be false, the failure dynamic action corresponding to this dynamic condition is executed at 830B. On the other hand, if a second dynamic condition is evaluated to be true, the success dynamic action corresponding to this dynamic condition is executed at 830B.

The one or more completion graphs and/or the one or more decision tables may be updated at 832B in an identical or substantially similar manner as that described at 814B. In some embodiments, one or more completion graphs and/or the one or more decision tables may be updated at 832B based in part or in whole upon the execution result of the next interview screen model and/or the second evaluation result. In addition or in the alternative, these one or more completion graphs and/or the one or more decision tables may be updated at 832B based in part or in whole upon the runtime data identified at 826B. In the example described with reference to 814B above, if the execution result of the next interview screen model is that the fries are not in stock ("false" for 102C), then the entries corresponding to 112A (asking a user whether the user would like to order fries) will be discarded, ignored, or filtered out in the one or more completion graphs or one or more decision tables. In addition or in the alternative, the one or more completion graphs and/or the one or more decision tables may be updated at 834B based in part or in part upon the execution result of the previous interview screen model.

The first reduced set may be reduced at 836B into a second reduced set at least by determining a second relevant set of flow nodes that is relevant to the currently executing, next interview screen model based in part or in whole on the execution result of the next interview screen model and/or the second evaluation result of the one or more second dynamic conditions. In addition or in the alternative, the first reduced set may be reduced at 838B into a second reduced set at least by discarding, ignoring, or filtering out one or more interview screen models that have been determined to be irrelevant to the currently executing, next interview screen model based in part or in whole on the execution result of the next interview screen model and/or the second evaluation result of the one or more second dynamic conditions.

To implement an intelligent system with dynamic configurability, at least some or all of the techniques described above with reference to FIGS. 5A-5G, 6A-6H, and 7A-7D may also apply to the approaches described above with reference to FIGS. 8A-8C, especially to the determination of the dynamic flow, identification of flow nodes or the sequence of execution, etc. in identical or substantially manners as those described above with reference the aforementioned figures. For example, the word embedding or term embedding techniques described herein or the techniques involving the user of completion or directed graphs and/or decision tables may apply with full and equal effects to, for example, the determination of a dynamic flow for an intelligent system (e.g., 808A in FIG. 8A), the presentation of an interview to a user of the intelligent system (e.g., 810A in FIG. 8A), in the reduction of a plurality of flow nodes (e.g., interview screens at 812A in FIG. 8A), etc. in identical or substantially manners as those described above with reference the aforementioned FIGS. 5A-5G, 6A-6H, and 7A-7D.

System Architecture Overview

Figure 9:
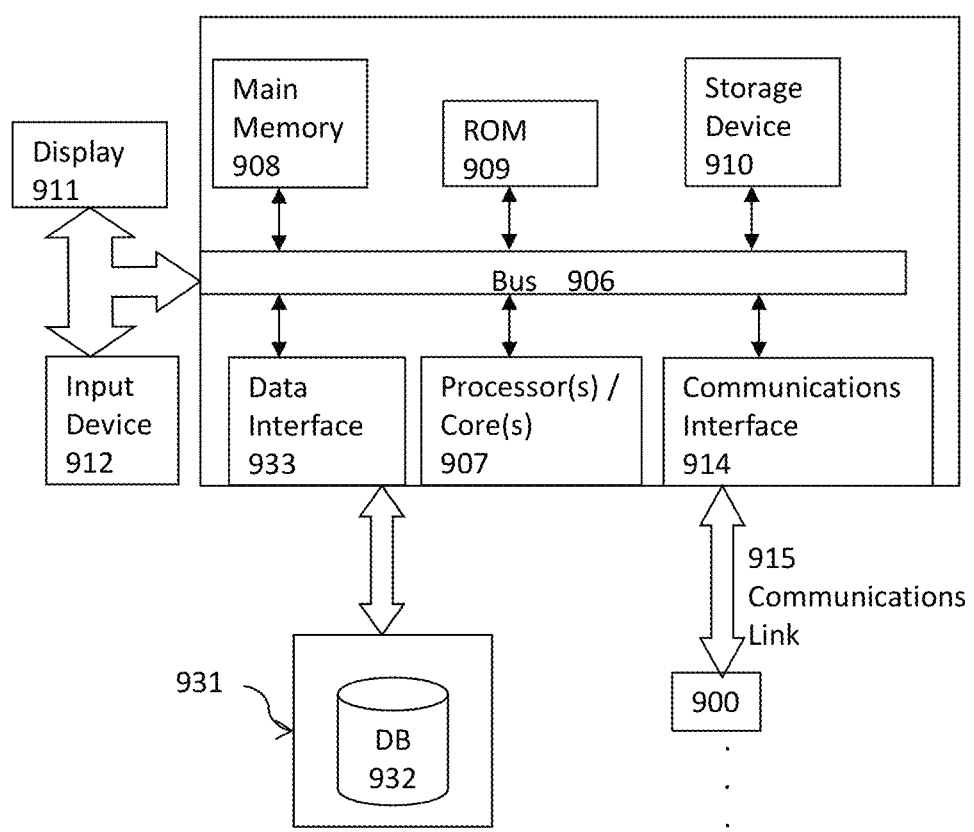
FIG. 9 illustrates an example of a computing system that is configured with specific modules to perform various techniques described herein in one or more embodiments.

FIG. 9 illustrates a block diagram of an illustrative computing system 900 suitable for implementing various processes as described in the preceding paragraphs with reference to various figures. The illustrative computing system 900 may include an Internet-based computing platform providing a shared pool of configurable computer processing resources (e.g., computer networks, servers, storage, applications, services, etc.) and data to other computers and devices in a ubiquitous, on-demand basis via the Internet.

For example, the computing system 900 may include or may be a part of a cloud computing platform in some embodiments. Computer system 900 includes a bus 906 or other communication module for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown).

According to one embodiment, computing system 900 performs specific operations by one or more processor or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 907, where the one or more processors, one or more processor cores, or combination thereof executes one or more threads. For example, various acts of identifying, various acts of determining, various acts of classifying, various acts of implementing, various acts of performing, various acts of transforming, various acts of decomposing, various acts of updating, various acts of presenting, various acts of modifying, etc. may be performed by one or more processors, one or more processor cores, or combination thereof.

A modules described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a module described herein may be implemented as an application-specific integrated circuit (ASIC) in some embodiments.

In these embodiments, a module may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of module. A module described herein or an equivalent thereof may perform its respective functions alone or in conjunction with one or more other modules. A module described herein or an equivalent thereof may thus invoke one or more other modules by, for example, issuing one or more commands or function calls. The invocation of one or more other modules may be fully automated or may involve one or more user inputs.

The term "computer readable storage medium" or "computer usable storage medium" as used herein refers to any non-transitory medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. In an embodiment, the computing system 900 operates in conjunction with a data storage system 931, e.g., a data storage system 931 that includes a database 932 that is readily accessible by the computing system 900. The computing system 900 communicates with the data storage system 931 through a data interface 933. A data interface 933, which is coupled with the bus 906, transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for implementing an intelligent system with dynamic configurability, comprising:
identifying, by one or more intelligent modules comprising computer executable instructions stored at least partially in memory and executed by at least one microprocessor, a plurality of flow nodes for a software application;
determining a dynamic flow for executions of the intelligent system with the plurality of flow nodes, one or more dynamic conditions, and one or more dynamic actions, without hard coded inter-dependency between two or more flow nodes of the plurality of flow nodes;
executing a first flow node in the dynamic flow;
determining that at least one of the one or more dynamic conditions cannot be evaluated by:
identifying runtime data during an execution of at least one flow node for the intelligent system, the runtime data comprising information input by a user via a user interface;
identifying or generating one or more classification modules for classifying one or more terms in the runtime data with machine learning; and
classifying the one or more terms with at least one classification module;
terminating execution or preventing execution of a second flow node in the dynamic flow; and
transforming the intelligent system into a dynamically configured intelligent system at least by removing the second flow node from the dynamic flow.

2. The computer implemented method of claim 1, wherein a dynamic condition associated with or included in a flow node in the dynamic flow is independently evaluated to generate a dynamic evaluation result during an execution of the dynamic flow, wherein the intelligent system is transformed into the dynamically configured intelligent system at least by removing the second flow node from the dynamic flow, without affecting remaining flow nodes in the dynamic flow.

3. The computer implemented method of claim 2, wherein a dynamic action associated with or included in a flow node in the dynamic flow is independently performed based in part or in whole upon the dynamic evaluation result of the dynamic condition.

4. The computer implemented method of claim 1, further comprising:
identifying and linking a helper item with a classified term from the runtime data using the at least one classification module; and
improving accuracy or completeness of the at least one classification module.

5. The computer implemented method of claim 4, further comprising:
identifying a plurality of classification metrics or measures;
determining one or more learning classification schemes with the plurality of classification metrics or measures; and
identifying or generating the one or more classification modules with the one or more learning classification schemes.

6. The computer implemented method of claim 5, further comprising:
retraining the one or more learning classification schemes into one or more retrained learning classification schemes with active learning data; and
improving the one or more classification modules with at least the one or more retrained learning classification schemes.

7. The computer implemented method of claim 3, further comprising:
identifying a data set corresponding to the plurality of flow nodes into a word or term embedding module that is stored at least partially in the memory and including or coupled with the at least one microprocessor;
identifying or determining a plurality of object model clusters and a plurality of characteristic clusters for the data set with word or term embedding techniques; and
identifying runtime data from a user during an execution of the intelligent system.

8. The computer implemented method of claim 7, further comprising:
determining one or more runtime data clusters and one or more characteristic clusters for at least one runtime data cluster for the runtime data; and
presenting at least one characteristic cluster or the at least one runtime data
cluster to a data model or a code generation module for completing the dynamic flow.

9. The computer implemented method of claim 8, further comprising:
normalizing the data set into a normalized data set;
reducing the data set or the normalized data set into a reduced data set at least by performing a reduction process on the data set or the normalized data set;
generating a dictionary for the reduced data set;
training the word or term embedding module with one or more training instances comprising one or more analogical tasks; and
mapping a plurality of tokens in the dictionary to a set of vectors in a vector space.

10. The computer implemented method of claim 9, further comprising:
pruning the dictionary;
determining the one or more training instance and multiple degrees of freedom for the one or more training instances based in part or in whole upon a balance between performance and accuracy of the intelligent system; and
determining customizable weight structures for the word or term embedding module.

11. The computer implemented method of claim 9, further comprising:
executing the one or more training instances at the word or term embedding module; and
generating the set of vectors as a distribution of weights of tokens in the dictionary with the customizable weight structures.

12. The computer implemented method of claim 3, further comprising:
identifying one or more completion graphs;
determining one or more decision tables based in part or in whole upon the one or more completion graphs;
determining the dynamic flow based at least in part upon the one or more decision tables; and
executing the first flow node in the dynamic flow at least by independently evaluating one or more first dynamic conditions included in or associated with the first flow node and by executing one or more first dynamic actions based in part or in whole upon evaluating the one or more first dynamic conditions.

13. The computer implemented method of claim 12, further comprising:

identifying first runtime data during an execution of the first flow node; and updating at least one decision table into a first reduced decision table at least by discarding, ignoring, or filtering out one or more first entries in the at least one decision table from further processing based in part or in whole upon the first runtime data.

14. The computer implemented method of claim 13, further comprising:

executing a third flow node in the dynamic flow at least by independently evaluating one or more second dynamic conditions included in or associated with the third flow node and by executing one or more second dynamic actions based in part or in whole upon evaluating the one or more second dynamic conditions.

15. The computer implemented method of claim 14, further comprising:

identifying second runtime data during an execution of the third flow node; and updating the first reduced decision table into a second reduced decision table at least by discarding, ignoring, or filtering out one or more second entries in the first reduced decision table from further processing based in part or in whole upon the second runtime data.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an intelligent system with dynamic configurability, the set of acts comprising:

identifying, by one or more intelligent modules comprising computer executable instructions stored at least partially in memory and executed by the at least one processor or the at least one processor core, a plurality of flow nodes for a software application;

determining a dynamic flow for executions of the intelligent system with the plurality of flow nodes, one or more dynamic conditions, and one or more dynamic actions, without hard coded inter-dependency between two or more flow nodes of the plurality of flow nodes;

executing a first flow node in the dynamic flow;

determining that at least one of the one or more dynamic conditions cannot be evaluated by:

identifying runtime data during an execution of at least one flow node for the intelligent system, the runtime data comprising information input by a user via a user interface;

identifying or generating one or more classification modules for classifying one or more terms in the runtime data with machine learning; and classifying the one or more terms with at least one classification module;

terminating execution or preventing execution of a second flow node in the dynamic flow; and transforming the intelligent system into a dynamically configured intelligent system at least by removing the second flow node from the dynamic flow, without affecting remaining flow nodes in the dynamic flow.

17. The article of manufacture of claim 16, the set of acts further comprising:

identifying and linking a helper item with a classified term from the runtime data using the at least one classification module; and improving accuracy or completeness of the at least one classification module.

18. The article of manufacture of claim 17, the set of acts further comprising:

identifying a plurality of classification metrics or measures;

determining one or more learning classification schemes with the plurality of classification metrics or measures; and identifying or generating the one or more classification modules with the one or more learning classification schemes.

19. The article of manufacture of claim 18, the set of acts further comprising:

retraining the one or more learning classification schemes into one or more retrained learning classification schemes with active learning data; and improving the one or more classification modules with at least the one or more retrained learning classification schemes.

20. A system for implementing an intelligent system with dynamic configurability, comprising:

a plurality of intelligent modules, at least one of which comprising computer executable instructions stored at least partially in memory and executed by at least one microprocessor including one or more processor cores executing one or more threads;

a non-transitory computer accessible storage medium storing thereupon program code that includes a sequence of instructions that, when executed by the at least one microprocessor, causes the at least one microprocessor at least to:

identify, by one or more of the plurality of intelligent modules comprising the computer executable instructions stored at partially in memory and executed by the at least one microprocessor, a plurality of flow nodes for a software application;

determine a dynamic flow for executions of the intelligent system with the plurality of flow nodes, one or more dynamic conditions, and one or more dynamic actions, without hard coded inter-dependency between two or more flow nodes of the plurality of flow nodes;

execute a first flow node in the dynamic flow;

determine that at least one of the one or more dynamic conditions cannot be evaluated by:

identifying runtime data during an execution of at least one flow node for the intelligent system, the runtime data comprising information input by a user via a user interface;

identifying or generating one or more classification modules for classifying one or more terms in the runtime data with machine learning; and classifying the one or more terms with at least one classification module;

terminate execution or prevent execution of a second flow node in the dynamic flow; and transform the intelligent system into a dynamically configured intelligent system at least by removing the second flow node from the dynamic flow, without affecting remaining flow nodes in the dynamic flow.

21. The system of claim 20, wherein the program code includes further instructions that, when executed by the at least one microprocessor or processor core, cause the at least one processor or processor core at least further to:

identify a data set corresponding to the plurality of flow nodes into a word or term embedding module that is stored at least partially in the memory and including or coupled with the at least one microprocessor;

identify or determine a plurality of object model clusters and a plurality of characteristic clusters for the data set with word or term embedding techniques; and identify runtime data from a user during an execution of the intelligent system.

22. The system of claim 21, wherein the program code includes further instructions that, when executed by the at least one microprocessor or processor core, cause the at least one processor or processor core at least further to:

determine one or more runtime data clusters and one or more characteristic clusters for at least one runtime data cluster for the runtime data; and present at least one characteristic cluster or the at least one runtime data cluster to a data model or a code generation module for completing the dynamic flow.

23. The system of claim 22, wherein the program code includes further instructions that, when executed by the at least one microprocessor or processor core, cause the at least one processor or processor core at least further to:

normalize the data set into a normalized data set;

reduce the data set or the normalized data set into a reduced data set at least by performing a reduction process on the data set or the normalized data set;

generate a dictionary for the reduced data set;

train the word or term embedding module with one or more training instances comprising one or more analogical tasks; and map a plurality of tokens in the dictionary to a set of vectors in a vector space.

24. The system of claim 20, wherein the program code includes further instructions that, when executed by the at least one microprocessor or processor core, cause the at least one processor or processor core at least further to:

identify one or more completion graphs;

determine one or more decision tables based in part or in whole upon the one or more completion graphs;

determine the dynamic flow based at least in part upon the one or more decision tables;

execute the first flow node in the dynamic flow at least by independently evaluating one or more first dynamic conditions included in or associated with the first flow node and by executing one or more first dynamic actions based in part or in whole upon evaluating the one or more first dynamic conditions;

identify first runtime data during an execution of the first flow node; and update at least one decision table into a first reduced decision table at least by discarding, ignoring, or filtering out one or more first entries in the at least one decision table from further processing based in part or in whole upon the first runtime data.

25. The system of claim 24, wherein the program code includes further instructions that, when executed by the at least one microprocessor or processor core, cause the at least one processor or processor core at least further to:

execute a third flow node in the dynamic flow at least by independently evaluating one or more second dynamic conditions included in or associated with the third flow node and by executing one or more second dynamic actions based in part or in whole upon evaluating the one or more second dynamic conditions identify second runtime data during an execution of the third flow node; and update the first reduced decision table into a second reduced decision table at least by discarding, ignoring, or filtering out one or more second entries in the first reduced decision table from further processing based in part or in whole upon the second runtime data.

* * * * *